US011122479B2

(12) United States Patent
Kalkunte

(10) Patent No.: US 11,122,479 B2
(45) Date of Patent: Sep. 14, 2021

(54) SYSTEMS AND METHODS FOR MILLIMETER WAVE V2X WIRELESS COMMUNICATIONS

(71) Applicant: Airfide Networks LLC, Saratoga, CA (US)

(72) Inventor: Venkat Kalkunte, Saratoga, CA (US)

(73) Assignee: AIRFIDE NETWORKS LLC, Saratoga, CA (US)

(*) Notice: Subject to any disclaimer, the term of this patent is extended or adjusted under 35 U.S.C. 154(b) by 0 days.

(21) Appl. No.: 16/681,536

(22) Filed: Nov. 12, 2019

(65) Prior Publication Data

US 2020/0162980 A1 May 21, 2020

Related U.S. Application Data

(60) Provisional application No. 62/768,722, filed on Nov. 16, 2018.

(51) Int. Cl.
*H04M 3/00* (2006.01)
*H04W 36/06* (2009.01)
*H04W 4/40* (2018.01)
*H04W 36/30* (2009.01)
(Continued)

(52) U.S. Cl.
CPC ............ *H04W 36/06* (2013.01); *H04W 4/40* (2018.02); *H04W 16/28* (2013.01); *H04W 36/30* (2013.01); *H04W 72/042* (2013.01); *H04W 72/046* (2013.01)

(58) Field of Classification Search
None
See application file for complete search history.

(56) References Cited

U.S. PATENT DOCUMENTS

| 10,098,014 | B1* | 10/2018 | Shimizu | H04W 4/027 |
| 2011/0064033 | A1* | 3/2011 | Gong | H04B 7/0617 |
| | | | | 370/329 |
| 2019/0097705 | A1* | 3/2019 | Ho | H04B 7/0617 |

(Continued)

OTHER PUBLICATIONS

Sim_Technische Universitat Darmstadt_IEEE-ACM Transactions on Networking_Sep. 2018.pdf (Year: 2018).*

(Continued)

*Primary Examiner* — Jinsong Hu
*Assistant Examiner* — Alexander J Yi
(74) *Attorney, Agent, or Firm* — Foley & Lardner LLP

(57) ABSTRACT

The systems and methods of the present disclosure include a system for millimeter wave wireless communications with adaptive connection management. The system can include a first and a second wireless station. The first wireless station can include a first and a second radio frequency (RF) array. The first wireless station can execute a connection manager and maintain a beambook. The connection manager can transmit data to the second wireless station using a first sector of the first RF array and a beam width. The connection manager can update the beambook, and transmit data using a second sector of the first RF array based on feedback received from the second wireless station. The connection manager can probe other sectors using the second RF array, and identify a second sector of the second RF array with the highest gain. The connection manager can switch transmissions to the second RF array.

20 Claims, 41 Drawing Sheets

(51) Int. Cl.
*H04W 72/04* (2009.01)
*H04W 16/28* (2009.01)

(56) References Cited

U.S. PATENT DOCUMENTS

| | | | |
|---|---|---|---|
| 2019/0146514 A1* | 5/2019 | Son | G06K 9/66 |
| | | | 701/27 |
| 2019/0223237 A1* | 7/2019 | Hong | H04W 4/70 |
| 2020/0077285 A1* | 3/2020 | Yu | H04B 7/0617 |
| 2020/0241485 A1* | 7/2020 | Maeda | G06N 3/088 |

OTHER PUBLICATIONS https://dl.acm.org/citation.cfm?id=3311529; An Online Context-Aware Machine Learning Algorithm for 5G mmWave Vehicular Communications.
https://www.researchgate.net/profile/Arash_Asadi/publication/324804467_FML_Fast_Machine_Learning_for_5G_mmWave_Vehicular_Communications/links/5ae34a26aca272fdaf904fdb/FML-Fast-Machine-Learning-for-5G-mmWave-Vehicular-Communications.pdf?origin=publication_detail.
Steinmetzer, Daniel et al. titled Compressive Millimeter-Wave Sector Selection in Off-the-Shelf IEEE 802.11ad Devices, 12 pages, Dec. 12-15, 2017.

* cited by examiner

212

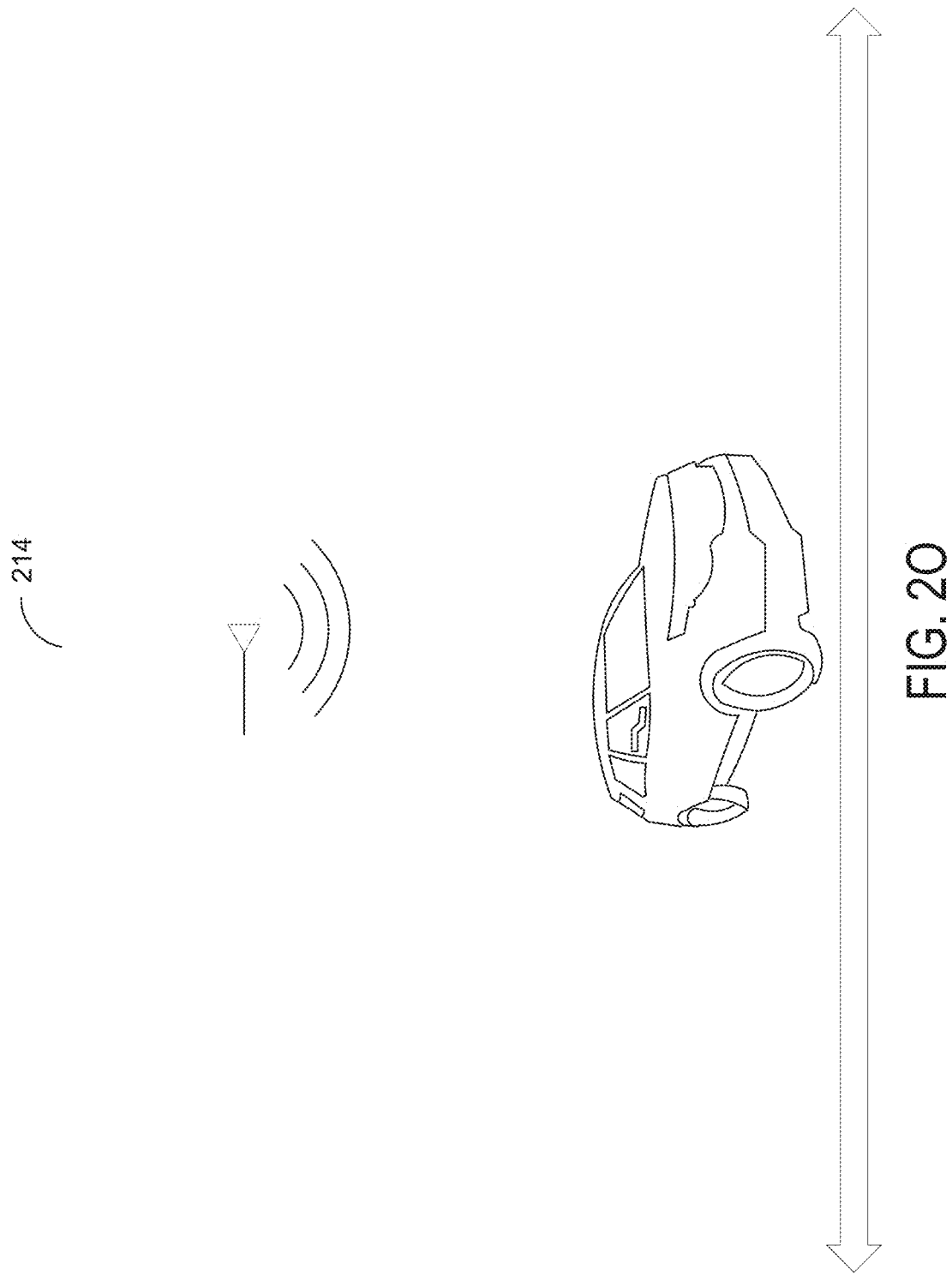

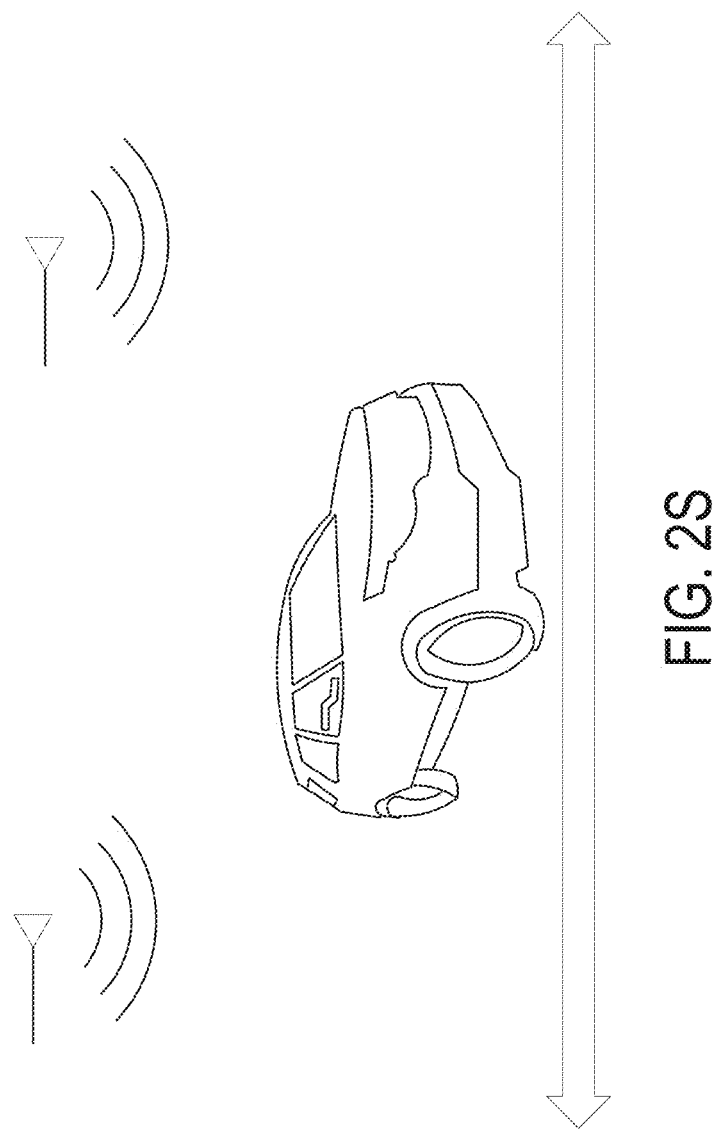

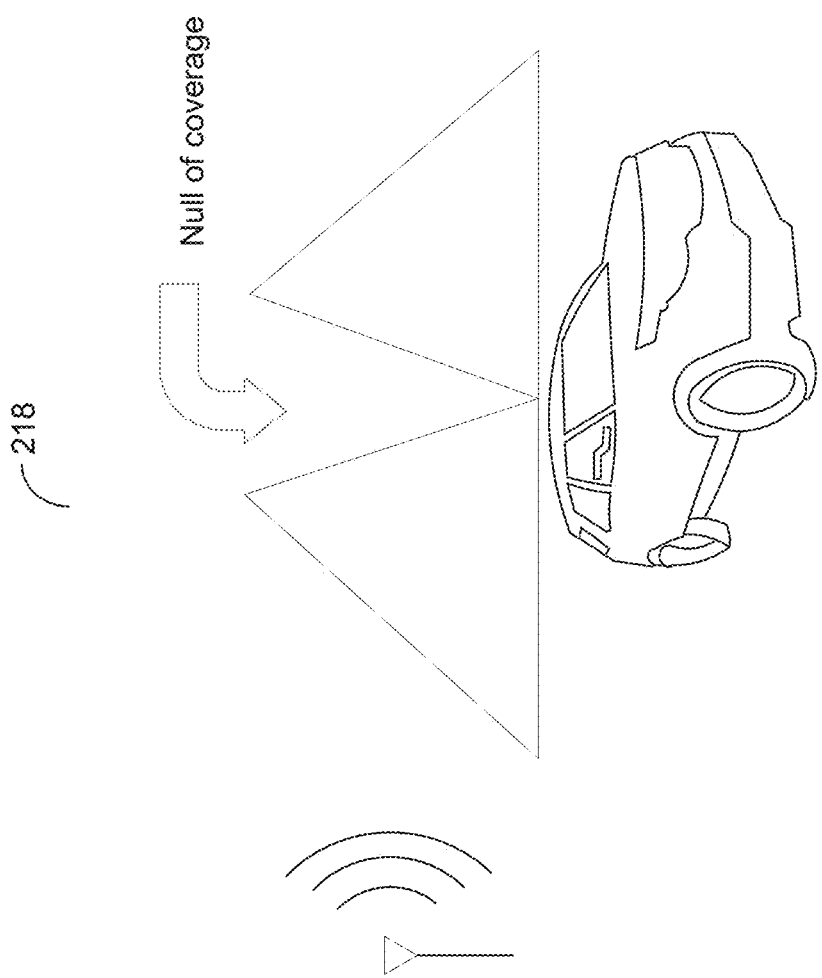

SYSTEMS AND METHODS FOR MILLIMETER WAVE V2X WIRELESS COMMUNICATIONS

CROSS-REFERENCES TO RELATED APPLICATIONS

This application claims the benefit of priority under 35 U.S.C. § 119 to U.S. Provisional Patent Application No. 62/768,722, titled "SYSTEMS AND METHODS FOR MILLIMETER WAVE V2X WIRELESS COMMUNICATIONS," filed on Nov. 16, 2018, which is incorporated herein by reference in its entirety.

FIELD OF THE DISCLOSURE

The present disclosure generally relates to providing millimeter wave vehicle-to-vehicle or infrastructure wireless communications. In particular, systems and methods of the present disclosure provide 11ad+ac switching, an 802.11ad autonomous vehicle connection manager, and efficient compressive sector beam selection.

BACKGROUND OF THE DISCLOSURE

Computing devices can communicate or transmit data between one another using a wireless network. However, as data files become larger, and obstacles impede wireless transmission, latencies or failures can be introduced into the wireless network. Thus, it can be challenging to transmit data over a wireless network due to environmental conditions associated with the wireless network or the computing devices that are transmitting or receiving data files via the wireless network.

SUMMARY OF THE DISCLOSURE

Systems and methods of the present technical solution are directed to at least millimeter wave vehicle-to-vehicle or vehicle-to-infrastructure wireless communications. In particular, systems and methods of the present disclosure provide 11ad+ac switching, an 802.11ad autonomous vehicle connection manager, and efficient compressive sector beam selection.

At least one aspect of the present disclosure is directed to a system for millimeter wave wireless communication. The system can include a first wireless station. The first wireless station can include one or more processors, memory, a first radio frequency (RF) array having a first plurality of elements that form a first plurality of sectors, and a second RF array having a second plurality of elements that form a second plurality of sectors. The first wireless station can transmit a wireless signal. The system can include a second wireless station comprising a third RF array having a third plurality elements that form a third plurality of sectors, one or more processors, and memory. The system can include a connection manager executed by the first wireless station.

The connection manager can retrieve, from a beambook, a first beam configuration for the first wireless transceiver to transmit data to the second wireless station. The connection manager can select, based on the first beam configuration, a first sector of the first plurality of sectors of the first RF array and a first transmission beam width. The connection manager can transmit, using the first sector of the first RF array, data via one or more wireless signals to the second wireless station using the first transmission beam width. The connection manager can communicate, using the first RF array, to the second wireless station using a control channel, signal information. The signal information can include the first transmission beam width. The connection manager can receive, using the first RF array, from the second wireless station via the control channel, feedback information. The feedback information can include an indication to update the beambook with a second beam configuration.

The connection manager can update the beambook based on the feedback information received from the second wireless station to create a second beam configuration. The connection manager can select, responsive to updating the beambook, a second sector of the first plurality of sectors of the first RF array and a second transmission beam width based on the second beam configuration. The connection manager can transmit data, using the first RF array, via one or more wireless signals to the second wireless station using the second sector of the first plurality of sectors and the second transmission beam width. The connection manager can receive, using the first sector of the first RF array, from the second wireless station, a wireless signal having a first signal strength value.

The connection manager can probe, concurrent to transmission of data by the first RF array, a subset of the second plurality of sectors of the second RF array to identify signal strength values for each sector of the second plurality of sectors. The connection manager can identify a candidate sector of the second plurality of sectors. The candidate sector can have a largest signal strength value of the second plurality of sectors. The connection manager can determine the signal strength value of the candidate sector is greater than the first signal strength value. The connection manager can switch data transmissions from the first RF array to the second RF array using the candidate sector of the second plurality of sectors.

In some implementations, the connection manager can select the first sector of the first plurality of sectors based on a predetermined index stored in the beambook in the memory of the first wireless station. The connection manager can select the first sector of the first plurality of sectors and the first transmission beam width based on a function comprising one of a pseudo-random function or a random function. The connection manager can communicate, to the second wireless device, signal information and phase and gain information. The phase and gain information can include the phase and gain values of the first RF array.

In some implementations, the connection manager can use a machine learning technique to update the beambook based on the feedback information received from the second wireless station. Each of the first wireless station and the second wireless station can transmit and receive a plurality of wireless signals in an iterative process to cause the first wireless station to determine the path direction and select the second sector of the first plurality of sectors having the highest gain. The feedback information received from the second wireless station can include information about the signal strength of the wireless signal communicated from the first RF array to the second wireless station.

In some implementations, the connection manager can update the beambook stored in memory of the wireless station with an indication of the sector of the plurality of sectors selected as having the highest gain to the second wireless station. One of the first wireless station or the second wireless station can be coupled to a vehicle that moves at a speed greater than or equal to 40 miles per hour relative to the other of the first wireless station or the second wireless station. The first wireless station can be coupled to a first vehicle, and the second wireless station is coupled to a second vehicle.

In some implementations, one of the first wireless station or the second wireless station is coupled to an unmanned aerial vehicle. The wireless signal can include a frequency between 26.5 GHz and 72 GHz. For example, the wireless signal can include a frequency of one of 28 GHz, 39 GHz, 60 GHz or 72 GHz. In some implementations, the first wireless station uses the first sector of the first plurality of sectors to transmit data to the second wireless station at a data rate of greater than or equal to 1 Gbps. In some implementations, the first wireless station is coupled to a vehicle moving at a speed greater than or equal to 40 miles per hour relative to first wireless station. In some implementations, the first wireless station can use the first sector of the first plurality of sectors to transmit data to the second wireless station at a data rate of greater than or equal to 1 Gbps.

At least one other aspect of the this disclosure is directed to a method of millimeter wave wireless transmission. The method can include transmitting, by a first wireless station, a wireless signal to a second wireless station. The first wireless station can include a first radio frequency (RF) array having a first plurality elements that form a first plurality of sectors, a second radio frequency (RF) array having a first plurality elements that form a second plurality of sectors, one or more processors, and memory. The method can include retrieving, by a connection manager executed by one or more processors of a first wireless station, from a beambook, a first beam configuration for the first wireless transceiver to transmit data to a second wireless station. The second wireless station can include a third RF array having a third plurality elements that form a third plurality of sectors, one or more processors, and memory.

The method can include selecting, by the connection manager, based on the first beam configuration, a first sector of the first plurality of sectors of the first RF array and a first transmission beam width. The method can include transmitting, by the connection manager, using the first sector of the first RF array, data via one or more wireless signals to the second wireless station using the first transmission beam width. The method can include communicating, by the connection manager, using the first RF array, to the second wireless station using a control channel, signal information, the signal information including the first transmission beam width;

The method can include receiving, by the connection manager, using the first RF array, from the second wireless station via the control channel, feedback information. The feedback information can include an indication to update the beambook with a second beam configuration. The method can include updating, by the connection manager, the beambook based on the feedback information received from the second wireless station to create a second beam configuration. The method can include selecting, by the connection manager, responsive to updating the beambook, a second sector of the first plurality of sectors of the first RF array and a second transmission beam width based on the second beam configuration. The method can include transmitting, by the connection manager, data, using the first RF array, via one or more wireless signals to the second wireless station using the second sector of the first plurality of sectors and the second transmission beam width.

The method can include receiving, by the connection manager, using the first sector of the first RF array, from the second wireless station, a wireless signal having a first signal strength. The method can include probing, by the connection manager, concurrent to transmission of data by the first RF array, a subset of the second plurality of sectors of the second RF array to identify signal strength values for each sector of the second plurality of sectors. The method can include identifying, by the connection manager, a candidate sector of the second plurality of sectors, the candidate sector having the largest signal strength value of the second plurality of sectors. The method can include determining, by the connection manager, the signal strength value of the candidate signal is greater than the first signal strength value. The method can include switching, by the connection manager, data transmissions from the first RF array to the second RF array using the candidate sector of the second plurality of sectors.

In some implementations, the method can include selecting the first sector of the first plurality of sectors based on a predetermined index stored in the beambook in the memory of the first wireless station. In some implementations, the method can include selecting, by the connection manager, the first sector of the first plurality of sectors based on a function comprising one of a pseudo-random function or a random function. In some implementations, the method can include communicating, to the second wireless device, signal information and phase and gain information, the phase and gain information including the phase and gain values of the first RF array. In some implementations, the method can include transmitting, by the connection manager to the second wireless station, data at a data rate of greater than or equal to 1 Gbps, wherein the first wireless station is coupled to a vehicle moving at a speed greater than or equal to 40 miles per hour relative to the second wireless station.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION OF THE DISCLOSURE

In a wireless network, environmental conditions can make it challenging to have a high bandwidth or data rate, while providing an extended range of wireless communications. Further technical challenges can be introduced due to obstacles in the environment that can attenuate wireless signals, thereby resulting in reduced data rate or bandwidth, or lost connections. Further technical challenges arise when the wireless computing devices are moving relative to the wireless node or wireless access point (e.g., a wireless access point or node may be fixed, while a vehicle containing a wireless interface is traveling at 50 or more miles per hour).

Systems and methods of the present technical solution are directed to millimeter wave wireless communications. In particular, systems and methods of the present disclosure provide 11ad+ac switching, an 802.11ad autonomous vehicle connection manager, efficient compressive sector beam steering, a mesh network, and dynamic rate adaptation. Thus, systems and methods of the present technical solution can provide for high bandwidth or data rate wireless communications in view of various environmental conditions or obstacles, while providing fast connection or beam steering to communicate with moving wireless stations, for example those coupled to vehicles.

For purposes of reading the description of the various implementations below, the following descriptions of the sections of the specification and their respective contents can be helpful:

Section A describes implementations of systems and methods that provide seamless mode switching.

Section B describes implementations of systems and methods that provide an autonomous vehicle connection management.

Section C describes implementations of systems and methods that provide efficient compressive sector beam steering based on a controller executing on a wireless station.

Section D describes implementations of systems and methods that provide a mesh network.

Section E describes implementations of systems and methods that provide dynamic rate adaptation.

Section F describes a generic computing and network environment which may be used to implement one or more of the computer systems described herein.

A. Seamless Mode Switching

Figure 1A:
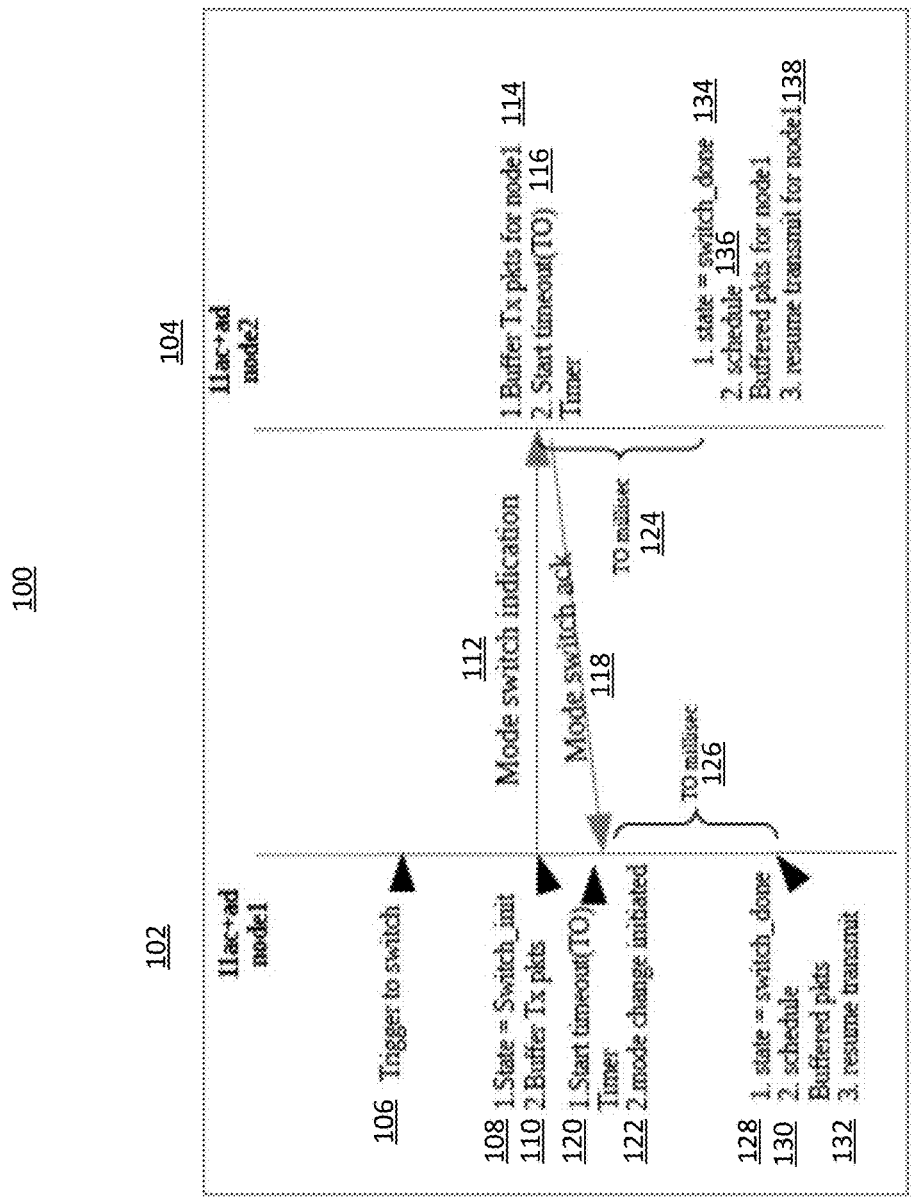
FIGS. 1A-1B illustrative systems and methods of seamless switching in accordance with some implementations.

Referring now to FIG. 1A, depicted is an illustrative flow diagram of an example implementation of seamless mode switching. Seamless mode switching can include, for example, 11ad+ac switching in a seamless manner in which data packets or communications are not impacted or lost, and while minimizing or reducing delay, latency or data transmission errors. The system 100 can include one or more components or functions depicted in FIGS. 6A-6D.

At least one aspect of the present technical solution is directed to systems and methods of 11ad+ac switching. For example, the system can communicate between two peers or two wireless devices, such as a wireless base station and a wireless device. One or more of the wireless base stations, nodes, peers, devices or other component can be located at fixed positions or moving relative to one another. For example, the wireless component can be fixed to road infrastructure, or placed in a moving vehicle (e.g., electric vehicle, gas vehicle, autonomous vehicle, hybrid vehicle, truck, boat, etc.) or aircraft (e.g., drone, piloted drone, unpiloted autonomous drone, etc.).

A wireless communication controller 102 can be configured to perform seamless switching using the flow 100 depicted in FIG. 1A. The switching mechanism 100 can indicate switching between two peers. For example, switching between two peers can include one of the nodes being in routing mode and the other node changes mode between 11ac and 11ad. Mode changes can refer to changes between wireless protocols, such as 802.11ac and 802.11ad as established by a wireless standards body (e.g., IEEE).

Node 102 (e.g., node 1 depicted in FIG. 1A) can interact with node 104 (e.g., node 2 depicted in FIG. 1A). At 106, node 102 can detect a trigger to switch. At 108, node 102 can enter a switch initialize state. At 110, node 102 can buffer transmit data packets. At 112, an indication to perform a node switch can be provided or detected by node 102 or node 104. For example, node 102 can transmit an indication to node 104 to switch modes.

At 114, node 104 can buffer transmit packets for node 102. At 116, node 104 can start a time out ("TO") timer. At 118, node 104 can send an acknowledgment of the mode switch indication back to the node 102 that initiate the node switch. Node 104 can then execute the timeout timer for the predetermined number of milliseconds at 124.

At 120, node 102 can begin a timeout timer. At 122, node 102 can initiate the mode change. Node 102 can then execute the timeout timer for the predetermined number of milliseconds at 126.

At 128, node 102 can determine the switch has completed and change the state to switch done. At 130, the node 102 can schedule processing or transmission of the buffered packets. At 132, node 102 can resume transmission of the buffered packets.

At 134, node 104 can also switch the state to switch done. At 136, node 104 can also schedule buffered packets for node 102. At 138, node 104 can resume transmitting packets for node 102.

Figure 1B:

Referring now to FIG. 1B, switching between an access point ("AP") 142 and a wireless client device 144 or wireless station ("STA") is shown. The switching flow 101 can be used by an access point 142 and wireless client devices 144 where the nodes in the basic service set (e.g., a component of the IEEE wireless local area network architecture where an access point 142 is connected to a wired network and a set of wireless stations 144 communicate with the access point 142). The components in the wireless network can use a fixed common mode, and the mode switch information can be carried in beacons using one or more modes such as 802.11ac and 802.11ad.

At 146, the access point 142 can execute, or detect a trigger to switch. The source of the trigger can be from the access point 142 itself, or from an external source, such as another wireless client device 144. At 148, the access point 142 can change its state to switch initiated. At 150, the access point 142 can set the beacon IE to indicate a mode change. The beacon IE can refer to an indication or frame of a beacon. At 158, beacons with the mode change IE set are transmitted.

At 152, the access point 142 can buffer transmit packets. At 154, the access point 142 can start a timeout timer. At 156, the access point can initiate a mode change. The access point can initiate the timeout timer for the predetermined number of milliseconds at 168.

At 160, the wireless station 144 can detect the beacon with the mode change IE set (158). At 160, the wireless station 144 can change its state to switch initiation. At 162, the wireless access point 142 can buffer transmit packets. At 164, the wireless station 144 can start a timeout timer. At 166, the wireless station 144 has initiated the mode change. The wireless station 144 then executes the timeout timer for the predetermined number of seconds at 170.

At 172, the access point 142 can change its state to switch done. At 174, the access point 142 can purge the mode change IE in the beacon such that the beacon no longer indicate mode change. At 176, the access point 142 can schedule the buffered packets. At 178, the access point can resume transmission of the buffered packets.

At 180, the wireless station 144 can set its state to switch done. At 182, the wireless station can schedule buffered packets. At 184, the wireless station can resume transmission of the buffered packets.

During a timeout period, the access point or wireless station may or may not transmit or receive data packets. The timeout period can refer to a period during which the device is switching a mode.

B. Autonomous Vehicle Connection Management Systems and Methods

Figure 2A:
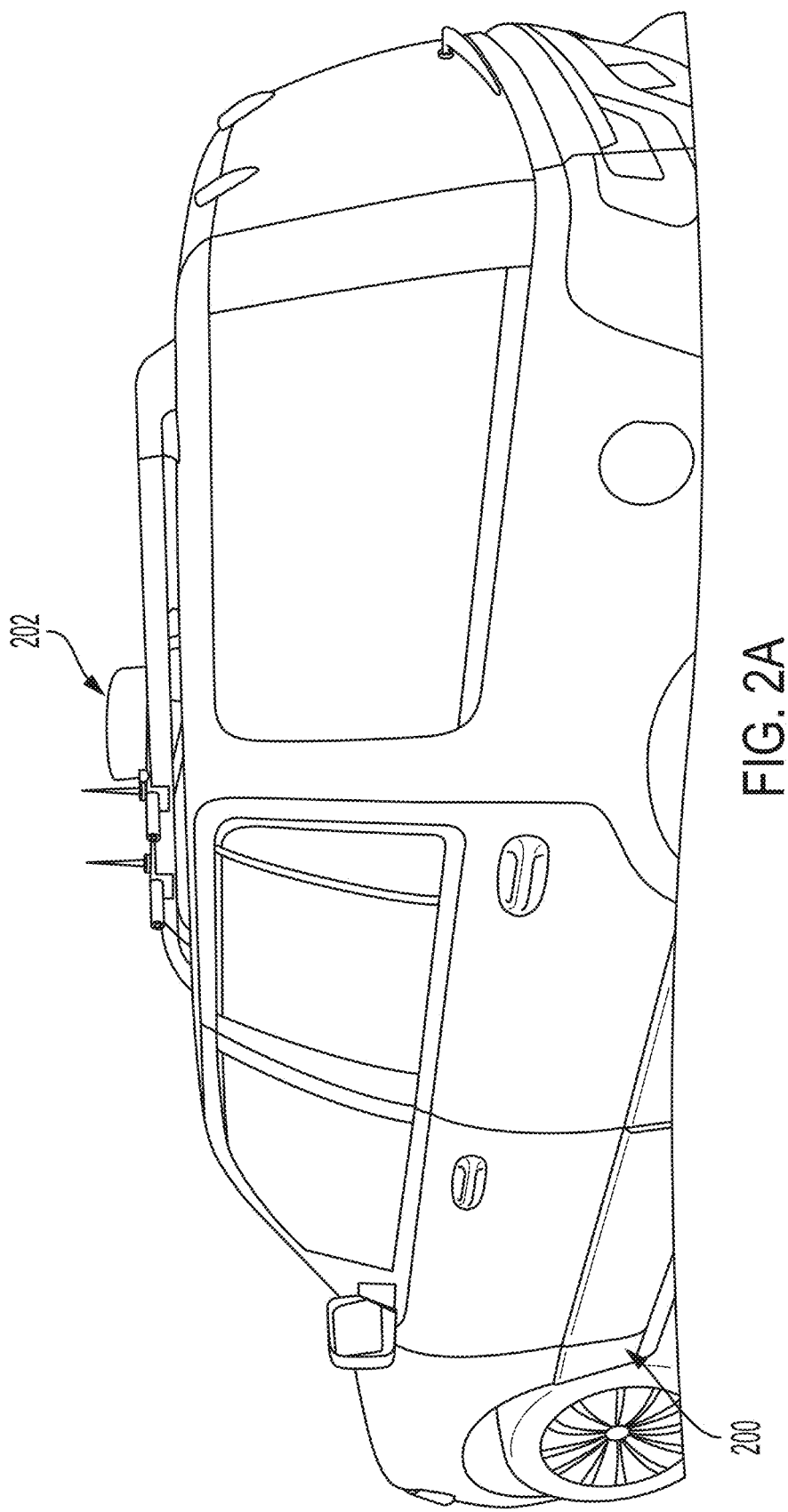
FIGS. 2A-V illustrate systems and methods that provide an autonomous vehicle connection management in accordance with some implementations.

FIG. 2A depicts an autonomous vehicle (AV) 200 with at least one radiofrequency (RF) antenna unit 202 installed thereon. The functionality of the RF unit 202 detailed herein can be implemented using the one or more components of the system described in FIGS. 6A-D. The AV unit 200 can contain two 802.11ad sparrow+baseband radio interfaces with three different RF/antenna module configuration options. These 802.11ad RF/antenna modules 202 are located within the dome on top of the AV unit 200. Radio® can support an antenna array of eight RF/antenna modules 202 configured in a 2×4 arrangement, and can toward the front-left and front-right of AV platform. Radio1 can enable eight RF/antenna modules configured in a 2×4 arrangement, and can point toward the back-left and back-right of AV platform.

Standard codebook from QCA may support 8-way or 4-way diversity codebook. The beam patterns established from the released codebook may not result in optimal wave forms. Other configurations can be also allowed (for example, 2×2 with 2×4, or 2×4 with four-way diversity). System performance may be subject to limitations due to co- and adjacent channel interference.

To estimate when to schedule to roam to a road-site unit (RSU), the following information can be delivered via the management interface (e.g., Windows Management Interface): angle of arrival (AOA), time of flight (TOF), and channel impulse response (CIR), among others. Estimation of when the performance is degrading may be based on the signal quality index (SQI) and received signal strength indicator (RSSI) scores, and can be augmented by the parameters AOA, TOF, and CIR.

| Contention Based Access Protocol | | |
| --- | --- | --- |
| Beam codebook | Description | Application |
| 8-tile 2 × 4 MMA—1 RX Sector | 8-tile AP and STA Directed RX with one boresight sector using 25 chains Higher gain, limited coverage | General networking Directed OMNI mode discovery for longer range |
| 1-tile 1 RX and 1 TX Sector | Acts as a feed to Parabolic dish antenna | General networking Standard OMNI discovery mode |
| 4-tile 4-way diversity | Diversity 16 TX sectors per tile Single chain OMNI per tile | General networking 4-way diversity mode |
| 8-tile 2 × 4 MMA—128 sectors and 31 RX sectors V2X mode, 64 sectors | 8-tile AP and STA One OMNI Sector OMNI discovery Dynamic RFIC selection | 128 TX sectors and 31 RX sectors V2X mode upto and above 50 mph |

| Non-Contention Based Access Protocol | | |
| --- | --- | --- |
| Beam codebook | Description | Application |
| 8-tile 2 ×∝MMA—1 RX Sector | 8-tile AP and STA Directed RX with one boresight sector using 25 chains Higher gain, limited coverage | General networking Directed OMNI mode discovery for longer range |
| 1-tile 1 RX and 1 TX Sector | Acts as a feed to Parabolic dish antenna | General networking Standard OMNI discovery mode Used in conjunction with Cassegrain parabolic reflector |
| 4-tile 4-way diversity | Diversity 16 TX sectors per tile Single chain OMNI per tile | General networking 4-way diversity mode |
| 4-tile 2 × 2 MMA V2X mode, 64 sectors | 4-tile AP and STA 32 RX TX sectors One OMNI Sector OMNI discovery Dynamic RFIC selection | General networking V2X V2X mode upto and a bove 50 mph |

Figure 2B:
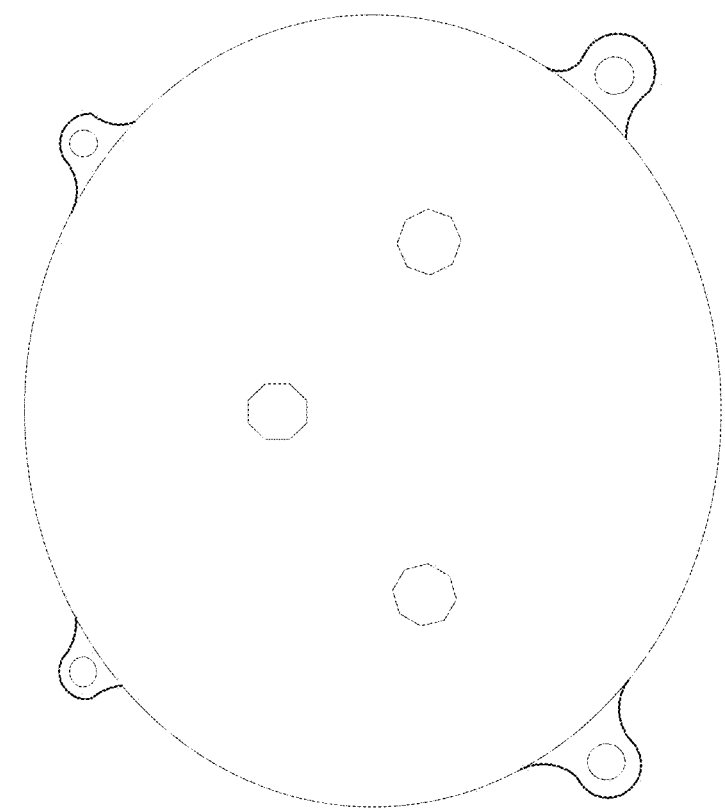
Figure 2B:
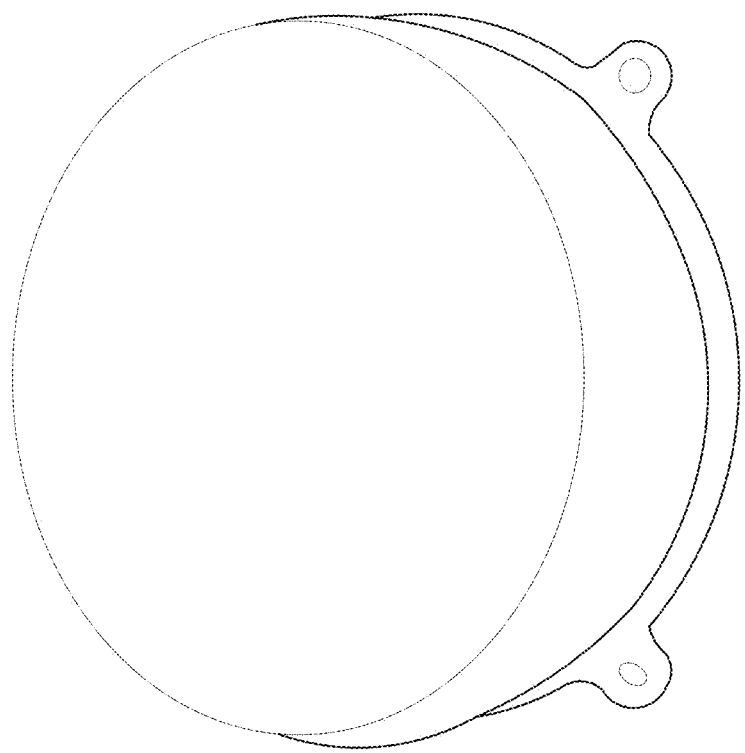
Figure 2C:
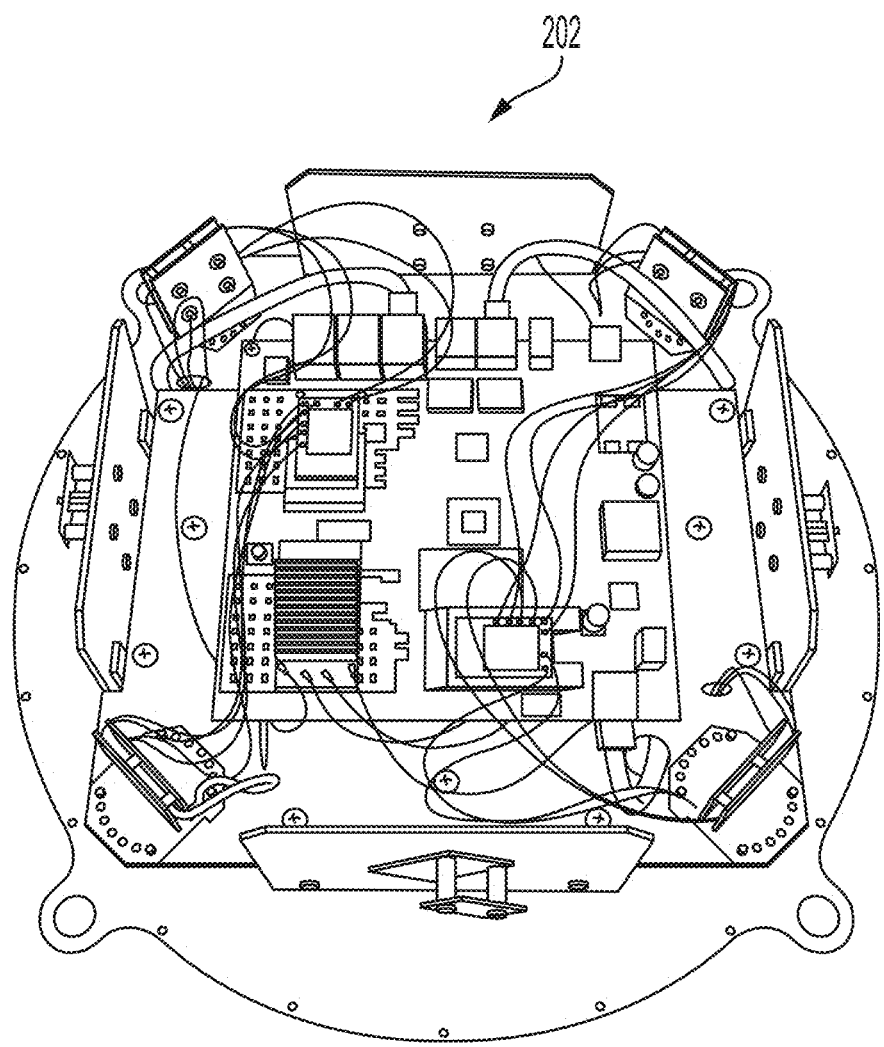
Figure 2D:
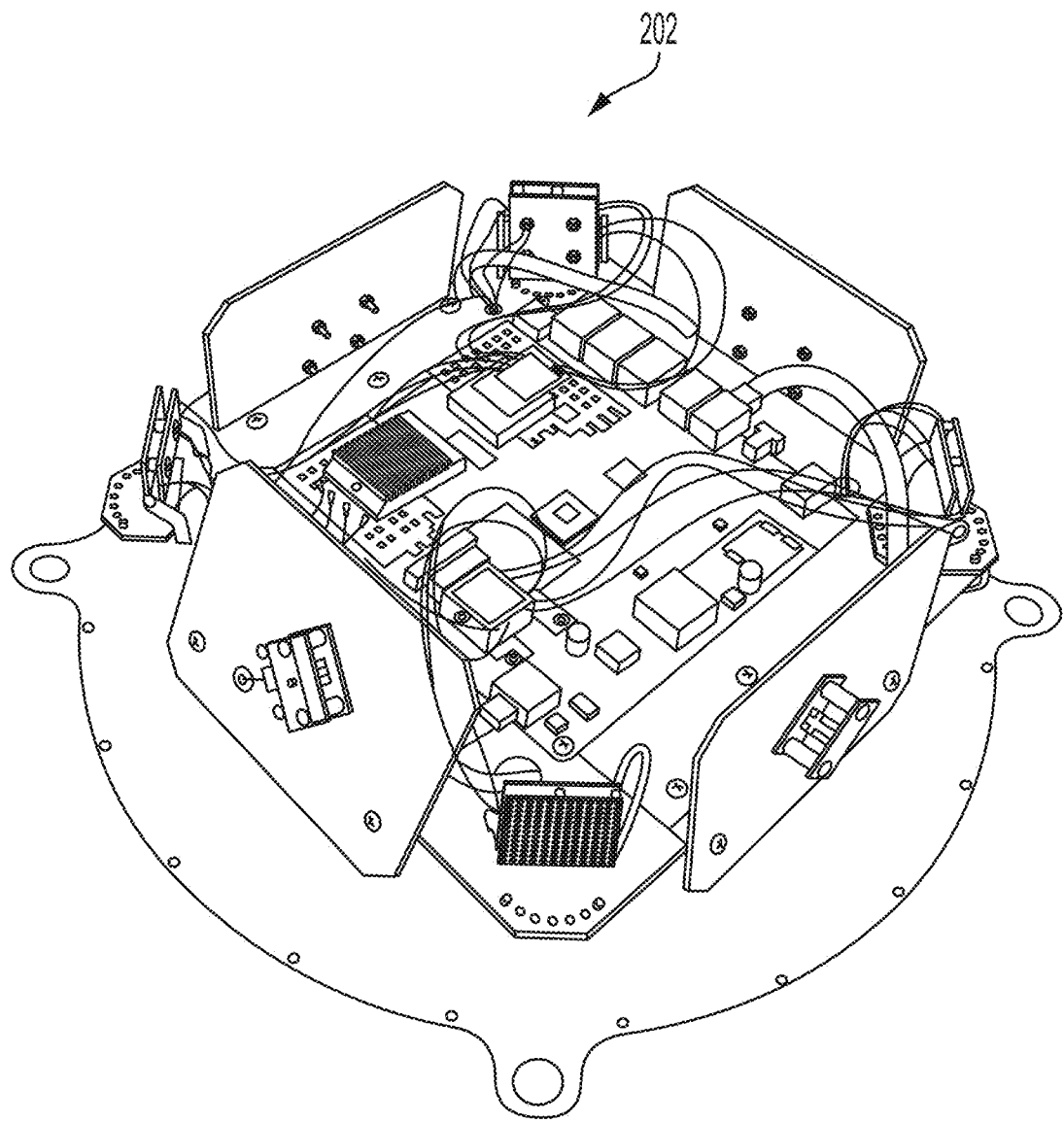
Figure 2E:
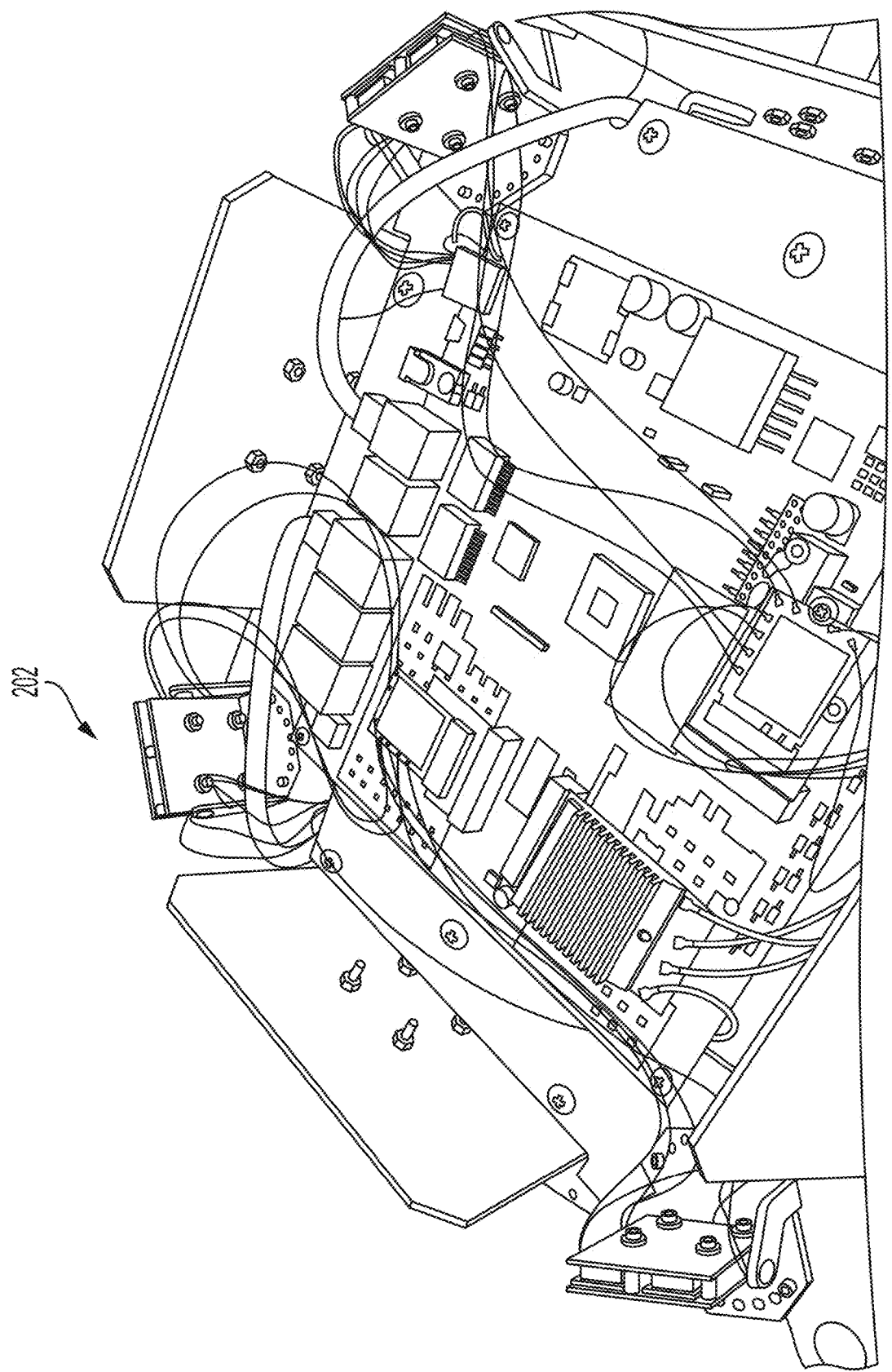
Figure 2F:
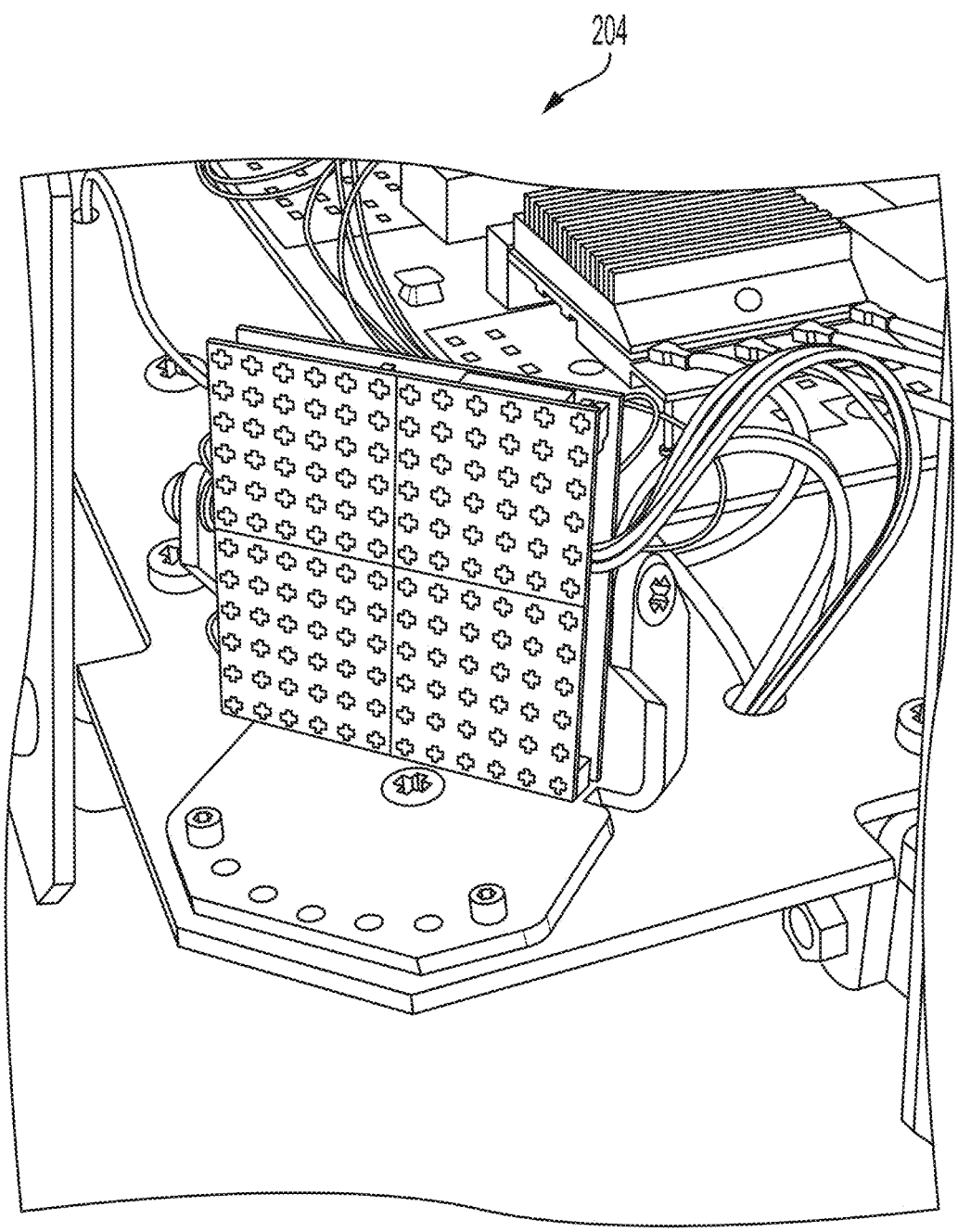
Figure 2G:
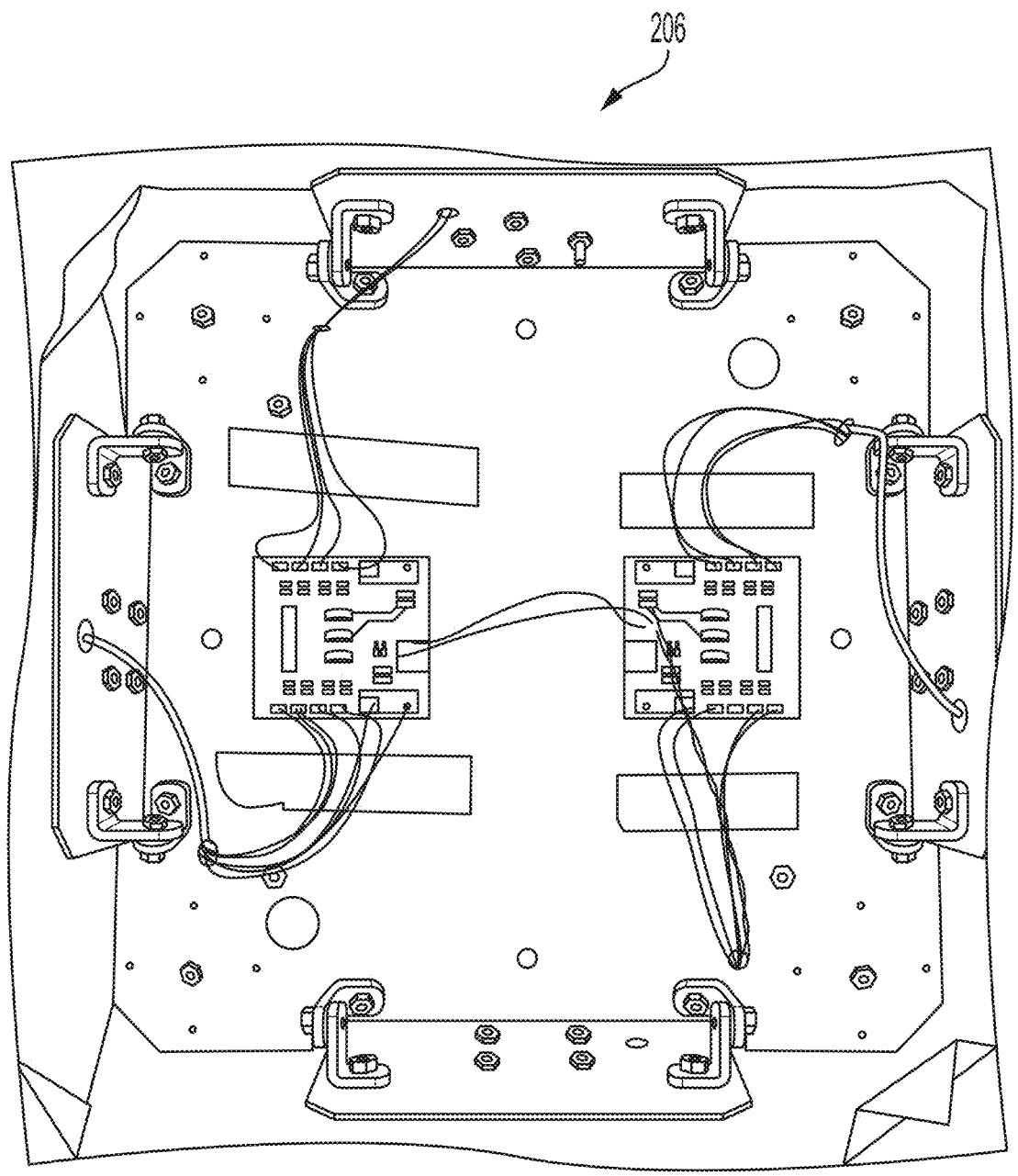
Figure 2H:
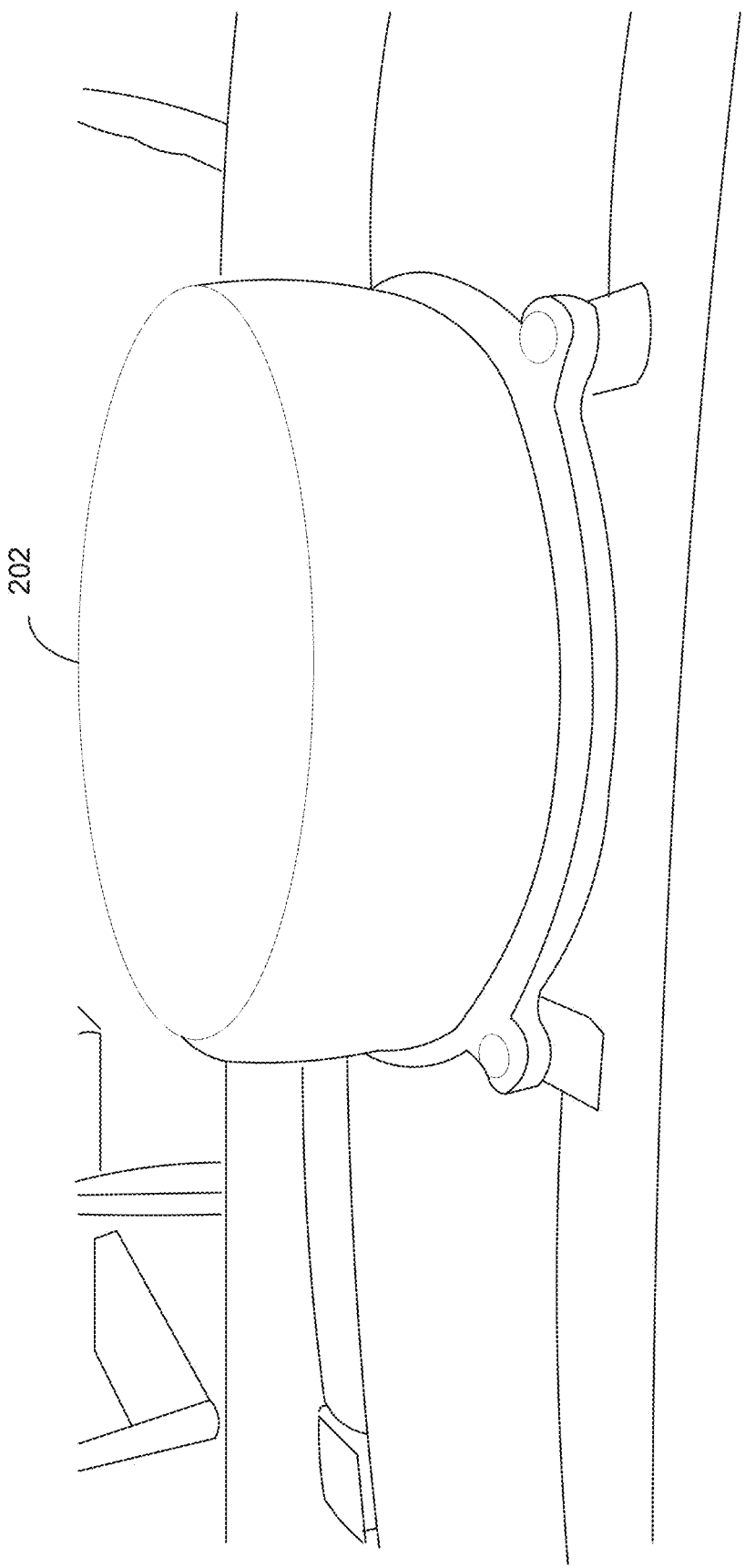

FIG. 2B depicts a top side of the RF unit 202 and a bottom side of the RF unit 202. FIGS. 2C-E depict an electrical circuit within the RF unit 202. FIG. 2F depicts an antenna 204 within the RF unit 202. FIG. 2G depicts an underside electronic circuitry 206 of the RF unit 202. FIG. 2H depicts the RF unit 202 installed on top of the AV unit 200. FIG. 2I depicts a cycle 208 of the functionality of the RF unit 202. FIG. 2J depicts a block diagram 210 of the modules in executing the functionalities of the RF unit 202.

Figure 2K:
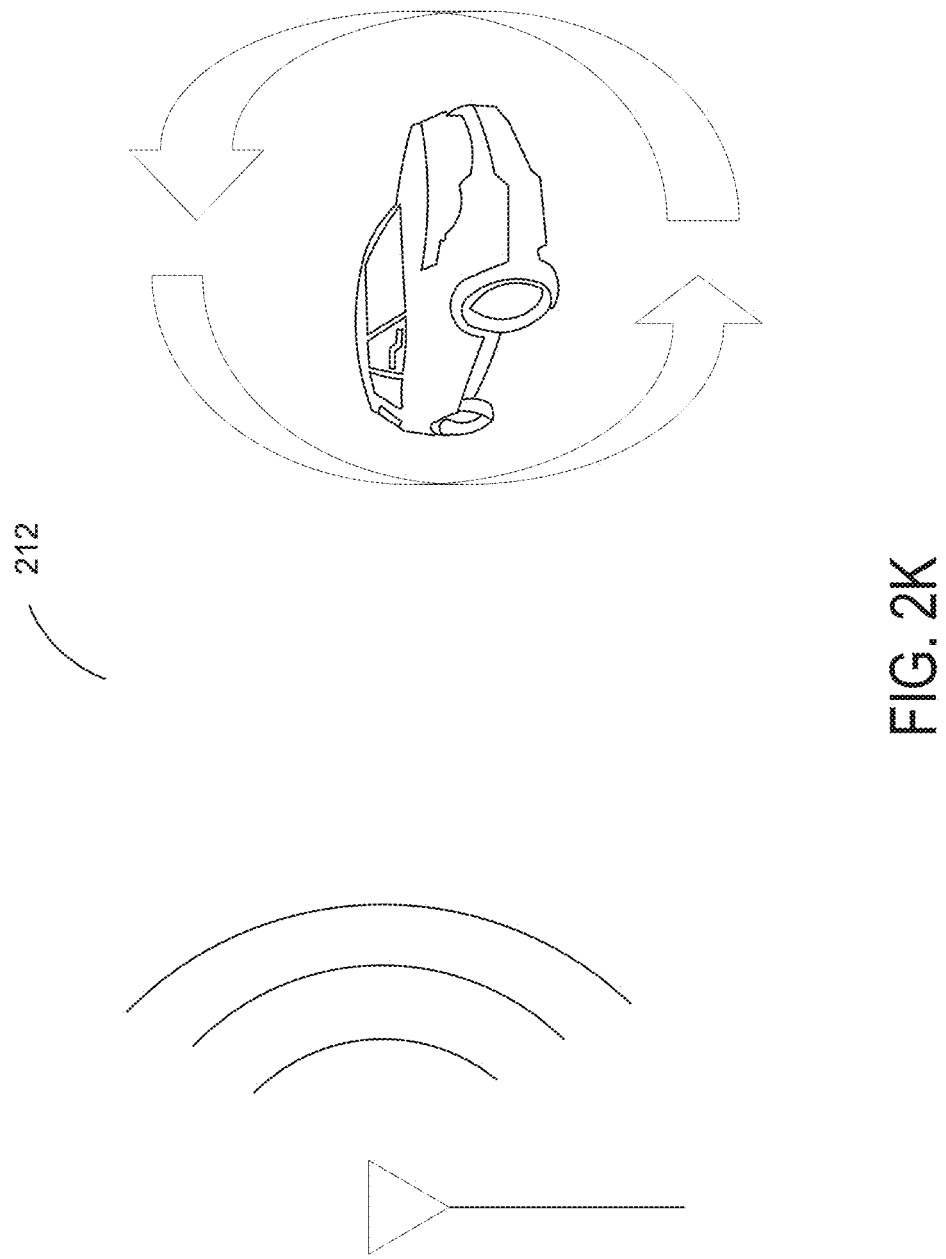
Figure 2J:
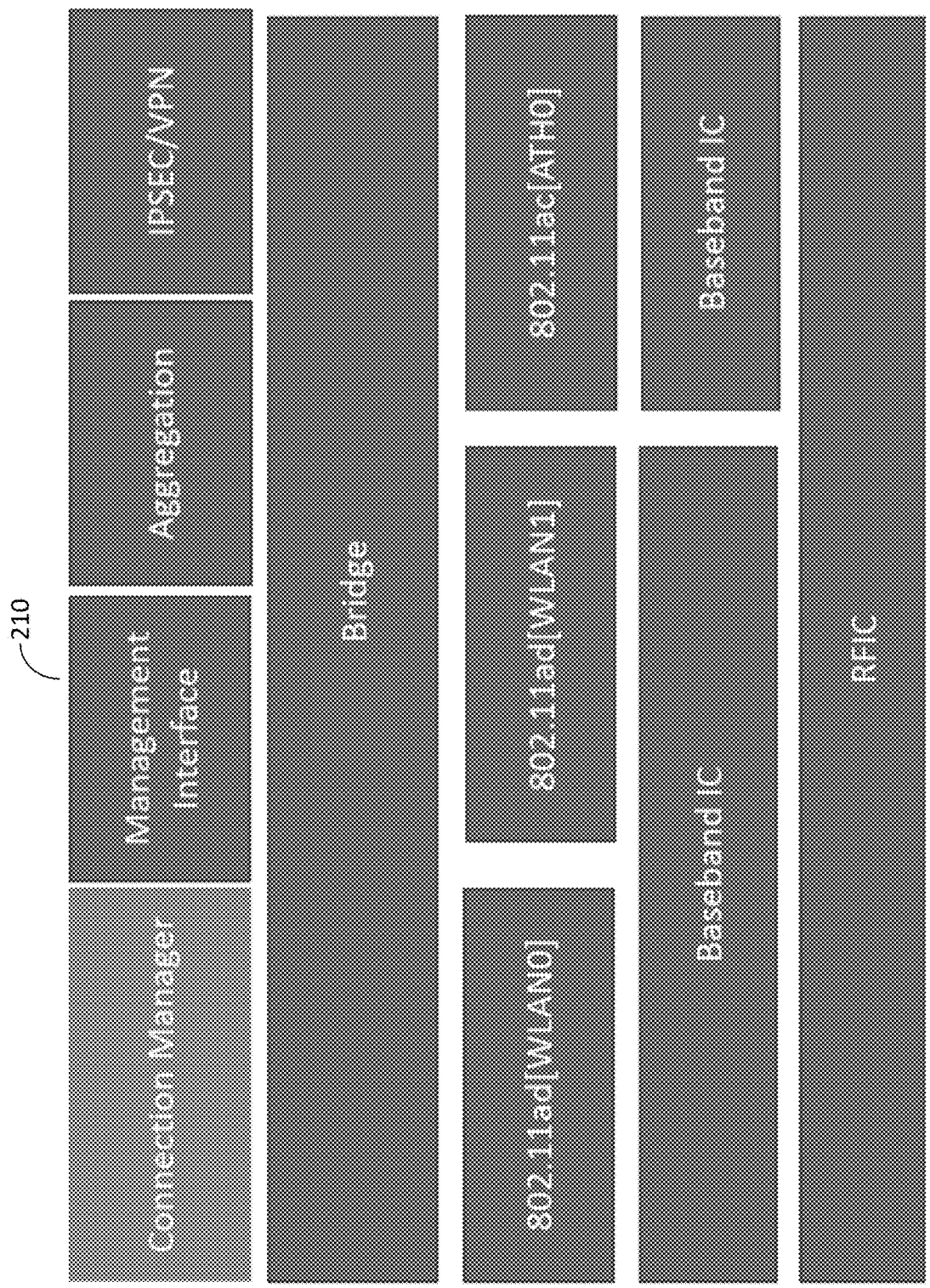
Figure 2K:
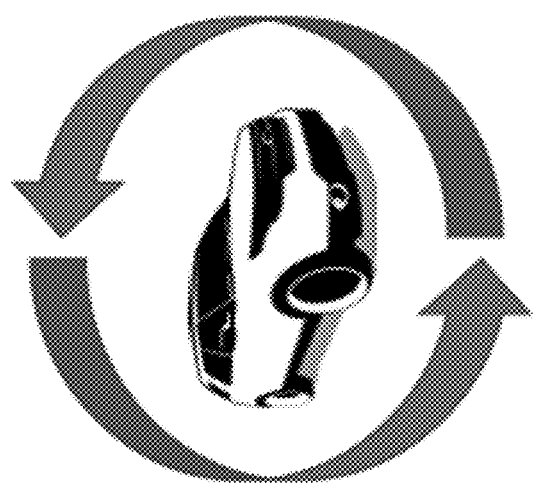
Figure 2K:
Figure 2L:
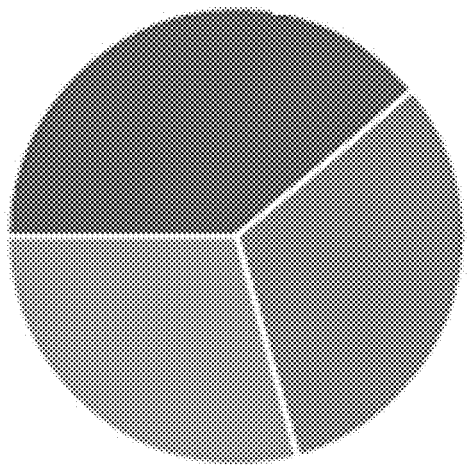
Figure 2M:
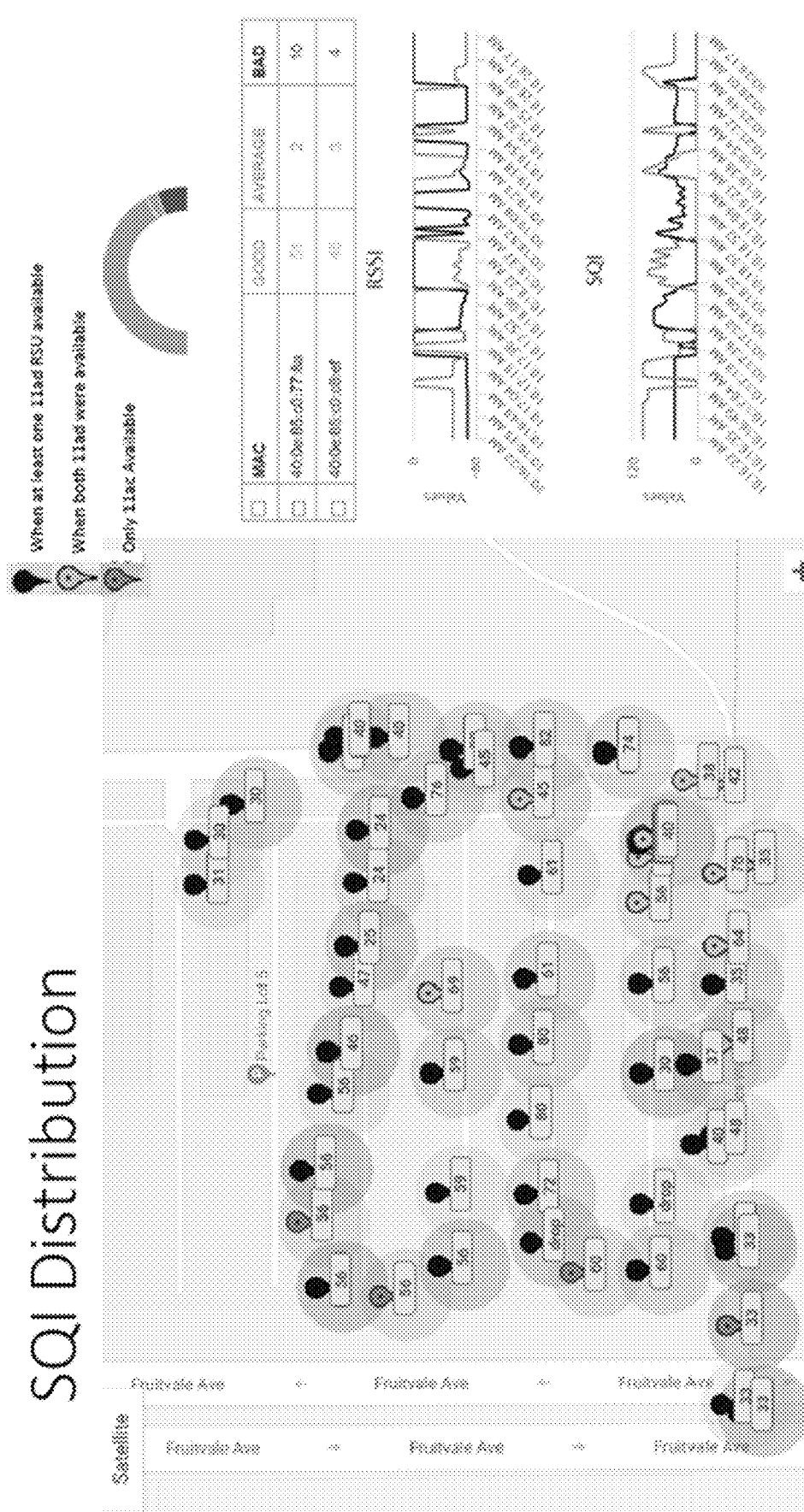
Figure 2N:
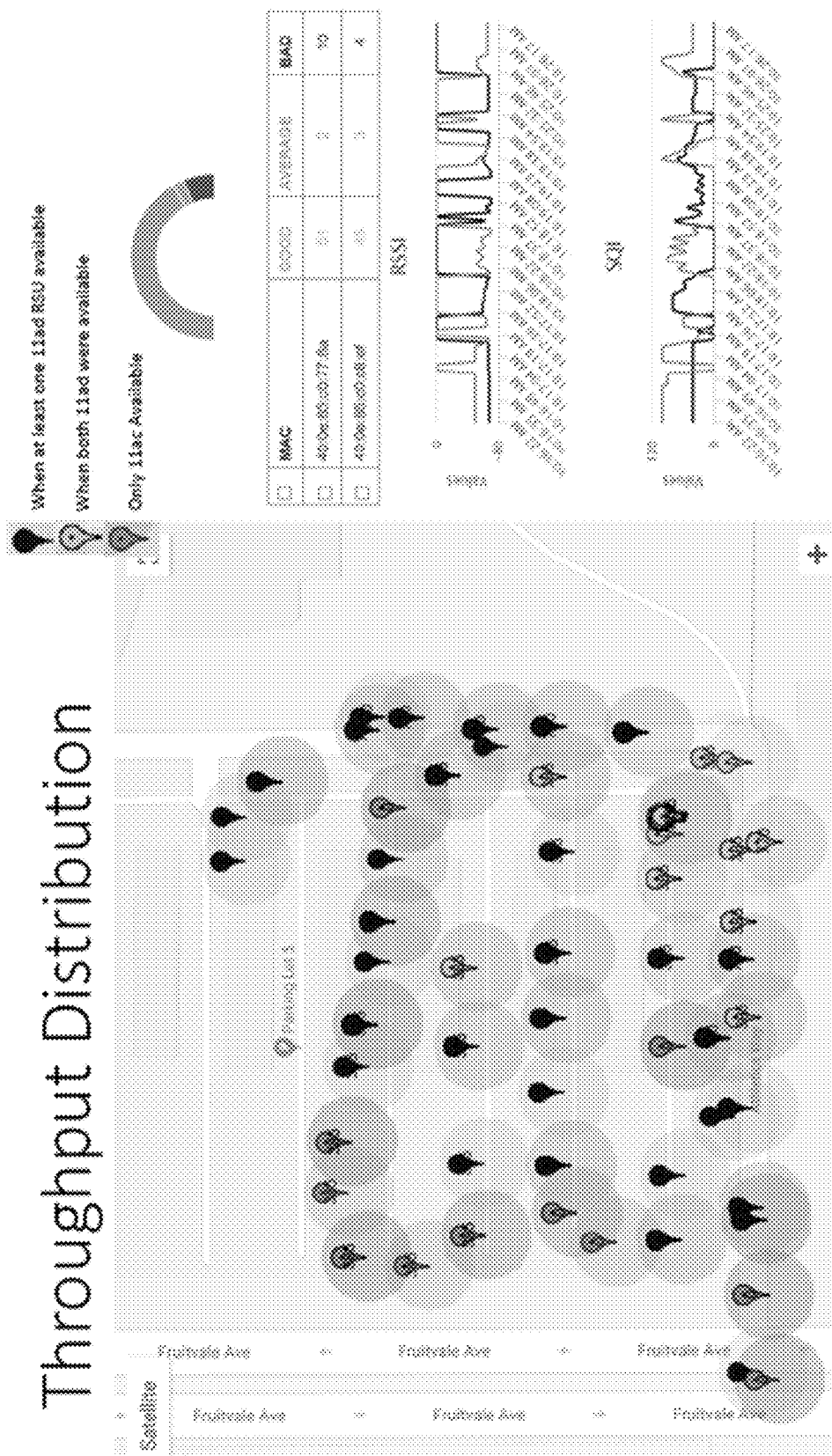

FIG. 2K depicts an environment 212 to test 360 degree coverage and handover between radios. In the environment 212, whether 802.11ad can cover 360 degrees and how smoothly the handover can be performed between the radio units can be tested. There can be one RSU powered on that can include 11ac and 11ad radio units. The connection manager can scan on all 4 plates as the vehicle moves at an average speed of 5 MPH. The connection manager can attempt to maintain connectivity with the RSU on 11ac or 11ad as the vehicle constantly moves. In between the radio plate connection establishment routine, the AV may transition to 11ac where signal is available. Timestamp on events taking place at the AV will be gathered by an application to plot the radio coverage map, which can be later viewed on desktop computer using a map application. FIG. 2L depicts a number of switches between the radio units, as well as related statistics. FIG. 2M depicts SQI distribution versus location. FIG. 2N depicts a throughput distribution versus location.

Figure 2P:
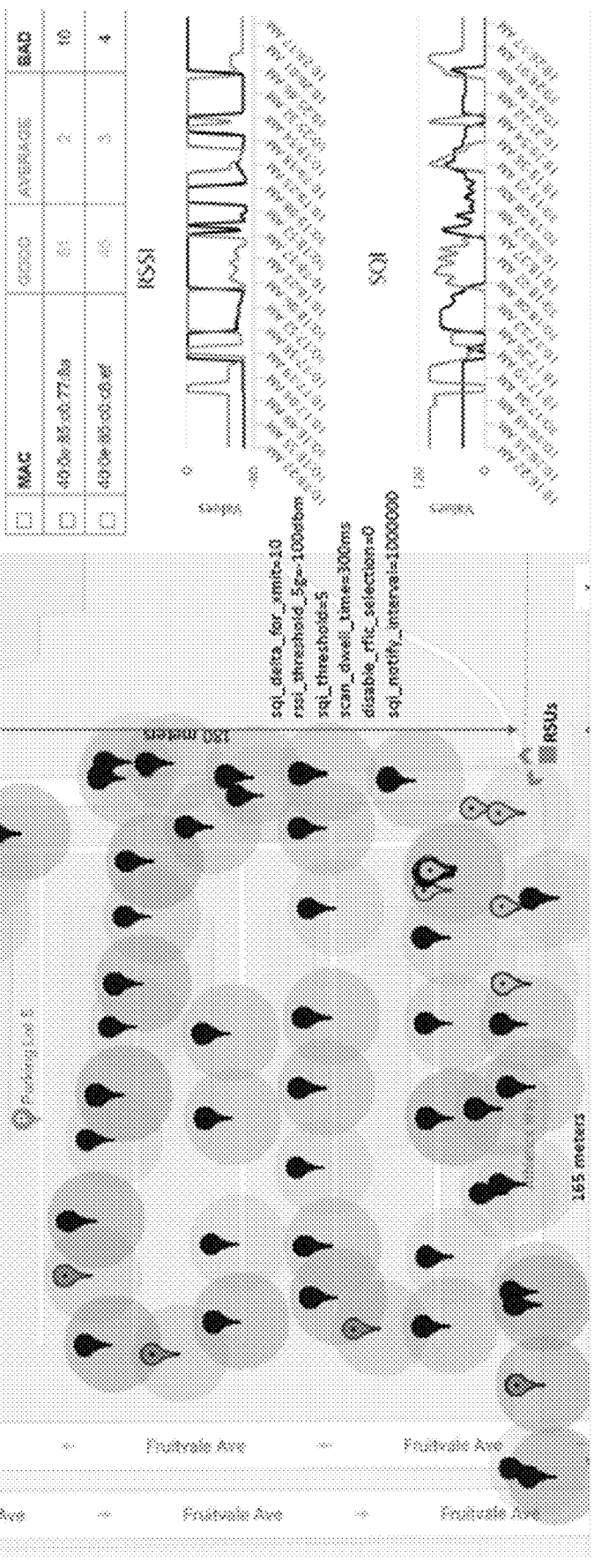
Figure 2Q:
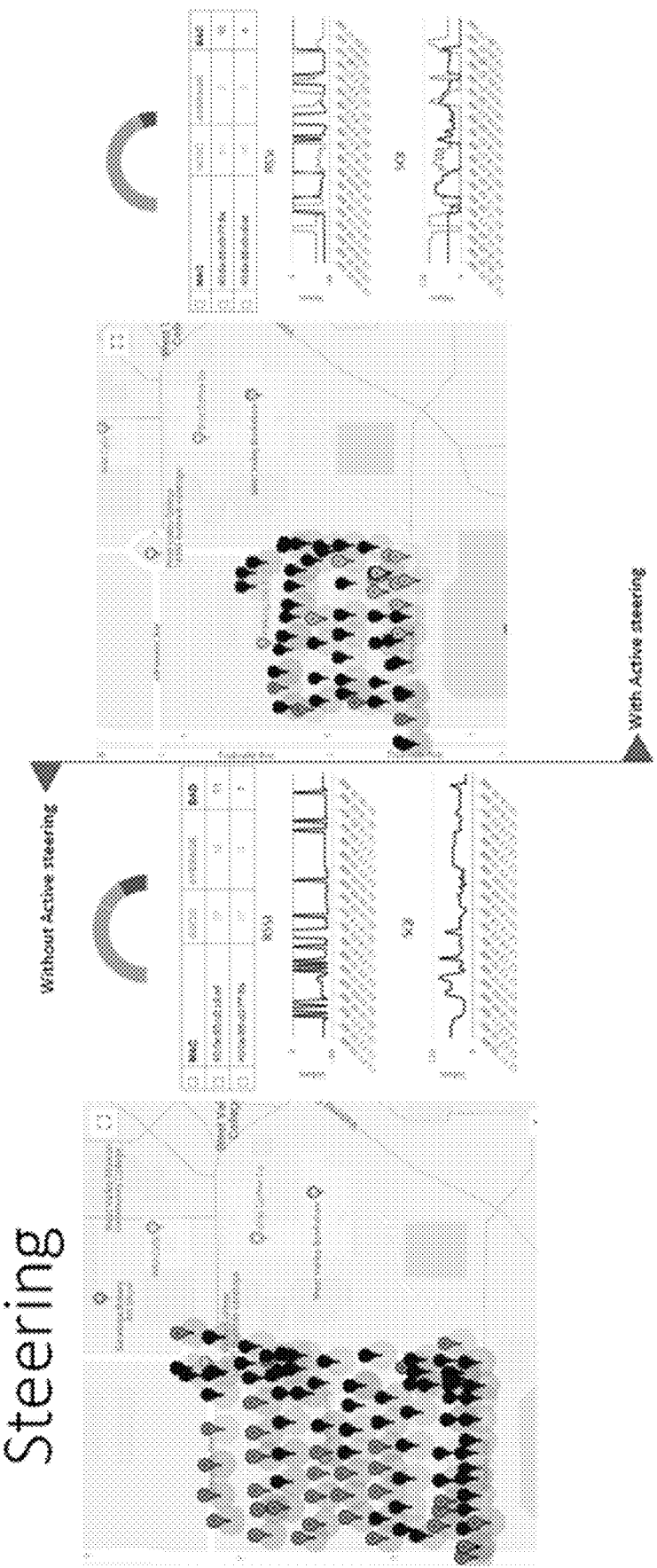
Figure 2R:
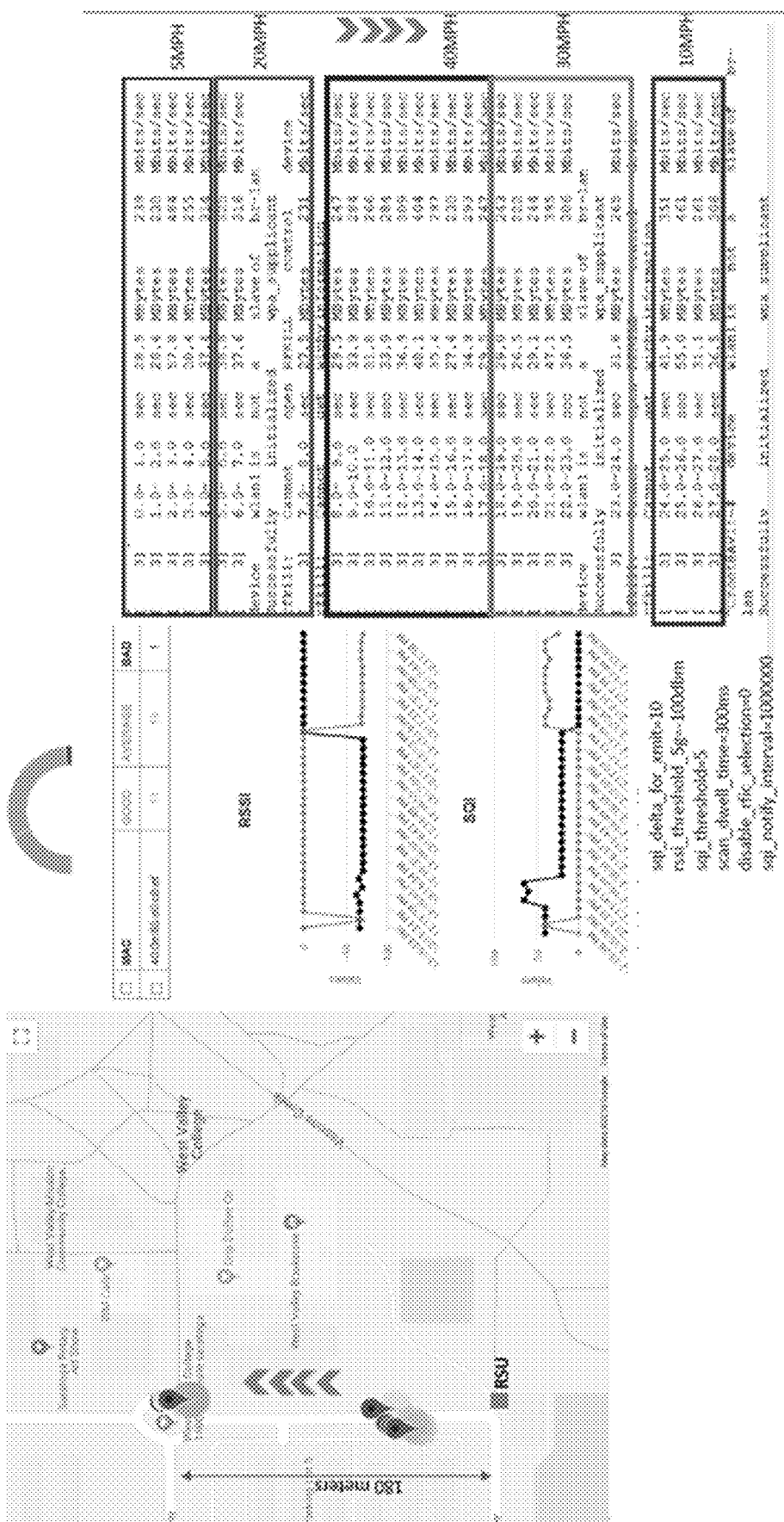

FIG. 2O depicts an environment 214 to test handover between radios and vehicle speed. FIG. 2P depicts handover statistics with the vehicle moving between 5 to 10 MPH with Radio-Frequency Integrated Circuit (RFIC) steering enabled. FIG. 2Q depicts a juxtaposition of the handover statics with and without RFIC steering. In the test environment 214, there can be one RSU powered on that can include 11ac and 11ad radio units. The connection manager can scan on all 4 plates as the vehicle moves at varying speeds. The connection manager can attempt to maintain connectivity with the RSU on 11ac or 11ad as the vehicle constantly moves causing it to lose connection on the 11ad plate that it is was originally connected to, but to be regained on another plate. In between the radio plate connection establishment routine, the AV may transition to 11ac where signal is available. Timestamp on events taking place at the AV will be gathered by an application to plot the radio coverage map that can be later viewed on desktop computer using a map application. Vehicular speed test can include moving towards RSU and moving away from RSU. FIG. 2R depicts a plot of throughput versus vehicular speed 5, 10, 20, 30, 40 MPH with following variations, such a radio-plate transition WLAN0-RF_PLATE0, WLAN0-RF_PLATE1, WLAN1-RF_PLATE0, WLAN-RF_PLATE1, ATH0.

FIG. 2S depicts an environment 216 with multiple RSUs to test RSU handover with variable vehicle speed and switching time. In environment 216, there can be two RSUs powered on with 11ac and 11ad radio units integrated. The connection manager can scan on all 4 plates as the vehicle moves in at varying speeds attempting to hold simultaneous connection to both RSUs. The connection manager will attempt to maintain connectivity with the RSUs that have both 11ad and 11ac as the vehicle constantly moves causing it to loose connection on the 11ad plate that it was originally connected to, but to be regained on another plate. The vehicle can use a "parked" connection to the second RSU to demonstrate seamless 11ad to 11ad connection. There may be occasions where the AV may choose to transition to a "parked" 11ac connection if neither of the two 11ad on the two RSUs are available for connection attachment. Timestamp on events taking place at the AV can be gathered by an application to plot the radio coverage map that can be later viewed on desktop computer using a map application. A plot of throughput versus vehicular speed 5, 10, 20, 30, 40 MPH with following variations, such a radio-plate transition WLAN0-RF_PLATE0, WLAN0-RF_PLATE1, WLAN1-RF_PLATE0, WLAN-RF_PLATE1, ATH0, can be made.

Figure 2U:
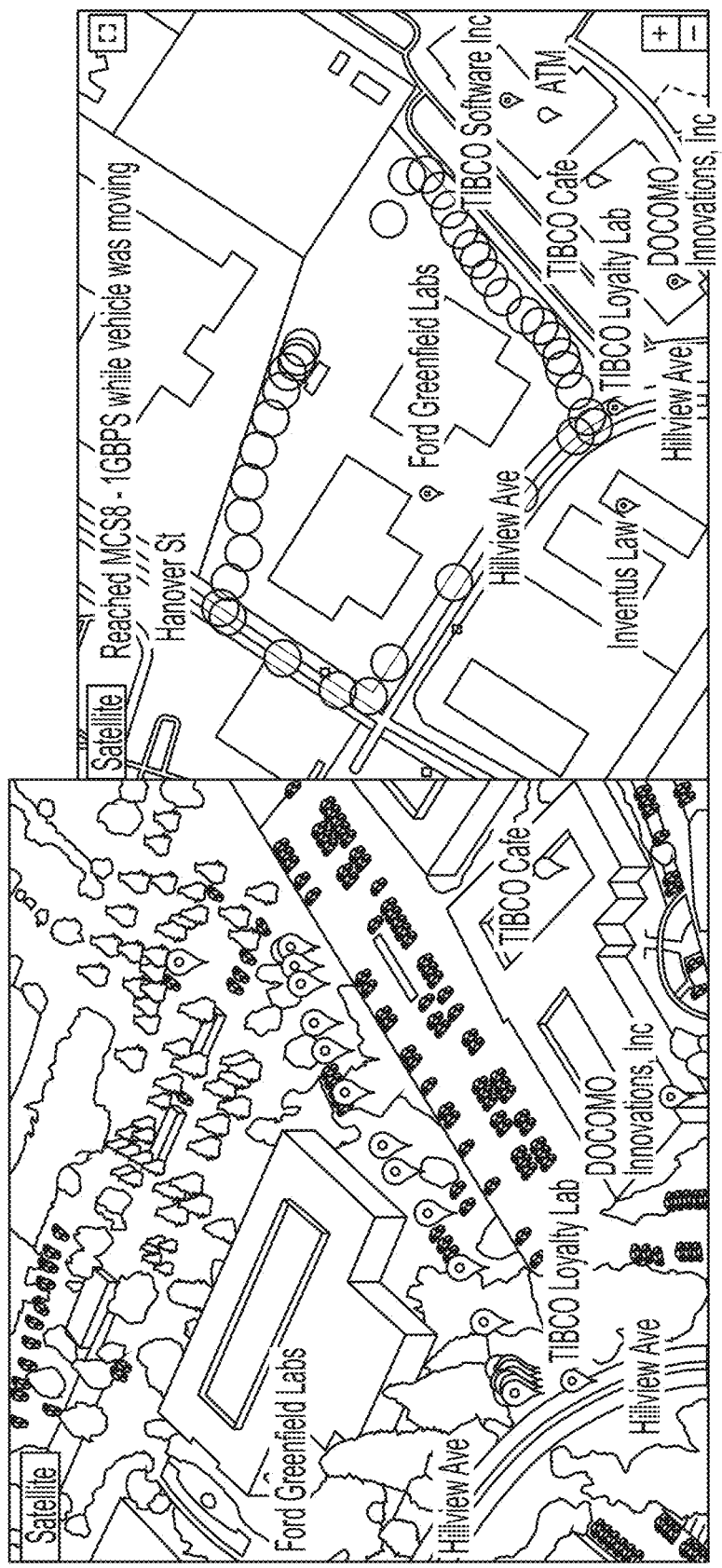
Figure 2V:
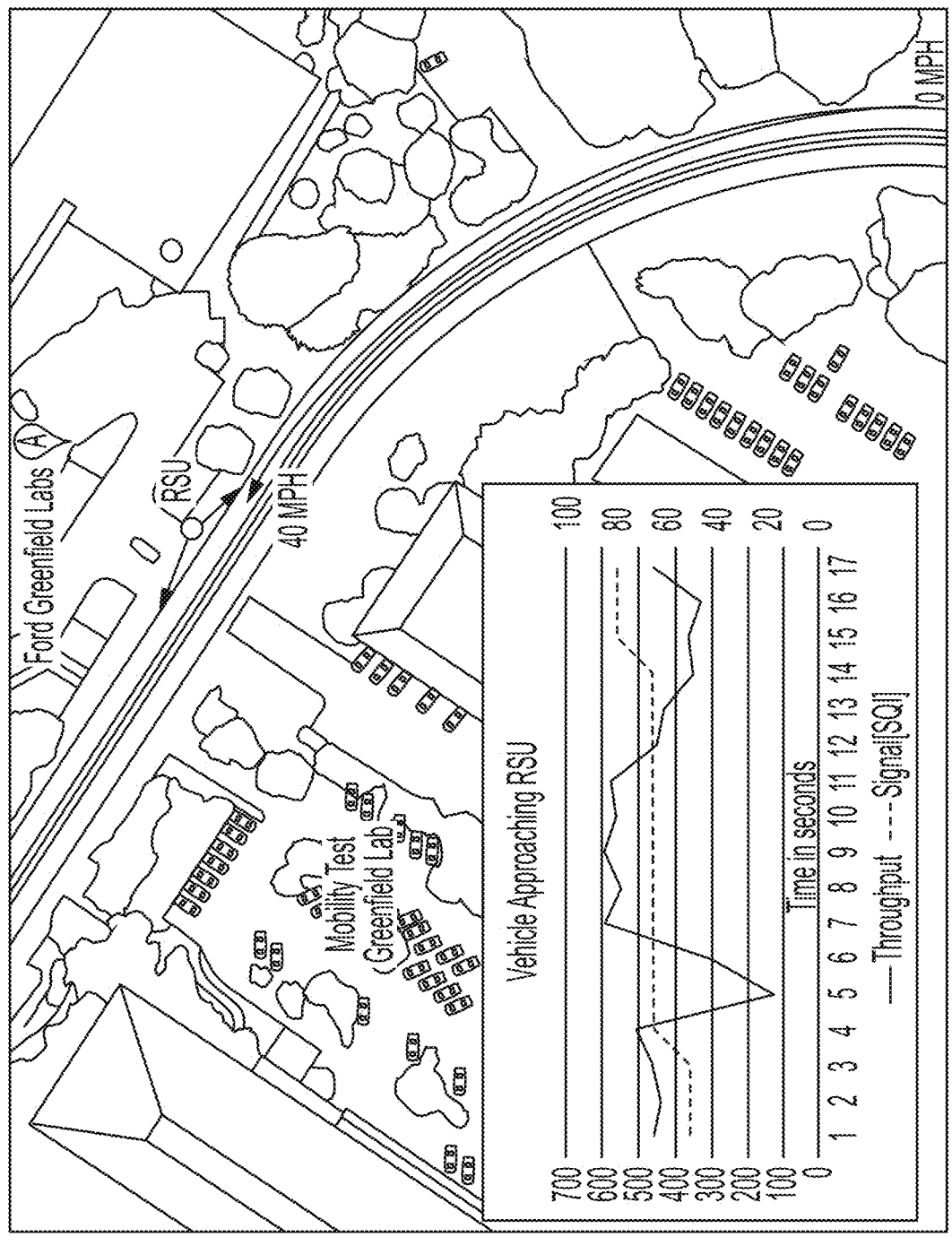

FIG. 2T depicts an environment 218 to test elevation coverage to minimize null between radios at a given vehicle speed. In environment 218, there can be one RSU powered on with 11ac and 11d radio units integrated. The connection manager can scan on all 4 plates as the vehicle moves at average speed of 5 MPH. The connection manager can attempt to maintain connectivity with the RSU on 11ac or 11ad as the vehicle constantly moves causing it to loose connection on the 11ad plate that it is connected to, but to be regained on another plate. In between the radio plate connection establishment routine, the AV may transition to 11ac where signal is available. Timestamp on events taking place at the AV can be gathered by an application to plot the radio coverage map that can be later viewed on desktop computer using a map application. FIG. 2U depicts a plot of coverage heat map of 11ad+11ac versus location. FIG. 2V depicts throughput and SQI as the AV unit approaches the RSU.

C. Compressive Sector Beam Steering for Autonomous Vehicle Connection

Due to high path loss impacting millimeter wave wireless signals, it can be challenging to achieve high data-rates in real-world environments. Further, as the distance between wireless stations increases, or as wireless stations moves relative to one another, it can be challenging to maintain effective communications at satisfactory data rates. To achieve data-rates of multiple GBPS in 60 GHz millimeter-wave (mm-wave) communication systems, this technology can use efficient beam-steering functions or techniques. To find the optimal steering direction on IEEE 802.11ad compatible devices, wireless stations can sweep through all predefined antenna sectors. Due to high path loss in the 60 GHz millimeter-wave (mm-wave) band, IEEE 802.11ad systems may use directional antennas to focus their energy in the direction of the receiving node. To change the radiation patterns of these antennas and to enable beam steering during runtime, the systems and methods of this technical solution can employ antenna arrays that offer a programmable interface to change gains and phases in discrete steps per antenna element.

However, searching all beam combinations can result in a large search space. Hence, practical IEEE 802.11ad systems may use a set of predefined beam patterns, so-called sectors. A sector sweep (SSW) algorithm may select the optimal sector to connect to another node. The system can perform an extensive search which may be very time consuming, as all sectors may be probed. To improve performance, protocols may establish links with less overhead or proactively switch to alternative beam alignments. For instance, a hierarchical beam-search can probe sectors with wide beams first and can continue with subsectors featuring narrow beams until it finds the best one. Compressive sensing techniques, instead, may not evaluate all available antenna settings. Due to spatial similarities in different antenna sectors, these algorithms may probe a subset and determine the best selection by correlating the probes.

To address these issues, systems and methods of this technical solution can use a compressive path tracking technique for optimized sector selection. The system can integrate with the sector sweep algorithm of IEEE 802.11ad devices. Using this technique, two stations can mutually exchange probing frames to determine the received signal strength per sector and then choose the sector with maximum signal strength $p_n$ for communication. The selected sector $\hat{n}$ out of N probed sectors can be fed back to the transmitter:

$$\hat{n} = \underset{n}{\mathrm{argmax}}\, p_n.$$

The functionality detailed herein can be implemented using the one or more components of the systems described in FIGS. 6A-D.

Since this technique scales linearly with the number of sectors in a training set, the technique may be appropriate for low numbers of sectors, and become inefficient or resource intensive as the number of sectors increases. To reduce training complexity, compressive path tracking of this technical solution can reduce the search space to a subset of all sectors in a training set and may thereby provide higher efficiency with lower time overhead and a search complexity of log N. Instead of probing all sectors, compressive path tracking can pseudo-randomly vary phase shifts of the antenna elements to produce random beam patterns. The receiver can select the most dominant path to the transmitter by correlating the received signal strength with the expected beam patterns. Additional phase information can enable multi-path estimation. Such compressive algorithms may achieve high efficiency and accuracy for antenna arrays with hundreds of elements.

The systems and methods of this technical solution can adapt the non-coherent path-tracking approach. Instead of relying on random beam patterns, the system can use the beam patterns defined by sectors that perform well. Additionally, the systems and methods of the present disclosure can extend the search space to three dimensional patterns to accommodate realistic environments. This approach can be performed in two steps. First, a random subset of M out of N sectors can be selected and supplied by the antenna (e.g., a radio frequency array) to the path a signal took to arrive at a receiver. The subset can be used to determine the best of the original N sectors which optimize the signal strength in the estimated direction. In the first step, the systems and methods of the present disclosure can probe all M sectors resulting in M received signal strength values $p_m$, where $m \in [1, M]$. Second, the random sectors can be correlated with expected patterns to determine path direction. Using the correlation and the path direction, the sector with the highest gain can be derived.

The technical solutions presented herein can extend this approach by implementing a connection manager, which can automatically probe, select, and connect to wireless stations based on signal strength values. The systems and methods described herein can provide a method for updating a beambook, which can contain phase and gain values for elements of RF arrays used to transmit wireless signals. The phase and gain values can cause the RF arrays to transmit beams in a multitude of different patterns (e.g., sectors). The connection manager may use feedback information from one or more wireless stations to determine the optimal sector (e.g., highest reported signal gain compared to other sectors, highest signal to noise ratio compared to other sectors, etc.) for an RF array. Additionally, the connection manager can probe other wireless channels using different RF arrays while simultaneously communicating with one or more wireless stations. If the connection manager determines that a different RF array can transmit/receive signals with a greater signal strength value (e.g., greater signal gain, greater signal to noise ratio) than an RF array used for current communications, the connection manager can silently switch the RF array communicating with the one or more wireless stations to a different RF array.

Figure 3A:
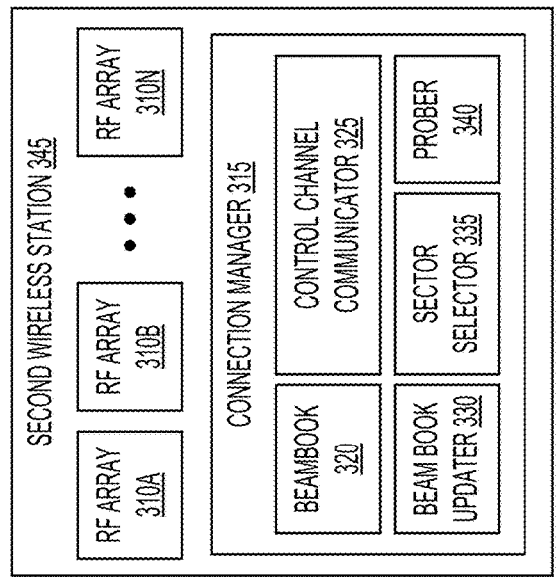
FIG. 3A illustrates an example implementation of a system for adaptive millimeter wave wireless communications, in accordance with an implementation.
Figure 3A:
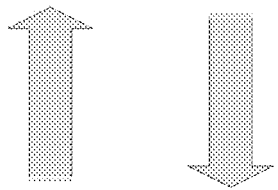
Figure 3A:
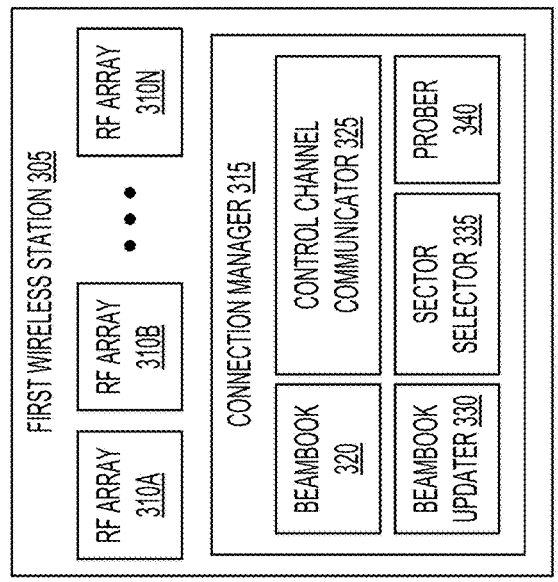

Referring now to FIG. 3A, depicted is an example implementation of a system 300A for adaptive millimeter wave wireless communication. The system 300A can include or interface with one or more wireless stations. For example, the system 300A can include at least one first wireless station 305. The system 300A can include at least one second wireless station 345. The first wireless station 305 can include at least one RF array 310A-N (which can be referred to as RF array 310). The first wireless station 305 can include at least one connection manager 315. The connection manager 315 can include at least one beambook 320. The connection manager 315 can include at least one control channel communicator 325. The connection manager 315 can include at least one beambook updater 330. The connection manager 315 can include at least one sector selector 335. The connection manager 315 can include at least one prober 340. The second wireless station 345 can include one or more component or functionality of the first wireless station 305. The second wireless station 345 can contain the same components, and operate in the same manner as the first wireless station 305 as described herein. Although most operations described herein are from the perspective of the first wireless station 305, it should be understood that any and all operations of the first wireless station can be executed, performed, or otherwise carried out by the second wireless station 345, and vice-versa. In some implementations, one or more of the functions of the first wireless station 305 or the second wireless station 345 (e.g., the functions of the connection manager, etc.) can be performed by a server that is remote from the respective wireless station in a cloud computing environment.

The first wireless station 305 can include at least one processor and a memory, i.e., a processing circuit. The memory stores processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The first wireless station 305 can include one or more computing devices or servers that can perform various functions.

The second wireless station 345 can include at least one processor and a memory, i.e., a processing circuit. The memory stores processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The second wireless station 345 can include one or more computing devices or servers that can perform various functions.

The RF arrays 310 of the first wireless station 305 and the second wireless station 345 can be configured to transmit and receive wireless signals to and from other wireless communication devices. The RF arrays 310 can be configured by one or more applications executing on the first wireless station 305 to transmit and/or receive wireless signals in one or more directions. In some implementations, each of the RF arrays 310 are phased-array antennas, capable of beam steering, otherwise referred to as beam forming. In some implementations, a RF array 310 can be configured by modifying a phase value and a gain value associated with each element of a RF array 310. For example, one or more applications (e.g., the connection manager 315) can modify the phase value and the gain value of each element of a RF array 310 to change the shape, direction, and/or power of the transmission beams from the RF array. Beam forming can include directing the beam in a predetermined direction relative to the RF array 310. One or more applications executing on the first wireless station 305 can change the direction at which each RF array 310 can receives wireless signals (e.g., one or more beams transmitted from the second wireless station 345).

The first wireless station 305 can transmit a wireless signal using at least one of the RF arrays 310. The wireless signal can have a frequency that is less than, greater than, or equal to 60 GHz. The wireless signal can be used to communicate one or more data packets to the second wireless station. The first wireless station 305 can communicate with other wireless devices using one or more frequency bands, and/or one or more wireless channels, for example a frequency between 26.5 GHz and 72 GHz, such as 28 GHz, 39 GHz, 60 GHz, or 72 GHz, among others. For example, one RF array 310A may communicate with wireless device(s) using a first direction, frequency, and/or wireless channel configuration. Concurrently, RF array 310B may communicate with other wireless device(s) using a different direction, frequency, and/or wireless channel configuration. In some implementations, the first wireless station 305 can communicate with other wireless device(s) using at least one of the protocols defined by the 802.11 standard (e.g., 802.11ad). The wireless signals transmitted and received by the first wireless station 305 can communicate data at a data rate of greater than or equal to 1 Gbps (a billion bits per second). In some implementations, transmitting data using at least one of the RF arrays 310 can include transmitting metadata about the wireless signal. For example, the first wireless station 305 can communicate status information of each of the RF arrays 310 using a control channel. The status information can include phase information (e.g., a definition of a position of a point in time on a waveform cycle, represented in degrees or radians), line-of-sight information (e.g., the number of wireless signals detected by an RF array 310), or information regarding other signals received by the RF arrays 310 (e.g., identifier values associated with each of the signals, data rate of each signal, etc.).

The connection manager 315 can be executed, for example, by one or more processors included in the first wireless station 305. The connection manager 315 may be maintained as computer executable instructions resident in the memory of the first wireless station 305. In some implementations, each of the components (e.g., the beambook 320, the control channel communicator 325, the beambook updater 330, the sector selector 335, and the prober 340) of the connection manager can be stored as computer executable instructions resident in the memory of the first wireless station 305. In some implementations, some or all of the components listed herein above are implemented using a dedicated processing circuit (e.g., an FPGA or an ASIC, among others). Although the functionalities detailed herein may be described as being performed by a specific component or element, each of the components of the connection manager 315 listed herein above can perform any of the functionalities detailed herein. In some implementations, the connection manager 315 can establish, maintain, and/or abolish wireless communications using one or more of the RF arrays 310.

The beambook 320 can include one or more configurations of the elements of each of the RF arrays 310 of the first wireless station 305. The beambook 320 and/or the configurations contained within it may be stored in one or more data structures in the memory of the first wireless station 305. The configurations can alter the gain and phase of each element of the RF arrays 310, causing the RF arrays 310 to change the direction, shape, and power of transmitted signals. This can be advantageous, for example, where particular directional beams are used. For example, certain conditions (e.g., bad line of sight, distance, etc.) may cause omnidirectional beams to be impractical. The beambook 320 can include instructions, configuration data, and other information to cause the phase and gain of each element of the RF arrays 310 to change to a recorded type. In some implementations, the beambook 320 can include information about one or more sectors. A sector can be a specific configuration for an RF array 310, and may include configuration data about the phase and gain of the elements of the RF array 310. A sector configuration can cause the RF array 310 to transmit wireless signals in a particular beam direction, shape, and/or power. The first wireless station 305 can update the beambook 320 based on feedback information from another device (e.g., the second wireless station 345, among others). Each of the RF arrays 310 can be associated with a respective beambook stored within one or more data structures in the memory of the first wireless station 305. In some implementations, one or more groups of RF arrays 310 may be associated with a respective beambook stored within one or more data structures in the memory of the first wireless station 305.

The connection manager 315 can retrieve, from the beambook resident in one or more data structures stored in the memory of the first wireless station 305, a first beam configuration for at least one RF array 310. For example, upon powering on the first wireless station 305, the connection manager 315 may begin executing and retrieve an initial beam configuration. In a non-limiting example implementation, the initial configuration may be an omnidirectional beam configured to detect as many external wireless devices as possible. In some implementations, the first beam configuration may be a random sector configuration. The first beam configuration may define which of the one or more RF arrays 310 are used to transmit and receive data. In some implementations, the connection manager 315 may retrieve more than one beambook 320 from memory. For example, each RF array 310 may be associated with a respective beambook, and the connection manager 315 can retrieve each beambook from memory to access a respective first beam configuration for each RF array 310. In some implementations, one or more groups of RF arrays 310 may be associated with a respective beambook, and the connection manager 315 can access the respective beambook to retrieve a respective first beam configuration for the group of RF arrays 310.

The sector selector 335 can select, based on the first beam configuration, a first sector of the plurality of sectors formed by at least one RF array 310 and at least one beam width. The sector selector can parse the data structure containing a beam configuration (e.g., the first beam configuration retrieved by the connection manager 315) to determine one or more phase and gain values. Based on the phase and gain values, the sector selector can apply the phase and gain values to at least one RF array 310, to cause the transmission patterns of the RF array 310 to conform to a sector defined by the beambook 320, thereby selecting a sector for the RF array 310. In some implementations, the sector selector 335 can select sectors for other RF arrays 310 by assigning gain and phase values to their respective elements. The gain and phase values can be retrieved by parsing one or more beam configurations access from their respective beambook 320 resident in memory of the first wireless station 305.

In some implementations, the sector selector 335 can select a sector by accessing a predetermined index value in memory. For example, a default beam configuration for at least one RF array 310 may be resident in an indexed data structure in the memory of the first wireless station 305. The sector selector 335 can access the default beam configuration to determine one or more predetermined phase and gain values, and apply those values to the elements of at least one RF array 310, thereby selecting a sector for that RF array 310. In some implementations, the sector selector 335 can select random phase and gain values based on a pseudo-random number generator or a random number generator. For example, the sector selector 335 may generate a random phase and gain value for each of the elements of a RF array 310, thereby generating a random beam pattern (sector) for that RF array 310. In some implementations, the random phase and gain values may be bound by one or more constraints, so as to not generate beam patterns which are completely ineffective, or beam patterns which may be undesirable (e.g., transmission power above a predetermined threshold, beam direction/width beyond the scope of the application, etc.). In some implementations, the sector selector 335 can select sectors as described herein above and below for more than one RF array 310.

The connection manager 315 can transmit data using the sectors (e.g., beam configurations) selected by the sector selector 335 for the RF arrays 310. The data can include one or more data packets for transmission to an external wireless device (e.g., the second wireless station 345). In some implementations, transmitting data can include transmitting metadata about the first wireless station 305, including total transmission power of all the RF arrays 310, location data about the first wireless station 305, and the uptime of one or more applications (e.g., the connection manager 315 and is corresponding components), among others. In a non-limiting example, the sector selector 335 has selected a wide beam in a first direction forming a first sector for the RF array 310A as the first beam configuration. The connection manager can access memory to retrieve one or more data packets, and send them to the RF array 310A for transmission using the first beam configuration. In some implementations, the connection manager 315 can assemble raw data retrieve from one or more sources into a data packet for transmission by the RF arrays 310. In some implementations, the connection manager 315 can cause at least one of the RF arrays 310 to transmit the data packets based on the one or more sectors selected by the sector selector 335. In some implementations, the connection manager 315 can cause one or more RF arrays 310 to transmit data packet(s), and one or more different RF arrays 310 to transmit different data packet(s).

The control channel communicator 325 can communicate, using at least one RF array, via a control channel with at least the second wireless station 345. The control channel may be a specific predetermined frequency, or may be wireless channel identified by at least the first wireless station 305 or the second wireless station 345. In some implementations, the control channel may be established based on one or more protocols defined by the 802.11 standards. The control channel communicator can communicate signal information about the wireless signals transmitted and received by the RF arrays 310. In some implementations, the signal information can include signal information about the wireless signal used for the control channel. The signal information can include phase information for each element of each RF array 310, gain information for each element of each RF array 310, sector information for each RF array 310, wireless communication history, and total RF array transmission power, among others. In some implementations, the control channel communicator 325 can communicate concurrent with other wireless transmissions of the RF arrays 310, and may transmit information about those communications including metadata, dropped packet information, and signal strength values received from one or more external devices, among others. The control channel communicator may communicate a unique device identifier value associate with the first wireless station 305. In some implementations, the control channel communicator 325 can communicate other device identifiers received from other external wireless devices (e.g., the second wireless station 345, etc.).

In some implementations, the control channel communicator 325 can communicate information about the signals received from other wireless device(s) (e.g. the second wireless station 345), including signal strength, number of packets received, and total data rate, among others. Based on the signal information, the control channel communicator 325 may communicate an indication (e.g., feedback information) to update a beambook 320 with another beam configuration on the other wireless device(s) to improve the wireless signal received by the first wireless station 305. For example, the control channel communicator 325 may determine that the signal strength of a signal received from the second wireless station 345 has diminished (e.g., less than a predetermined threshold) over a predetermined period of time. In response, the control channel communicator 325 can send an indication to the external wireless device via the control channel that the strength of the wireless signal must be improved. In some implementations, the indication can include an amount of improvement to the wireless signal transmitted by the second wireless station 345. In some implementations, the first wireless station can communication one or more beamforming frames to the second wireless station. Each beamforming frame can include information about the signals received and transmitted by at least one RF array 310 of the first wireless station 305.

The control channel communicator 325 can receive, using at least one RF array 310, feedback information via the control channel. The feedback information can include an indication to update the beambook 320 with a different beam configuration. For example, the feedback information may indicate that the wireless signal transmitted to least one other wireless device (e.g., the second wireless station 345) is below a predetermined threshold. The feedback information can include signal strength information, data rate information, and other information about the signal transmitted by the first wireless station 305. In some implementations, the feedback information may include signal information about more than one RF array 310, and more than one wireless signal transmitted to more than one other wireless device. In some implementations, the control channel communicator 325 can store the feedback information in the memory of the first wireless station 305. In some implementations, the feedback information can include information about another beam configuration which may be used to improve the wireless signal quality received by other wireless devices from the first wireless station 305. In some implementations, the control channel communicator 325 can iteratively communicate one or more control signals with at least one other wireless device to determine a path direction and sector selection having the highest gain. For example, the control channel communicator 325 can communicate a control signal for each of the sectors of at least one RF array 310, and receive feedback information (e.g., signal gain, signal to noise ratio, etc.) based on each of these control signals before transmitting the next control signal. Accordingly, the control channel communicator 325 can iteratively determine, through control channel communications with at least one other wireless device, which sector of an RF array has the highest gain when communicating with the other wireless device, thereby optimizing the signal strength between the two devices.

The beambook updater 330 can update the beambook 320 with at least one beam configuration based on the feedback information received from other wireless devices (e.g., the second wireless device 345). In some implementations, the beambook updater 330 can update the beambook by accessing a data structure in the memory of the first wireless station 305 to add additional phase and gain values for the elements of at least one RF array 310. In some implementations, the beambook updater 330 can update more than one beambook 320 with phase and gain values. For example, each of the RF arrays 310 can be associated with a respective beambook. In some implementations, the feedback information received by the control channel communicator 325 can include an indication of one or more RF arrays 310 on the first wireless station 305. Based on the indication, the beambook updater 330 can update the corresponding beambook 320 in the memory of the first wireless station 305. In some implementations, the beambook updater 330 can update the beambook 320 with an indication that the sector used to communicate with at least one other device has the highest gain based on the feedback information received by the control channel communicator 325.

In some implementations, the beambook updater 330 can update the beambook 320 by applying the feedback information received by the control channel communicator 325 to a machine learning model (e.g., linear regression, sparse vector machine (SVM), neural network, recurrent neural networks, long short-term memory (LSTM) network, etc.). For example, the machine learning model can be trained to output one or more new beam configurations (e.g., phase and gain values for one or more elements of a RF array 310) based on the feedback information received by the control channel communicator 325. The machine learning model may be trained by an external computing device, and loaded into memory of the first wireless station 305 by one or more wireless signals or a wired communication. In some implementations, the first wireless station 305 may train the machine learning model based on feedback data received by an external wireless device, where the feedback data can include classification information to train the machine learning model. The beambook updater 330 can validate the information to be added to the beambook 320 before updating the beambook. For example, the beambook updater 330 may determine that a value is already present in the beambook 320, and therefore may not need to be added. In another example, the overall gain or phase values to be added may exceed a one or more predetermined thresholds. In such situations, the beambook updater 330 can discard the updates, or modify the updates to fall within the one or more predetermined thresholds. In another example, the phase and gain values may exceed the limitations (e.g., power, transmission frequency, etc.) of at least one RF array 310 associated with the beambook. In such situations, the beambook updater 330 can discard the phase and gain values without updating the beambook, or modify the phase and gain values to fall within the limitations of the at least one RF array 310.

The sector selector 335 can select a different sector and/or beam width based on the beam configuration added to the beambook 320. For example, the beambook 320 may be updated with additional phase and gain values for the elements of at least one RF array 310. The phase and gain values can be based on the feedback information received by the control channel communicator 325. The sector selector 335 can access the memory of the first wireless station 305 as detailed herein above to retrieve the updated phase and gain values, and apply the updated values to designated RF arrays 310. In some implementations, the sector selector 335 can select a different beam shape based on the updated beambook 320 information. In some implementations, the sector selector 335 may select another sector and/or beam width for at least one of the RF arrays 310 not based on the updated beambook 320, but based on the feedback information received by the control channel communicator 325. For example, sector selector 325 may select, based on the feedback information, another sector and/or beam width already present in the beambook 320. In such implementations, the beambook updater 330 may not update the beambook 320 in response to feedback information from other wireless devices. Instead, the sector selector 335 may simply select another sector and/or beam width (e.g., phase and gain values for the elements of at least one RF array 310) already present in the beambook 320 in memory of the first wireless station 305. In some implementations, the sector selector 335 may designate the previous sector and/or beam width used by the one or more RF arrays 310 with a value indicating that the gain of the wireless signal using the sector was below a predetermined threshold, if such information is indicated in the feedback information received by the control channel communicator 325. The value may be added to the beambook 320, or may be stored in a data structure in the memory of the first wireless station 305.

Upon selecting the updated sector and beam width based on the updated beam configuration, the connection manager 315 can transmit data using at least one RF array 310 based on the updated sector and beam width. In some implementations, the connection manager 315 can apply the updated beam configuration (e.g., the phase and gain values for each element of at least one RF array 310) on a per-device basis. For example, one client device may be associated (e.g., stored in a data structure indexed by an identifier value of the device) with a particular beam configuration. If the connection manager 315 attempts to wirelessly communicate with another device, the connection manager 315 can access the memory of the first wireless station 305 to apply a different beam configuration associated with that other wireless device. Accordingly, the first wireless station 305 can communicate with more than one wireless device using more than one RF array 310 and more than one beam configuration based on the updated beambook 320. In some implementations, the beam configuration updated by the beambook updater 330 can include an indication to transmit with a different RF array 310. For example, one or more beambooks 320 may be updated with an indication to transmit data using a sector and beam width using RF array 310B, and not using another RF array 310A. In some implementations, the data may be transmitted using updated beam configuration without interrupting the order or sequence of data communications. For example, the first wireless station 305 can adjust the direction of the wireless beams used to communicate with the second wireless device 345 without dropping packets in a communication sequence, or reinitializing a communication channel using a wireless communication protocol.

In addition to transmitting data, the RF arrays 310 configured by the connection manager 315 can receive data from other wireless devices (e.g., the second wireless station 345). In some implementations, the data received by the other wireless devices can be stored in the memory of the first wireless station 305. In some implementations, the data received from other wireless devices can communicated to another computing device coupled to the first wireless station 305. Receiving the data from other wireless devices can include receiving signal information from the other wireless devices. For example, the first wireless station 305 can determine a signal strength value of the wireless signals used to communicate data packets from the second wireless station. The first wireless station 305 can monitor the signal strength of one or more other wireless devices transmitting data to the first wireless station 305. In some implementations, the first wireless station 305 may store a historical log of signal strength values in a data structure in the memory of the first wireless station 305. The data structure may be indexed by a unique device identifier associated with the other wireless device. Accordingly, the connection manager 315 executing on the first wireless device 305 can monitor, store, and retrieve signal strength values for each of the other wireless devices communicating with the first wireless station 305.

Concurrent (e.g., within 1 second, 0.5 seconds, 0.1 seconds, simultaneously, etc.) to transmitting and receiving data using at least one RF array 310, the prober 340 can use the other RF arrays 310 to probe sectors for other communication links which may have superior signal gain. For example, the connection manager 315 of the first wireless station 305 may open a communication channel and a control channel with the second wireless station 345 using the RF array 310A. Concurrently, the prober 340 of the first wireless device can use the other RF arrays 310B-N to look for wireless signals from the second wireless device 345. In this example, the prober can access the beambook 320 to iteratively apply beam configurations to each of the RF arrays 310B-N, and record the signal strength values from wireless signals received from the second wireless device 345 using the RF arrays 310B-N in a data structure in the memory of the first wireless station 305. This data collection is useful if one RF array 310 (e.g., RF array 310A) may have inferior (e.g., below a threshold) signal quality when compared to a candidate RF array 310 (e.g., RF array 310B). In some implementations, each of the RF arrays 310A-N may communicate using a different frequency band, protocol, and/or wireless standard, among others. As such, the connection manager 315 can continuously search (e.g., periodically, once a timer reaches a predetermined threshold and is reset, etc.) for potentially superior wireless beam patterns to maintain good communication quality (e.g., fewer dropped packets, lower bit error rate, lower power consumption, higher signal to noise ratio, etc.).

As the prober 340 stores signal strength values for each of the sectors of the RF arrays 310, the connection manager 315 can iteratively compare each of the signal strength values with the signal strength value of the wireless signals used in communications with other wireless devices. For example, the first wireless station 305 can communicate with the second wireless station 345 using a sector and beam width of the RF array 310A. Concurrently, the prober has stored signal strength values for the other sectors of the RF arrays 310B-N in a data structure in the memory of the first wireless station 305. The connection manager 315 of the first wireless station 305 can access the data structure including the signal strength values to identify a signal strength value which is the largest of the signal strength values for the sectors of the RF arrays 310B-N. In some implementations, the if the signal strength values are the same, the connection manager 315 can identify a largest signal strength value based on a tie breaking parameter. The tie breaking parameter can be, for example, whichever index value of the signal strength value which is greatest, among others. To identify the greatest signal strength value, the connection manager 315 can iteratively compare each of the signal strength values to identify the sector of the RF array 310 which receives signals from the second wireless device 345 that have the greatest signal strength values.

If the connection manager 315 determines that the greatest probed signal strength value is greater than the communication signal strength value, the sector selector 335 can switch data transmissions from at least one RF array 310 to a different RF array 310. For example, the first wireless station 305 can be wirelessly communicating with the second wireless station 345 using a first sector of the RF array 310A. The prober 340 has iteratively scanned the signal strength values received by the other RF arrays 310B-N, and stored the signal strength values along with an identifier of the corresponding RF array 310B-N in a data structure in the memory of the first wireless station 305. Of the stored signal strength values received by RF arrays 310B-N, the connection manager 315 has determined the signal strength received by the RF array 310C to be the greatest signal strength value (e.g., having the highest gain, highest signal to noise ratio, etc.). The connection manager 315 has compared the greatest probed signal strength value to the signal strength value received by the RF array 310A in communication with the second wireless device 345, and determined that the probed signal strength value is greater than (e.g., has a higher gain, higher signal to noise ratio, etc.) the signal strength value of the signal received by the RF array 310A. Accordingly, the sector selector 335 can select a sector of the RF array 310C with which to transmit data to the second wireless station 345, and switch data transmissions from the RF array 310A to the RF 310B, and switch receiving wireless signals from the second wireless station 345 using the RF array 310A to using the RF array 310B. In some implementations, the sector selector 335 can switch data transmissions from the first RF array 310 to a second RF array 310 with dropping or reinitializing the wireless communication channel between the first wireless station 305 and the second wireless station 345.

Figure 3B:
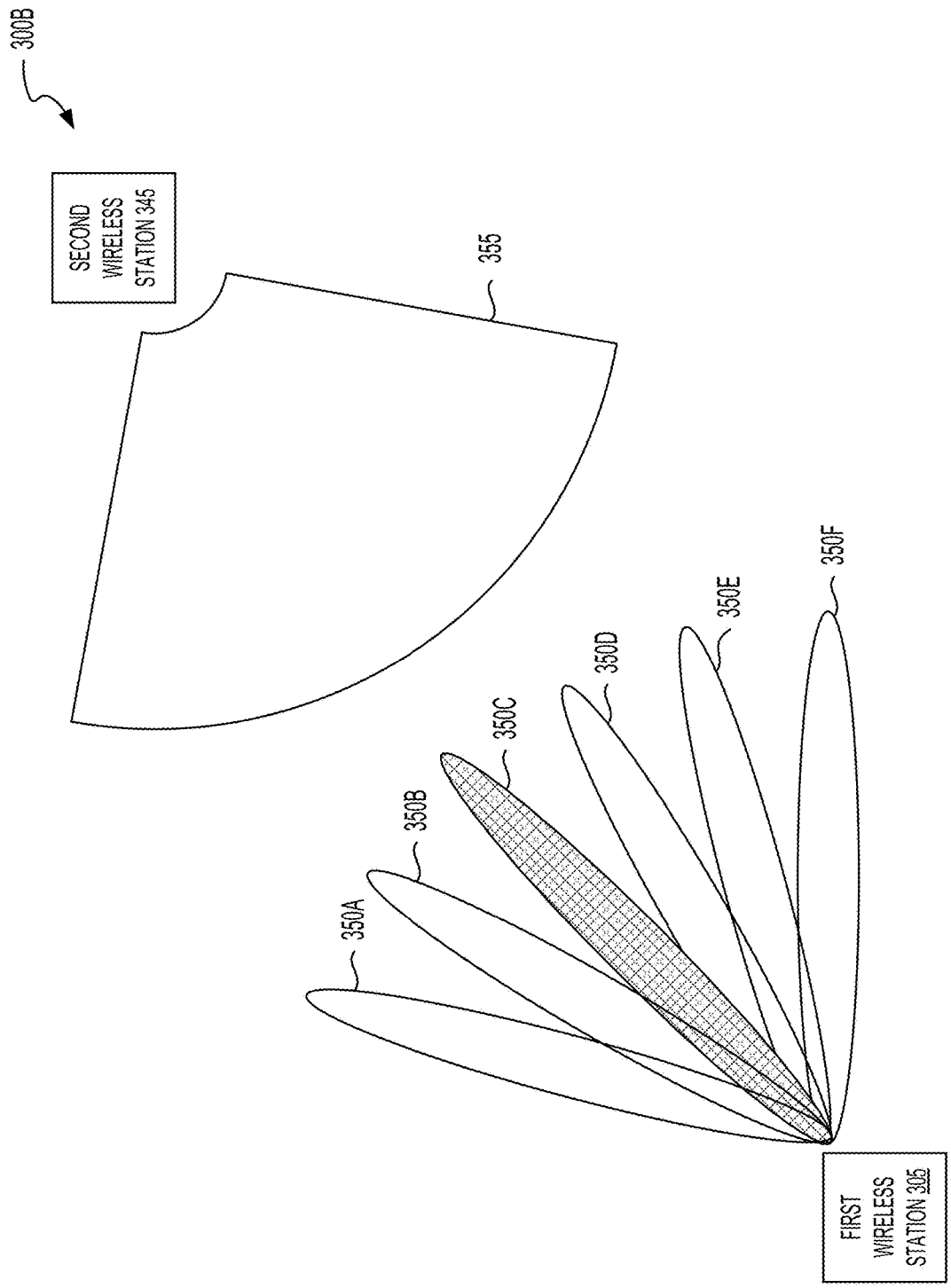
FIGS. 3B-C illustrate example diagrams of sector selection and beam width selection based on control communications between two wireless stations, in accordance with an implementation.

Referring now to FIG. 3B, depicted is an example environment 300B showing the selection of a sector with optimal (e.g., highest gain, highest signal to noise ratio, etc.) by the first wireless station 305 while communicating with the second wireless station 345. The environment 300B can include at least one first wireless station 305, depicted in FIG. 3A, and at least one second wireless station 345, depicted in FIG. 3A. The second wireless station 345 can perform any of the functionality of the first wireless station 305. The environment 300B can further include at least one sector 350A-F (sometimes referred to generally as sector 350), each sector 350 illustrating a beam gain/direction of one or more wireless signals from the first wireless station 305 to the second wireless station 345. Although the environment 300B depicts only six sectors 350, it should be understood that the first wireless station 305 can transmit data using any number of sectors from any number of RF arrays (e.g., the RF arrays 310A-N described herein above in conjunction with FIG. 3A). The environment 300B can further include at least one sector 355, the sector 355 indicating a beam gain/direction for one or more wireless signals transmitted from the second wireless station 345 to the first wireless station 305.

Environment 300B depicts a process of selecting the optimal (e.g., highest gain compared to other beam patterns/sectors, highest signal to noise ratio compared to other beam patterns/sectors, etc.) beam sector for the first wireless station 305 based on feedback from the second wireless station 345 using the feedback process described herein above in conjunction with FIG. 3A. In this example implementation, the second wireless station 345 has selected a first sector 355 and a first beam width which is substantially omnidirectional (e.g., receiving/transmitting signals in all directions, 360 degrees, within 10% of 360 degrees, etc.). In some implementations, the first beam width can be substantially omnidirectional in the direction of the first wireless station 305 (e.g., 120 degrees of width in a direction, etc.). In some implementations, the second wireless station 345 can choose an omnidirectional gain pattern for the transmission of wireless signals, so as to allow the first wireless device 305 to choose the optimal beam sector 350C and direction based feedback from the second wireless device 345. Retrieving and selecting an omnidirectional sector 355 allows the second wireless station to provide feedback signals in a wide, sweeping direction, allowing devices to easily receive signals from the second wireless station 345 without extensive calibration and feedback. In some implementations, a wide (e.g., greater than or equal to 45 degrees) beam pattern is selected based on the signal strength values received from the first wireless station 305 by the second wireless station 345.

In contrast to the wide sector 355 of the second wireless station 345, the first wireless station 305 as depicted in environment 300B can iteratively select an optimal focused transmission sector 350C from the plurality of transmission sectors 350. Each of the transmission sectors 350A-F can correspond to a single RF array 310 of the first wireless station 305. In some implementations, each of the sectors 350A-F are created based on phase and gain values for a single RF array 310. As depicted, the first wireless station 305 can iterate through each of the sector 350A-F configurations by accessing the beambook 320 in the memory of the first wireless station 305. After selecting a sector, for example sector 350A, the first wireless station 305 can transmit a wireless signal to the second wireless station 345, which in this example has chosen a first sector 355 and a first beam width which is mostly omnidirectional. The second wireless station 345 can communicate feedback information to the first wireless station 305 based on the signal strength received from the first wireless station 305 for each of the sectors 350A-F.

This can allow the first wireless station 305 to receive signal strength values (e.g., signal gain, signal to noise ratio, etc.) for each of the sectors 350C. Using the connection manager 315, the first wireless station 305 can compare each of the signal strength values corresponding to each of the sector 350A-F configurations to determine which sector 350 has the greatest signal strength value. In some implementations, the first wireless station 305 can transmit on different wireless channels for each of the sectors 350 in parallel, and receive the feedback from the second wireless station 345 in parallel instead of iteratively. Likewise, in some implementations, the comparison step to determine which sector 350 is associated with the highest signal strength value can take place as a parallel comparison operation. As depicted in environment 300B, the sector 350 associated with the highest signal strength value (e.g., highest gain, highest signal to noise ratio, etc.) as received by the second wireless station 345 is the sector 350C. The first wireless station 305 can communicate wirelessly with the second wireless station using the sector 350C, until the second wireless station 345 provides feedback to the first wireless station indicating that a sector change (e.g., a beambook update) may be needed, such as the signal strength value falling below a predetermined threshold.

Figure 3C:
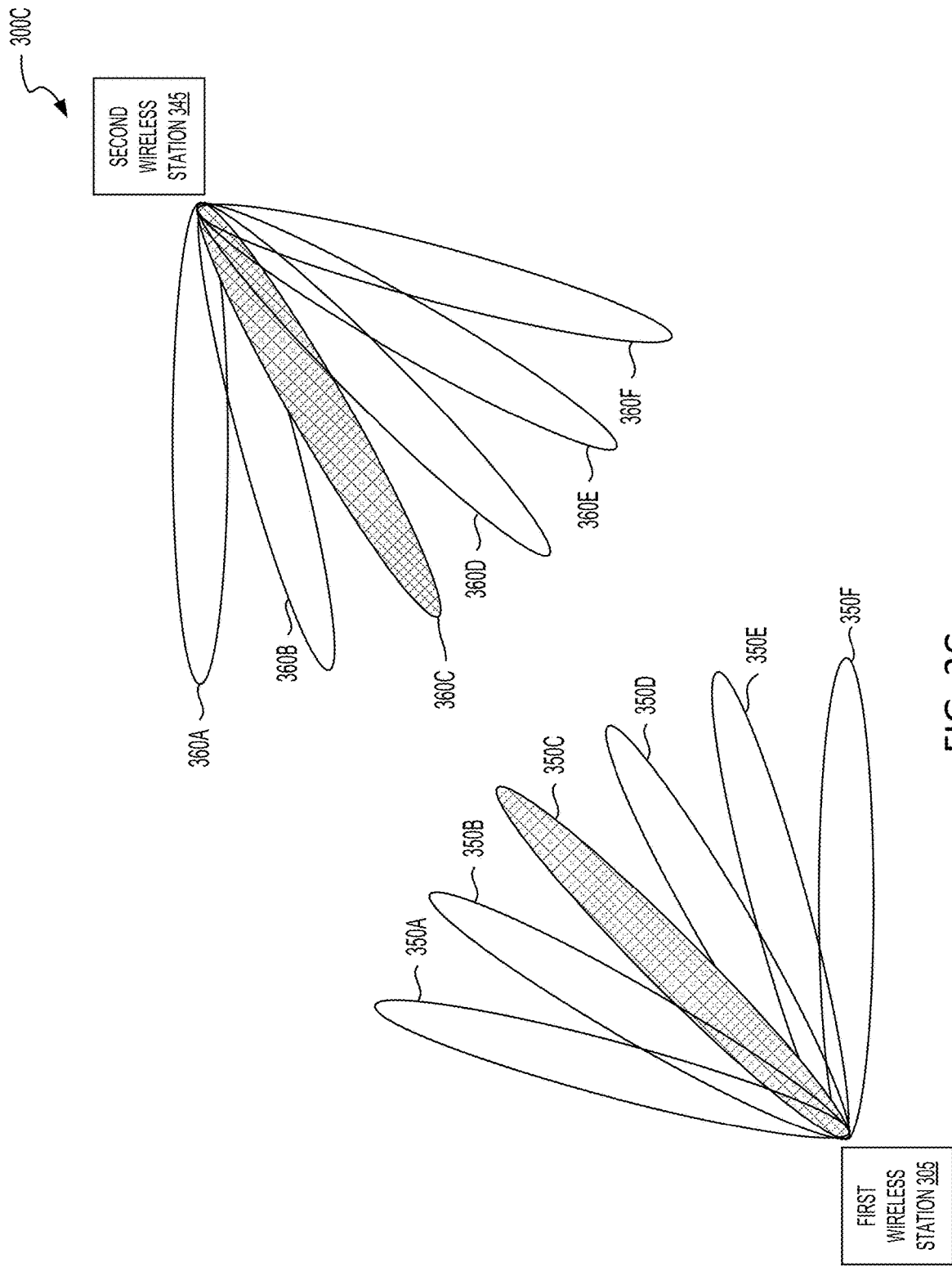

Referring now to FIG. 3C, depicted is an example environment 300C which illustrates sector selection by the second wireless station 345 after the events depicted in environment 300B described herein above in conjunction with FIG. 3B. The environment 300C can include at least one first wireless station 305 as described herein above in conjunction with FIGS. 3A-B, and at least one second wireless station 345 as described herein above in conjunction with FIGS. 3A-B. The first wireless station 305 can transmit one or more wireless signals to the second wireless station 345 using one or more first station sectors 350A-F (hereinafter sometimes generally referred to as first station sectors 350). The second wireless station 345 can transmit one or more wireless signals using one or more second station sectors 360A-F (hereinafter sometimes generally referred to as second station sectors 360). Although the environment 300C depicts six first station sectors 350 and six second station sectors 360, it should be understood that each of the first wireless station 305 and the second wireless station 345 can transmit one or more wireless signals using any number of first stations sectors 350 and/or second station sectors 360.

Taking place after the events in environment 300B, environment 300C includes the second wireless station now iteratively selecting the optimal (e.g., highest gain, highest signal to noise ratio, etc.) second station sector 360 based on feedback information from the first wireless station 305. After the first wireless station establishes a focused first station sector 350C with the highest signal strength value, the first wireless station 305 can communicate a signal via the control channel to the second wireless station 345 which can indicate that the second wireless station 345 may begin choosing an optimal (e.g., highest gain, highest signal to noise ratio, etc.) second station sector 360 based on feedback from the first wireless station 305. Accordingly, the second wireless station can retrieve one or more candidate second station sectors 360A-F from its associated beambook 320, and begin iterative transmitting wireless signals using at least one RF array 310 and each of the second station sectors 360.

For each of the wireless signals transmitted using one of the second station sectors 360, the first wireless station can receive and determine a signal strength value (e.g., signal gain, signal to noise ratio, etc.) for the wireless signal. The first wireless station 305 can communicate feedback information including the signal strength values to the second wireless station 345. The second wireless station 345 can iteratively transmit a wireless signal, receive feedback information about the wireless signal, and store the corresponding signal strength values for each of the second station sectors 360 in the memory of the second wireless station 345. The second wireless station 345 can then iteratively compare each of the signal strength values corresponding to each of the second station sectors 360 to determine the second station sector 360C associated with the highest signal strength value (e.g., highest signal gain, highest signal to noise ratio, etc.) as received by the first wireless station 305.

In some implementations, the second wireless station 345 can transmit on different wireless channels for each of the sectors 360 in parallel, and receive the feedback from the first wireless station 305 in a parallel process instead of an iterative process. Likewise, in some implementations, the comparison step to determine which sector 360 is associated with the highest signal strength value can take place as a parallel comparison operation. The second wireless station 345 can communicate wirelessly with the first wireless station 305 using the sector 356C, until the first wireless station 305 provides feedback to the second wireless station 345 indicating that a sector change (e.g., a beambook update) may be needed, such as the signal strength value for the second station sector 360C falling below a predetermined threshold.

Figure 3D:
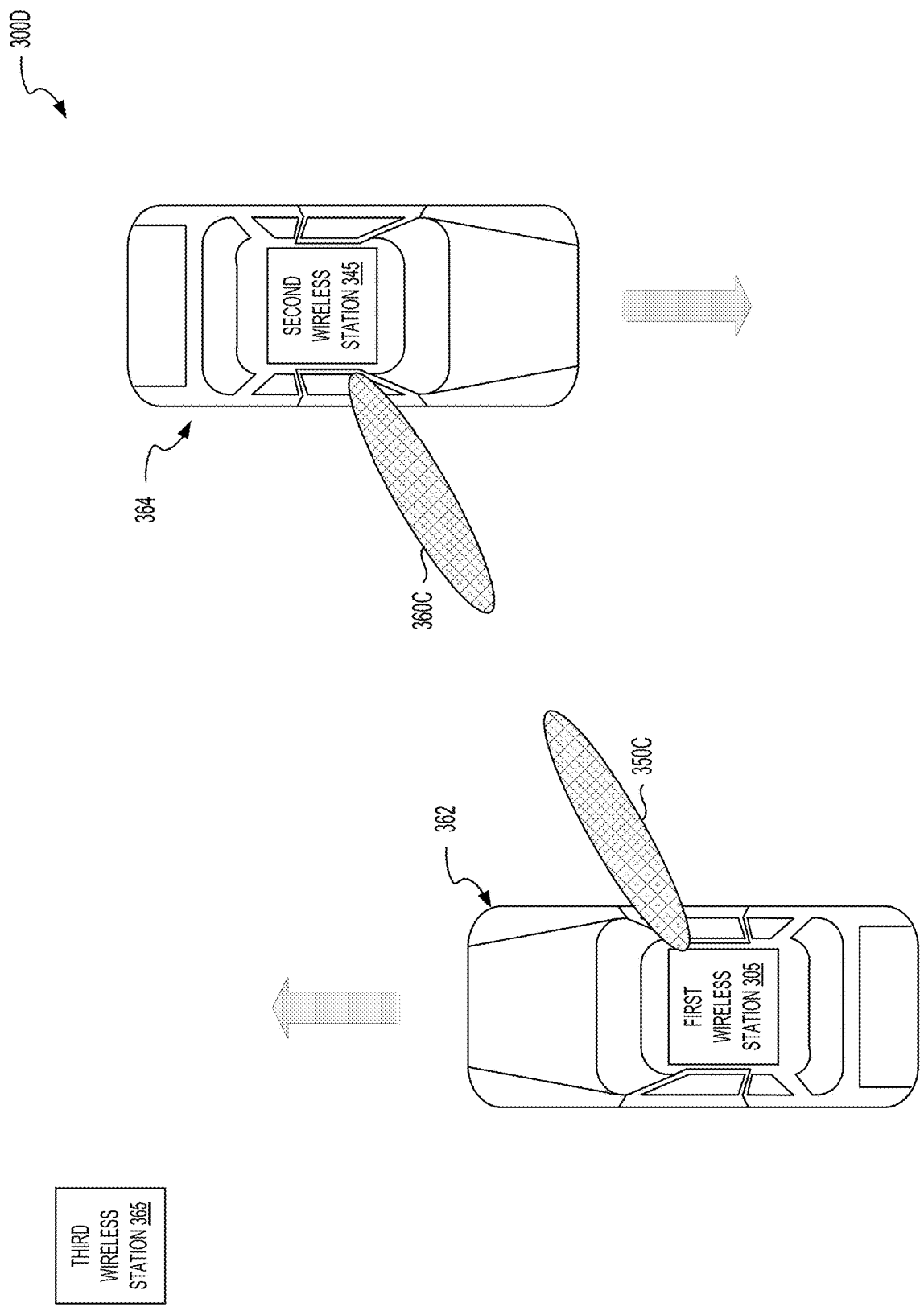
FIG. 3D illustrates an example diagram of an implementation for millimeter wave wireless communications between two vehicles.

Referring now to FIG. 3D, an illustrative diagram depicting an example implementation for millimeter wave wireless communications between two vehicles is provided. The adaptive connection management process for beam steering implemented by the first wireless station 305 and the second wireless station 345 can be implemented in a multitude of environments. In particular, environment 300D depicts an example environment where the first wireless station 305 is coupled to a first vehicle 362, and the second wireless station 345 is coupled to a second vehicle 364. The first wireless station 305 and the second wireless station 345 can perform any and all functionalities as described herein above in conjunction with FIGS. 3A-C. In some implementations, the first wireless station 305 or the second wireless station 345 can be coupled to an unmanned aerial vehicle, such as a drone. The environment 300D can include at least one third wireless station 365, which can perform any of the functionalities of the first wireless station 305 or the second wireless station 345.

The first wireless station 305 and the second wireless station 345 can perform any of the functionalities described herein, for example iteratively determining optimal beam sectors and determining optimal RF arrays 310 based on feedback, among others, while coupled to a first vehicle and a second vehicle respectively. In some implementations, at least one of the first wireless station 305 or the second wireless station 345 can be a stationary station, while the other of the first wireless station 305 or the second wireless station 345 can be coupled to a vehicle. In some implementations, the first wireless station 305 can communicate with the second wireless station using a data rate which is greater than or equal to 1 Gbps while traveling at a speed of greater than or equal to 40 miles-per-hour relative to the second wireless station 345. In some implementations, the first wireless station 305 can communicate with the second wireless station 345 using a data rate which is greater than or equal to 1 Gbps while traveling at a speed of greater than or equal to 70 miles-per-hour relative to the second wireless station 345.

As depicted in environment 300D, the first wireless station 305 can transmit data to the second wireless station 345 using the optimal (e.g., highest signal gain, highest signal to noise ratio, etc.) beam sector 350C. The first wireless station can determine the optimal beam sector 350C as described herein above with respect to FIGS. 3A-C. Likewise, the second wireless station 345 can transmit data to the second wireless station 345 using the optimal (e.g., highest signal gain, highest signal to noise ratio, etc.) beam sector 360C. The second wireless station can determine the optimal beam sector 360C as described herein above with respect to FIGS. 3A-C. As illustrated in FIG. 3D, the optimal beam sector 350C for the first wireless station 305 has the highest gain in the direction of the second wireless station 345, and the optimal beam sector 360C for the second wireless station 345 hash the highest gain in the direction of the first wireless station 305. As described herein above, each of the first wireless station 305 and the second wireless station 345 can continuously, or in some implementations, periodically, update a respective beambook 320 in the memory of the respective wireless device to maintain an optimal signal gain between the first wireless station 305 and the second wireless station 345. In addition, based the feedback information, each of the first wireless station 305 and the second wireless station 345 can select optimal beam widths and optimal RF arrays 310 to communicate wirelessly with other wireless devices.

As depicted in environment 300D, the first wireless station 305 moves along with the vehicle 362 in one direction, and the second wireless station 345 moves along with the second vehicle in the opposite direction. At a point in the future, the signal strength values between the first wireless station 305 and the second wireless station 345 will fall below a predetermined threshold, because the two stations will be too far apart to effectively communicate. Before the first wireless station reaches a position where communication with the second wireless station becomes interrupted, the connection manager 315 executing on the first wireless station 305 can determine that the signal strength value (e.g., signal gain, signal to noise ratio, etc.) received from the third wireless station 365 is greater than the signal strength values received from the second wireless station 345. Accordingly, the connection manager 315 executing on the first wireless station can switch from transmitting data to the second wireless station 345 to transmitting data to the third wireless station 365 without interrupting or reinitializing any wireless protocols which may be taking place. In some implementations, the connection manager can cause the first wireless station 305 to communicate with the third wireless station 365 at the same time as the second wireless station 345. Accordingly, the connection manager 315 executing on the first wireless station can effectively implement a mesh network by dynamically choosing to connect to wireless stations associated with the greatest signal strength value (e.g., signal gain, signal to noise ratio, etc.).

Figure 3E:
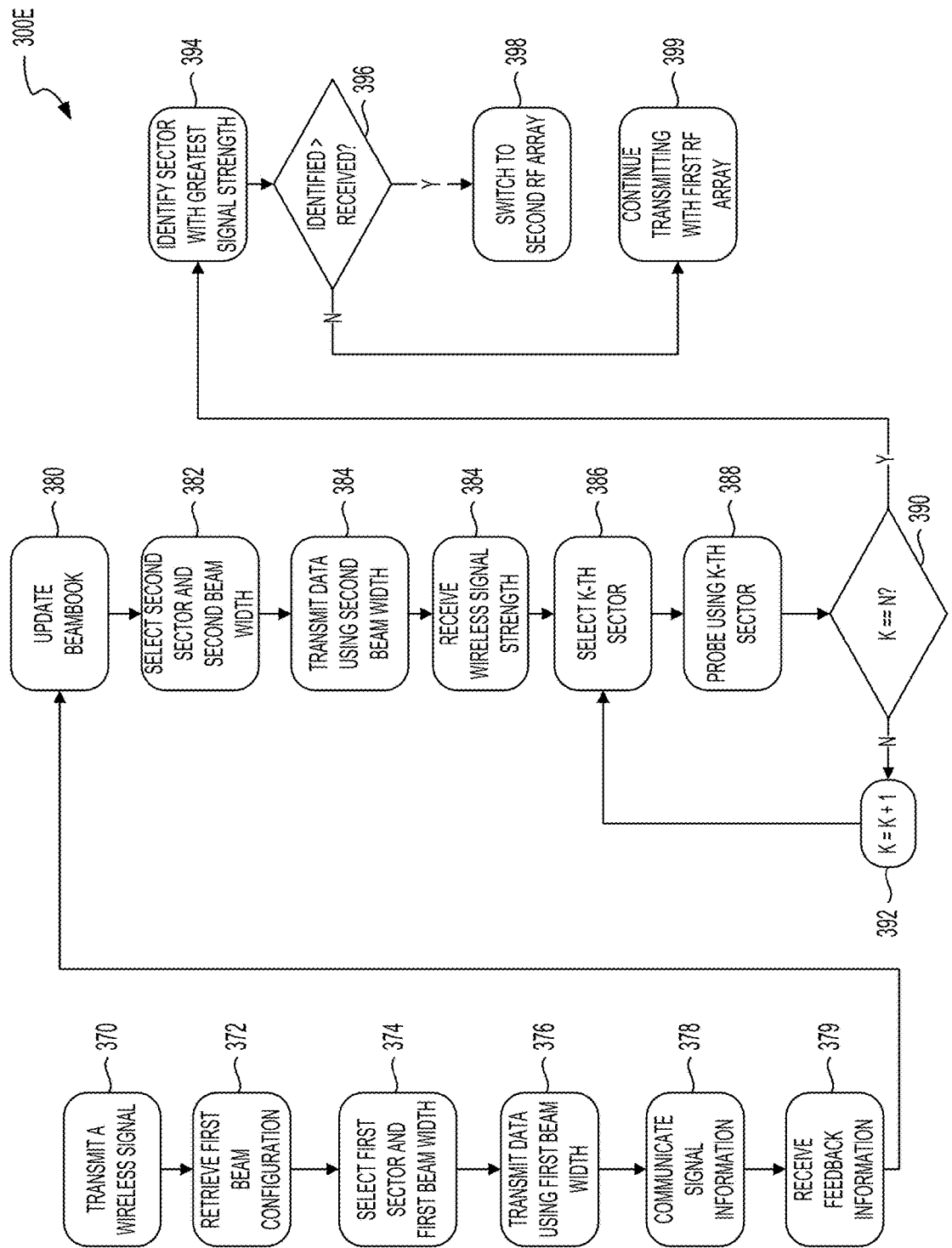
FIG. 3E illustrates a flow diagram of an example method of adaptive millimeter wave wireless communication, in accordance with an implementation.

Referring now to FIG. 3E, depicted is an example method 300E of adaptive millimeter wave wireless communication between a first wireless station (e.g., the first wireless station 305) including a first RF array (e.g., RF array 310A) and a second RF array (e.g. the RF array 310B) and a second wireless station (e.g., the second wireless station 345). The method 300E can be performed by one or more system or component depicted in FIGS. 1-3D and 4A-6D, including, for example, system 300A, a wireless station, an RF array, or connection manager. At ACT 370, the first wireless station can transmit a wireless signal. At ACT 372, a connection manager (e.g., the connection manager 315) executing on the first wireless device can retrieve a first beam configuration. At ACT 374, the connection manager can select a first sector and a first beam width. The connection manager can transmit data using the first sector and the first beam width (376). The connection manager can communicate signal information (378). The connection manager can receive feedback information (379). The connection manager can update the beambook (380). The connection manager can select a second sector and a second beam width (382). The connection manager can transmit data using the second sector and the second beam width (384). The connection manager can receive a wireless signal strength (384). The connection manager can select the k-th sector (386). The connection manager can probe using the k-th sector (388). At decision block 390, the connection manager can determine whether k is equal to the number of sectors n. The connection manager can increment the counter register k (392). The connection manager can identify the sector with the greatest signal strength (394). The connection manager can determine whether the identified signal strength is greater than the received signal strength (396). The connection manager can switch to a second RF array (398). The connection manager can continue transmitting with the first RF array (399).

The first wireless station (e.g., the first wireless station 305) can transmit a wireless signal (370). The first wireless station can transmit a wireless signal with a particular frequency range, for example between 28 GHz and 72 GHz using at least a first RF array (e.g., one of the RF arrays 310, such as the RF array 310A). Each of the RF arrays of the first wireless station can transmit the wireless signal in one or more beam sectors and beam widths. Each sector can be stored and maintained in a beambook (e.g., beambook 320) in the memory of the first wireless device 305. The first wireless station can transmit the wireless signal at a data rate of greater than or equal to 1 Gbps. In some implementations, the first wireless station can communicate wirelessly with a second wireless device (e.g., the second wireless device 345) at a data rate of greater than 1 Gbps, where the first wireless station is coupled to a first vehicle and the second wireless device is coupled to a second vehicle, and the first wireless device is traveling at a speed greater than or equal to 40 miles-per-hour relative to the second wireless station.

The connection manager (e.g., the connection manager 315) executing on the first wireless device can retrieve a first beam configuration (372). In some implementations, the connection manager can retrieve the first beam configuration for the first RF array by accessing the beambook in the memory of the first wireless device. The beambook can contain a plurality of phase and gain values, each of the phase and gain values corresponding to an element on the first RF array. By changing the phase and gain values of the RF array, the connection manager can change the beam shape, gain, and direction of the wireless signals transmitted by the RF array. In some implementations, the first beam configuration retrieved from the beambook can be an initialization phase value. In some implementations, the connection manager can retrieve the beam configuration phase and gain values based on a predetermined index value, by accessing the portion of the beam indicated by the predetermined index value. In some implementations, the connection manager can assign random values to the phase and gain values for the elements of the first RF array using either a pseudo-random or a random function.

The connection manager can select a first sector and a first beam width (374). The first sector and the first beam width can be selected based on the phase and gain values retrieved from the beambook in step (372). In some implementations, the beam width of the wireless signals to be transmitted by the first RF of the first wireless station can be selected by selecting a signal power level for the first RF array. For example, the first beam width may be include an omnidirectional beam pattern to communicate with wireless devices in the greatest number of possible directions. In some implementations, if the first sector indicates a focused beam, the first beam width can be narrow and highly focused.

The connection manager can transmit data using the first sector and the first beam width (376). After the phase and gain values have been assigned to the elements of the first RF array of the first wireless station, the first wireless station can transmit one or more wireless signals carrying data to the second wireless station using the first RF array. In some implementations, the communication manager can access the memory of the first wireless device to assemble one or more data packets for wireless transmission to the second wireless device. The one or more assembled data packets can include header information, for example headers defined by the protocols outlined in at least one of the 802.11 standards. In some implementations, the first wireless station can transmit the data packets using the first beam configuration and the first RF array at a data rate of greater than 1 Gbps.

The connection manager can communicate signal information (378). The signal information communicated by the first wireless device can include information about the first RF array, the phase and gain values, and the overall transmission power of the first RF array, among others. In some implementations, the signal information can include a beam width value, indicating the relative width of the wireless signal beams transmitted by the first RF array of the first wireless station. In some implementations, the signal information can include the phase and gain values for the first RF array. The first wireless station can communicate the signal information to the second wireless station using a control channel, which may be on a different wireless channel or baseband. In some implementations, the control channel can be opened and initialized by the first wireless device prior to transmitting the data packets in step (376). In some implementations, the first wireless station can communicate over the control channel using another of the RF arrays included in the first wireless device. In some implementations, the first wireless device can communicate the signal information over the control channel using the first RF array.

The connection manager can receive feedback information (379). The feedback information can include information about the wireless signals transmitted from the first wireless station, and may be received from the second wireless station. For example, the second wireless station can determine signal strength values (e.g., signal gain, signal to noise ratio, etc.) for each of the wireless signals received from the first wireless station. Based on the signal strength values, the second wireless station can transmit feedback information to the first wireless device, thereby providing the first wireless device with information about the quality of the signals it is transmitting. In some implementations, the feedback information can include an indication to update the beambook in memory of the first wireless device. For example, the feedback information may indicate that the received signal strength is less than a predetermined threshold, and updating the beambook can allow the first wireless station to transmit data using a different beam pattern for optimal signal quality. In some implementations, the connection manager can store the feedback information about the first sector and the first RF array in a data structure corresponding to the first sector and the first RF array in the memory of the first wireless station.

The connection manager can update the beambook (380). In some implementations, the connection manager can update the beambook in response to receiving an indication to update the beambook in the feedback information transmitted by the second wireless station. In some implementations, updating the beambook can include updating one or more data structures resident in the memory of the first wireless station. The data structures can include the phase and gain values for each element of the one or more RF arrays included in the first wireless station. In some implementations, updating the beam book can include adding an indication to the current sector data structure, the indication including the signal strength information as received by the second wireless station. In some implementations, the connection manager can update the beambook based on the feedback information received from the second wireless station, for example by changing the phase and gain information based on the change in signal strength values provided in the feedback information. In some implementations, updating the beambook can include adding an indication to an indexed sector data structure that indicates that sector should be chosen to communicate with the second wireless station. In some implementations, updating the beambook can include creating a second beam configuration, by at least one of updating existing beam sector configurations, or by indicating that an existing beam configuration should be chosen as the next selected beam configuration.

The connection manager can select a second sector and a second beam width (382). In some implementations, the connection manager can select a second sector and a second beam width in response to updating the beambook instep (380). In some implementations, the connection manager can select the second sector, where the second sector is different from the first sector. In some implementations, the connection manager can select the second beam width, where the second beam width is different from the first beam width. For example, the connection manager may choose the next sector in the beam book located in a position in memory after the first sector in the beambook. In some implementations, if the feedback information indicates that the signal strength value of the first sector of the first RF has fallen below a predetermined threshold, the connection manager can select the second beam width to be wider than the first beam width. Selecting the second sector and the second beam width can include updating the phase and gain values of the first RF array based on the values retrieved from the beambook which correspond to the second sector and the second beam width.

The connection manager can transmit data using the second sector and the second beam width (384). After the phase and gain values corresponding to the second sector and the second beam width have been assigned to the elements of the first RF array of the first wireless station, the first wireless station can transmit one or more wireless signals carrying data packets to the second wireless station using the first RF array. This can allow the first wireless station to dynamically and adaptively change the shape of the wireless beams transmitted by the one or more RF arrays based on feedback from one or more external wireless devices, for example the second wireless station. In some implementations, the communication manager can access the memory of the first wireless device to assemble one or more data packets for wireless transmission to the second wireless device. In some implementations, the connection manager can receive raw data from an external computing device coupled to the first wireless station, and assemble data packets for transmission to the second wireless station using the raw data. The one or more assembled data packets can include header information, for example headers defined by the protocols outlined in at least one of the 802.11 standards. In some implementations, the first wireless station can transmit the data packets using the first beam configuration and the first RF array at a data rate of greater than 1 Gbps.

The connection manager can receive a wireless signal strength (384). The connection manager executing on the first wireless station can analyze the signals received by at least the first RF array to determine a received wireless signal strength. In some implementations, the received wireless signal strength can be the feedback signal strength received from the second wireless station about the signals transmitted by the first wireless station. The connection manager can store the received wireless signal strength value (e.g., the signal gain, the signal to noise ratio, etc.) in a data structure associated with the first RF array in the memory of the first wireless station. In some implementations, the received wireless signal strength can be communicated to the first wireless station from the second wireless station via the control channel.

The connection manager can select the k-th sector (386). In order to probe a signal strength value for each sector of a respective RF array, the communication manager executing on the first wireless station can iterate over each of the sectors of the respective RF array included in the beambook in the memory of the first wireless station. In some implementations, the connection manager can iteratively loop through each of the sectors of the respective RF array based on a counter register k. Each of the sectors of the respective RF array may be indexed in the beambook by an index value (e.g., index 0, index 1, index 2, etc.). To probe each of the sectors of the respective RF array, the connection manager can select the sector of the respective RF array which includes an index value which is equal to the counter register k. If it is the first iteration of the loop, the counter register k may be initialized to an initialization value (e.g. k=0) before selecting the k-th sector of the respective RF array. Selecting the sector of the respective RF array can include copying the data associated with the sector to a different region of computer memory, for example a working region of memory in the first wireless station. In some implementations, the connection manager can select each of the RF arrays included in the first wireless station as the respective RF array. In some implementations, the respective RF array is different than the first RF array.

The connection manager can probe using the k-th sector (388). Probing can include transmitting data to the second wireless station and receiving feedback information about that wireless signal. In some implementations, the probing step can take place concurrent to the transmission of data by other RF arrays of the first wireless station to the second wireless station. In some implementations, the probing can include receiving one or more signal strength values associated with the respective sector. For example, in some implementations, the signal strength values (e.g., signal gain, signal to noise ratio, etc.) can include information about the signal strength as it is received by the second wireless station. Such information can be communicated to the first wireless station from the second wireless station via one or more wireless control channels. In some implementations, the signal strength values associated with each sector correspond to the strength of wireless signals as received by the first wireless station from the second wireless station. The connection manager can store the signal strength values in one or more data structures in the memory of the first wireless device, along with an indication of the sector associated with the signal strength value.

The connection manager can determine whether k is equal to the number of sectors n (390). To determine whether the connection manager has probed each of the sectors for the respective RF array, the connection manager can compare the counter register k used to select each sector to the total number of sectors of the respective RF array n. If the counter register k is not equal to (e.g., less than) the total number of sectors n, the connection manager can execute step (392) of the method 300E. If the counter register k is equal to (e.g., equal to or greater than) the total number of sectors n, the connection manager can execute step (394) of the method 300E.

The connection manager can increment the counter register k (392). In some implementations, the connection manager can add one to the register k to indicate the next unprobed sector of the sectors in the beambook corresponding to the respective RF array. In some implementations, the connection manager can set the counter register k to a memory address value (e.g., location in computer memory) of the next unprobed sector of the respective RF array in the beambook. In some implementations, the memory address value of the next unprobed sector can be included in the data structure at the location of the current (e.g., selected) sector. After incrementing the value of the counter register k, the data processing system can execute step (386) of the method 300E.

The connection manager can identify the sector with the greatest signal strength (394). After probing each of the sectors of the respective RF array, the connection manager can compare (e.g., iteratively, in parallel, etc.) each of the signal strength values stored in the one or more data structures in the memory of the first wireless station to determine the greatest signal strength value (e.g., highest signal gain, highest signal to noise ratio, etc.). In some implementations, the connection manager can determine the sector corresponding to the greatest signal strength value, and retrieve one or more phase and gain values corresponding to the sector from the beambook. In some implementations, the connection manager can identify the respective RF array which corresponds to the identified sector with the greatest signal strength value.

The connection manager can determine whether the identified signal strength is greater than the received signal strength (396). The connection manager can perform a comparison operation to determine if the signal strength of the identified sector is greater than the receive signal strength from step (384). If the identified signal strength value is greater than the received signal strength value, the connection manager can execute step (398) of the method 300E. If the identified signal strength value is less than or equal to the received signal strength value, the connection manager can execute step (399) of the method 300E.

The connection manager can switch to a second RF array (398). In some implementations, the connection manager can cause the first wireless station to silently transition from transmitting using the first RF array to transmitting using the second RF array associated with a greater signal strength value. In some implementations, the silent transition to the second RF array can include accessing the beambook in the memory of the first wireless device to determine a sector and a beam width for the second RF array. In some implementations, switching from transmitting on the first RF array to the second RF array can include transmitting data to the second wireless station using both the first RF array and the second RF array. Upon transmitting using both RF arrays, the connection manager can then stop transmitting with the first RF array, and instead transmit data to the second wireless station using only the first RF array.

The connection manager can continue transmitting with the first RF array (399). For example, the first RF array may have the greatest signal strength of any of the sectors on any of the other RF arrays included in the first wireless station. In such situations, transmitting data using any of the other RF arrays may not improve the signal conditions as received by the second wireless station. In some implementations, transmission of data can continue for a predetermined time period, before periodically returning to step (384) of the method 300E to determine whether signal conditions have changed for any of the other RF arrays included in the first wireless station. In some implementations, the connection manager can execute step any of the steps in method 300E in response to receiving feedback information from the second wireless station. For example, if the feedback information indicates that the second wireless station has received a weak wireless signal from the first RF array, the connection manager may concurrently execute step (384) of the method 300E to determine if another RF array included in the first wireless station can provide more optimal (e.g., higher signal gain, higher signal to noise ratio) signal conditions when compared to the first RF array.

Figure 3F:
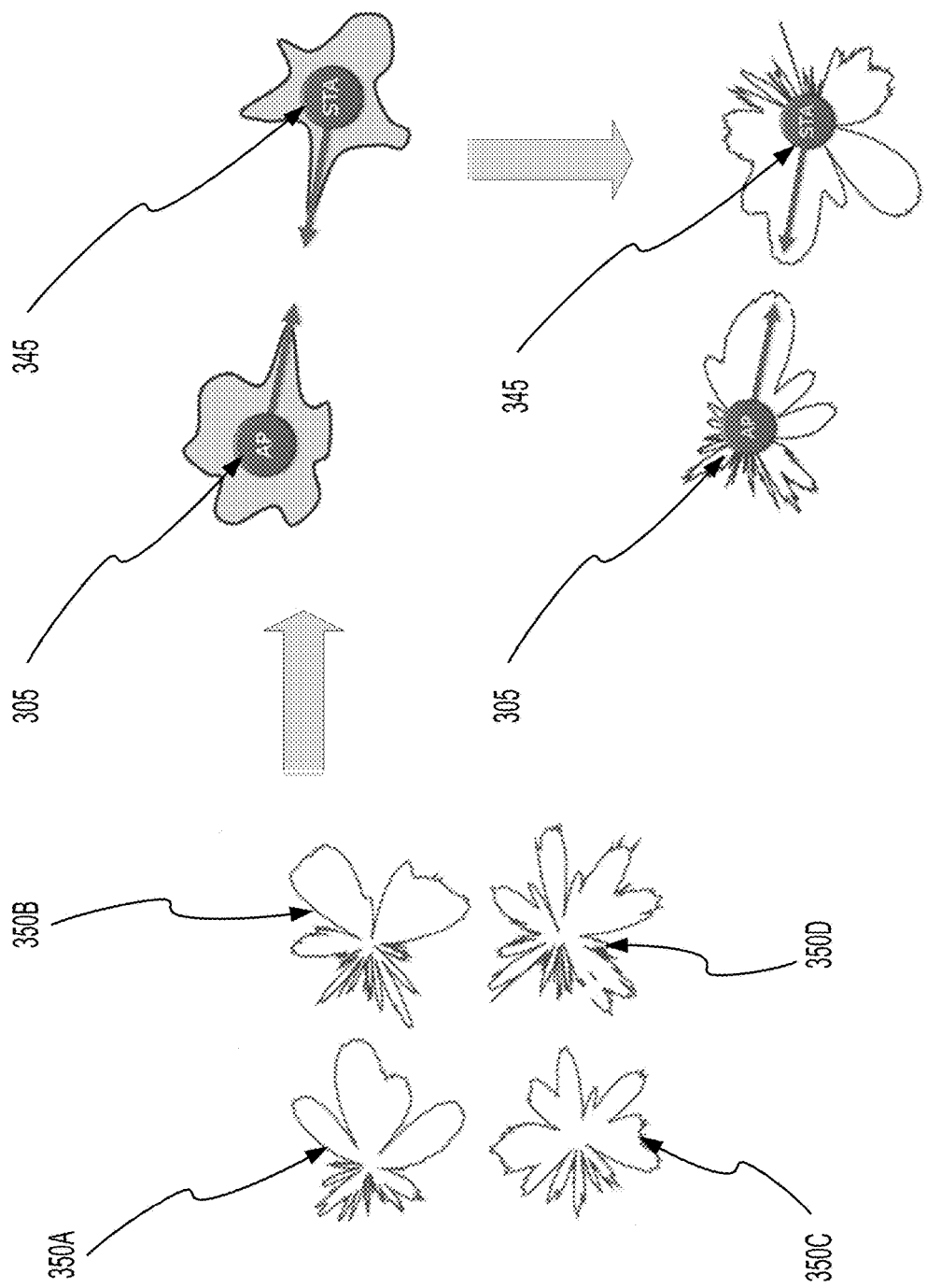
FIG. 3F illustrates an example diagram of sector selection based on feedback between two wireless stations, in accordance with an implementation.

Referring now to FIG. 3F, depicted are transitional steps of selecting one or more sectors for each of the first wireless station 305 and the second wireless station 345, and determining optimal wireless beam sectors and widths for data transmission. As depicted in FIG. 3F, each of the first wireless station 305 and the second wireless station 345 can select one or more sectors for the RF arrays included in the respective wireless stations. The sectors 350A-D are illustrations of beam gain patterns of the wireless signals as transmitted from the first wireless station 305. Although only four sectors are shown in FIG. 3F, it should be understood that the first wireless station 305 can include any number of sector configurations in the beambook in the memory of the first wireless station. Likewise, the second wireless station 345 can also choose from any number of beam sectors based on the beambook stored in the memory of the second wireless station 345. As illustrated in FIG. 3F and detailed herein above in conjunction with FIGS. 3A-E, the first wireless station and the second wireless station can simultaneously choose beam sectors from their respective beambooks, and transmit feedback from the first wireless station 305 to the second wireless station 345 and vice-versa. In this way, each wireless station can choose the optimal sector (e.g., highest signal gain, highest signal to noise ratio, etc.) for transmission of data between the first wireless station and the second wireless station, based on feedback from both devices. After transmitting data using one sector, the receiving device can respond using feedback information including the signal strength of the signal at the receiving device. The transmitting device can then iteratively change beam sectors to alter the beam patterns of the wireless communications, and continuously receive feedback until an optimal sector is determined. Each of the first wireless station 305 and the second wireless station 345 can perform these steps simultaneously and in parallel.

D. Mesh Networks for Autonomous Vehicle Connection

Figure 4A:
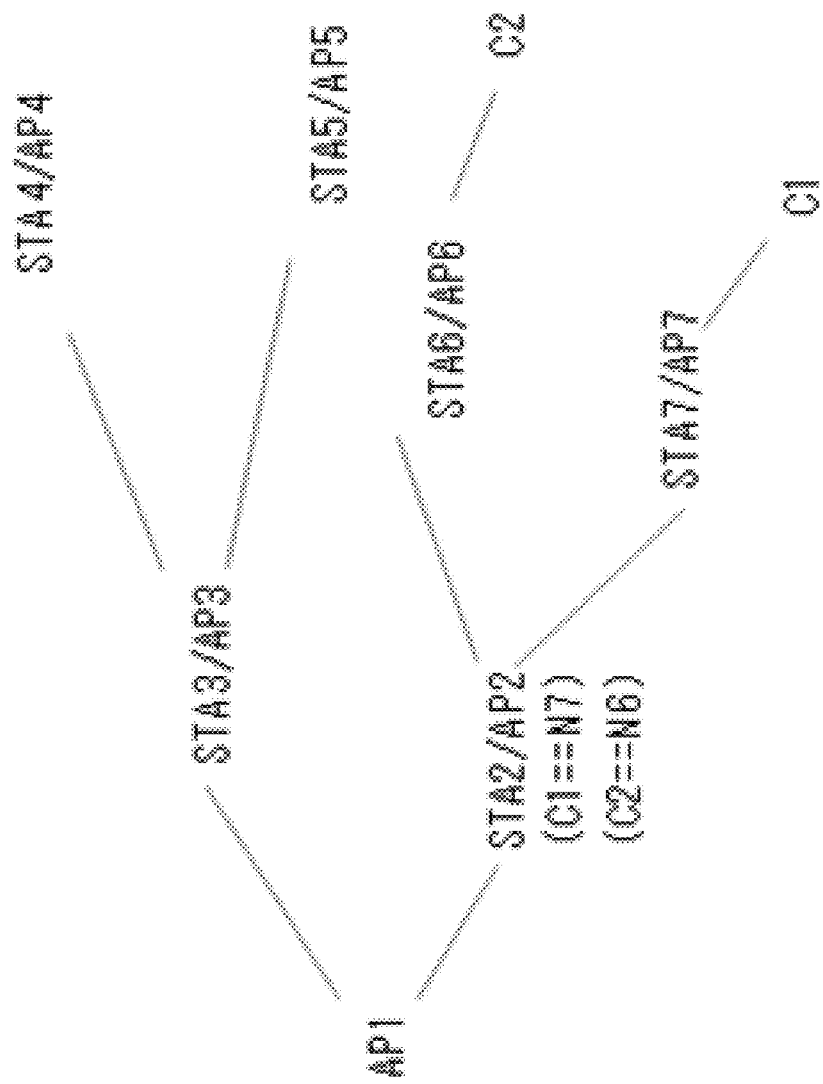
FIGS. 4A-F illustrate systems and methods that provide a mesh network in accordance with some implementations.
Figure 4B:
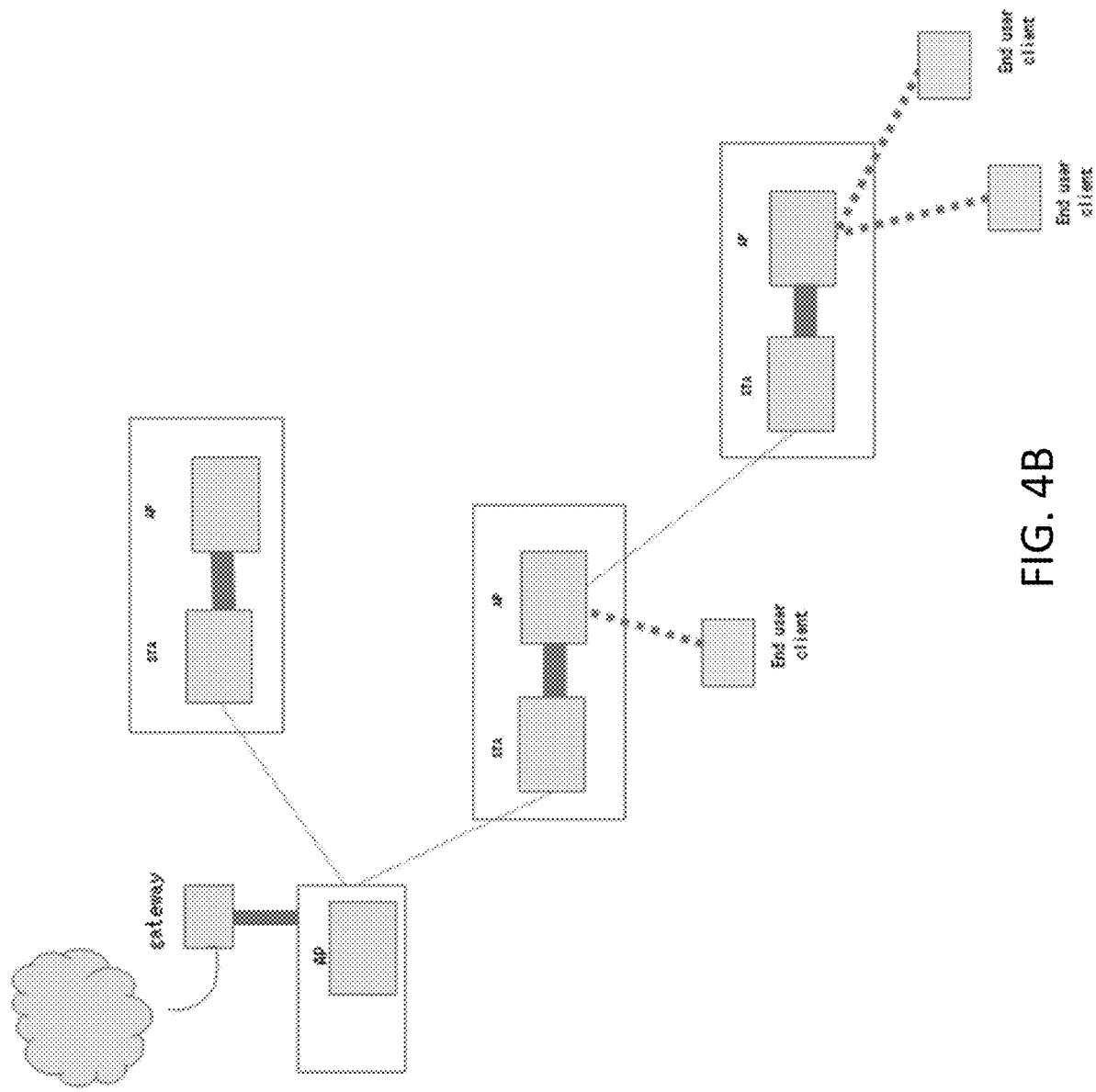

FIGS. 4A and 4B each depicts nodes in a network environment. STA/AP can refer to pairs of network nodes. C can refer to a client. The functionalities of the network nodes and the clients detailed herein can be implemented using the one or more components of the system described in FIGS. 6A-D. First, a client can initiate a Dynamic Host Configuration Protocol (DHCP) request. Second, the AP-associated to the client can forward the DHCP pack as a unicast to root AP (e.g., AP1). Third, in between nodes, the node table can be updated or allocated for the client. The node entry can be referred to for forwarding traffic to the node (e.g., N2 updates next hop for C1 as N7). Fourth, download (DL) traffic can use the next hop from the node table present in each node. Fifth, next hop for upload (UL) traffic can be decided during the node initialization. The packets can be sent from STA to the associated AP (e.g., from N7 to N2 to AP). One advantage can be that loops can be avoided and the environment can span a large number of hops.

Figure 4C:
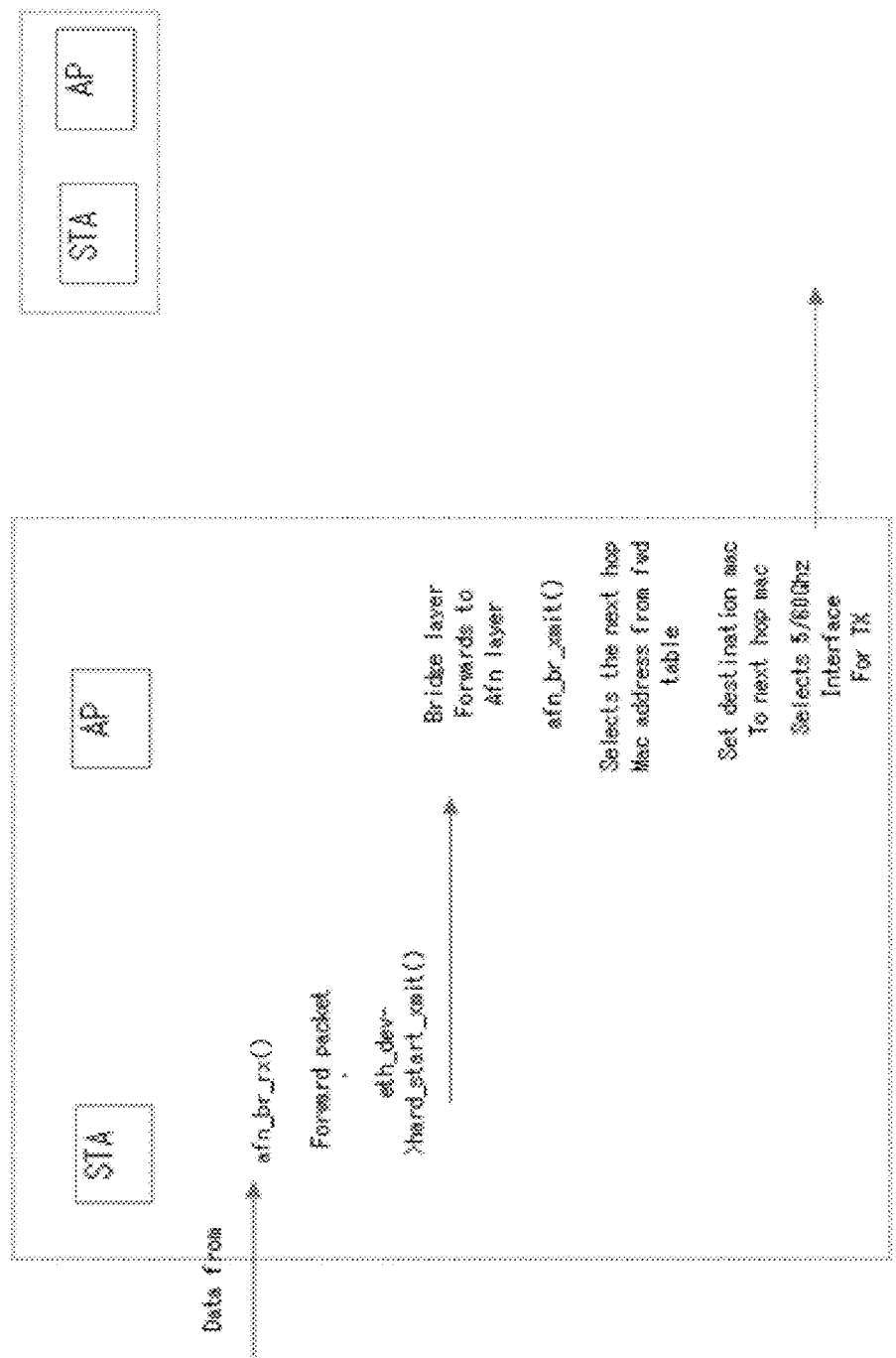

FIG. 4C depicts a data packet flow in an intermediate node. An intermediate node can include an AP and STA pair. The AP/STA can have two interfaces. One can include the afn bridge and the ethernet (daisy chain) interface. Packets that are received on afn interface (5/60 Ghz) can be forwarded to the ethernet interface (daisy chain). Packets transmitted on ethernet interface can be forwarded to afn interface of the other box. First, data can be received on STA. Afn bridge layer can receive the data and can forward to the ethernet interface. Data can arrive at the bridge layer of the AP node and can be in transmit path of the afn bridge interface. The afn layer can obtain the next HOP, which can correspond to the mac address of an associated STA. The Afn layer can select the wireless interface (5/60 GHz) and can send the packets by setting the destination mac address as that is the STA.

Figure 4D:
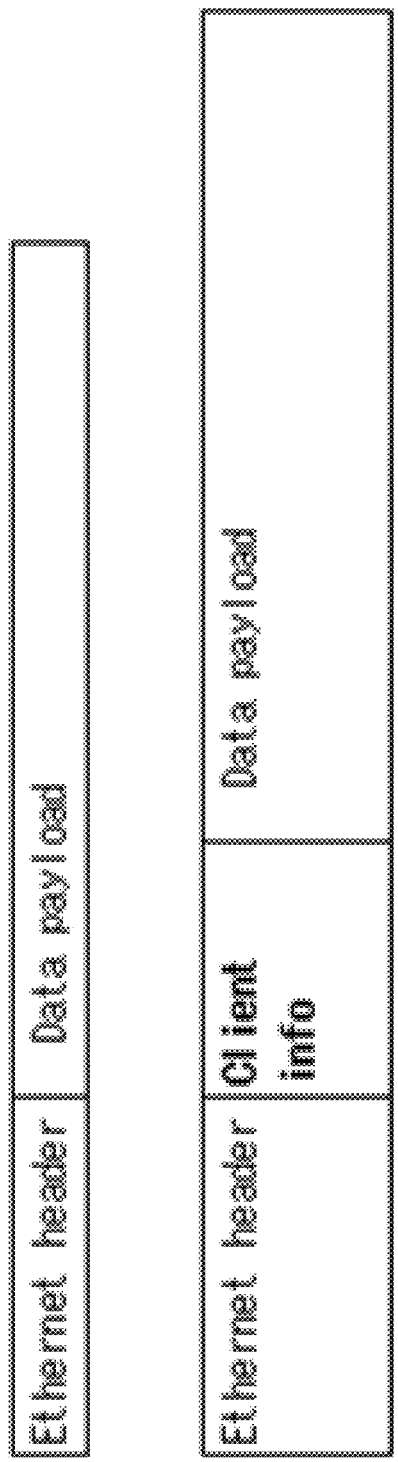
Figure 4E:
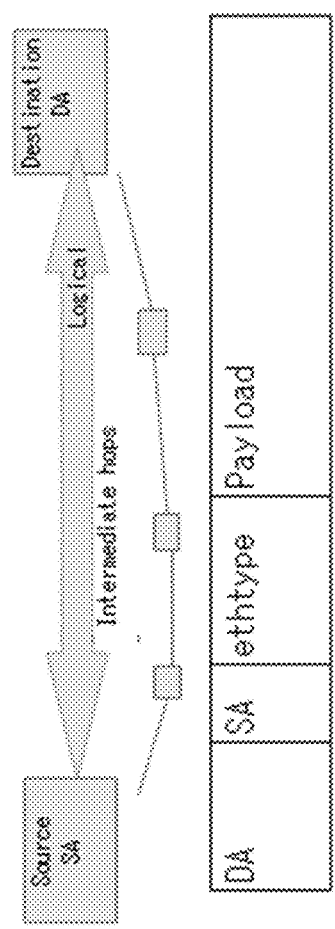

FIGS. 4D and 4E depict an example implementation of a data packet for use in the environment detailed herein. To present the end-client MAC address across multiple hops, the data of the client can be added after the Ethernet header. The additional of client information can be performed by one of the nodes. For UL communications, client information can be at the first AP which is connected to the gateway. For DL communications, the client information can be added at the AP to which the client is associated:

```
Client information structure
struct fwd_data {
    unsigned char src_mac[6]; //originator of data
    unsigned char dst_mac[6]; //destination of the data in the LAN
} __packed;
```

Figure 4F:
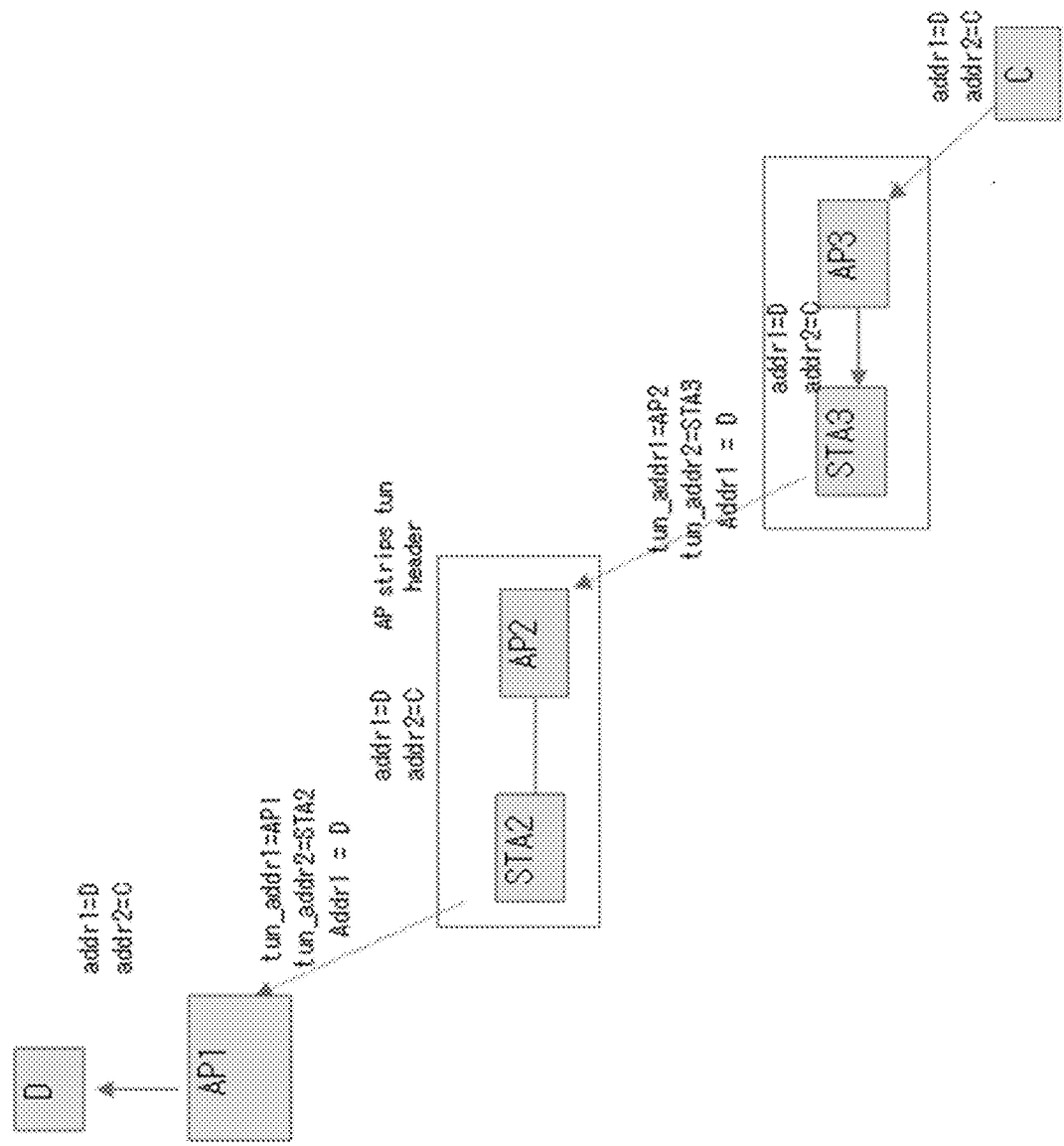

FIG. 4F depicts changes to the data packet traveling through the network environment. When the packet reaches the node, which is the closest to the destination, the client information can be stripped. Source and destination address fields in ethernet header can be overwritten by the addresses as in client information. In addition, end clients can connect in 2.4/5 ghz/60 GHz. The data can be forwarded to intermediate nodes over 5/60 GHz. Afn layer can decide on which link to send data. 5 or 60 GHz. Separate paths/network can be created for 5 and 60 GHz. For example, packets arriving in 60 GHz radio may be forwarded using 5 GHz radio considering number of hops to destination.

E. Dynamic Rate Adaptation

Figure 5:
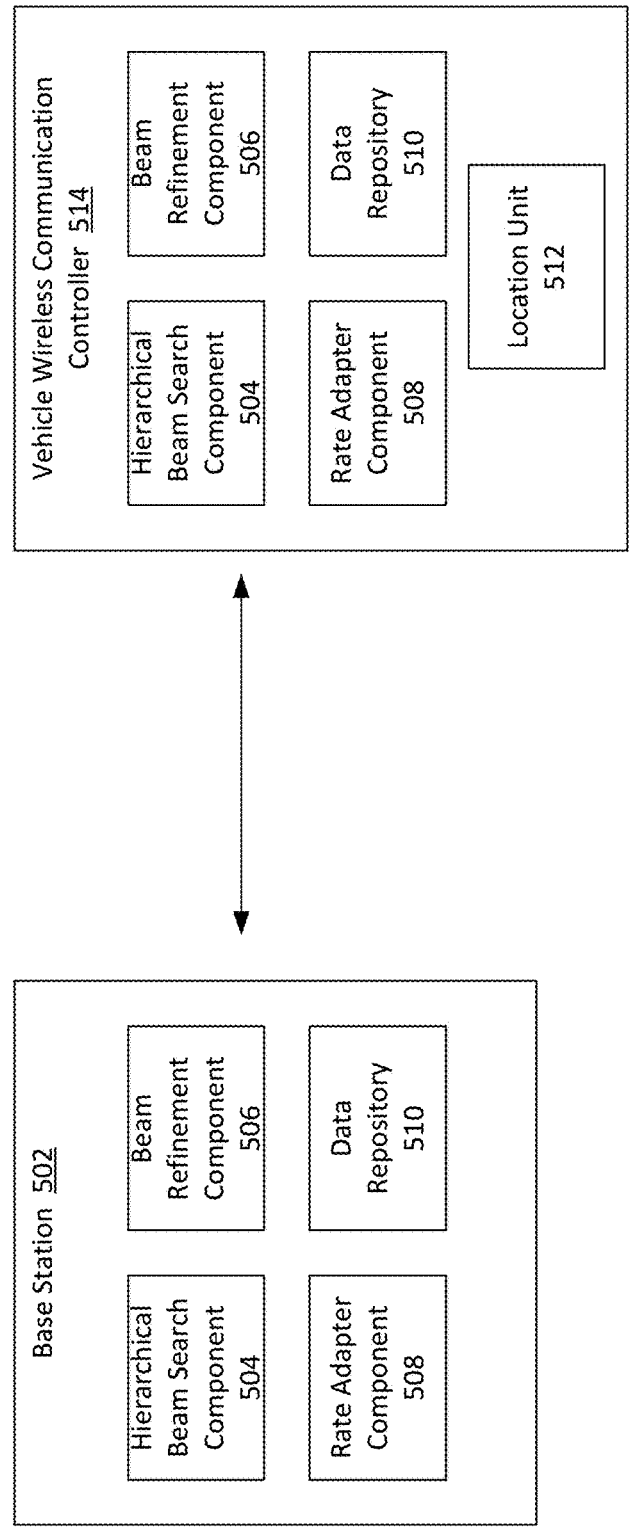
FIG. 5 is a block diagram depicting an implementation of a system for dynamic rate adaption.

FIG. 5 depicts a system 500 that provides dynamic data rate adaption. System 500 can include one or more component or functionality depicted in FIGS. 1-4 and 6. System 500 can include a base station 502, such as a wireless base station. System 500 can include a vehicle wireless communication controller 514, that can provided on or with a vehicle, aircraft, vessel or other moving device. Each of the base station 502 and controller 514 of the system 500 can include a hierarchical beam search component 504, beam refinement component 506, rate adapter component 508 and a data repository 510. The controller 514 can include a location unit 512, such as an inertial measurement unit configured to determine or provide an indication of a location.

For example, high data rates of millimeter wave (mmWave) can use large antenna arrays at both the base stations [BS] and mobile autonomous vehicles[AV]. The beamforming weights of these large arrays are tuned to guarantee sufficient beamforming gains. Coverage and rate of mmWave cellular networks are configured for cases when base stations and mobile users beamforming vectors are perfectly designed for maximum beamforming gains. However, designing beamforming/combining vectors may use training which may impact both the SINR coverage and rate of mmWave cellular systems.

Systems and methods of the present technical solution provide system 500 to improve the rate of search or adaptation, and has resulted in performance improvements of mmWave networks while accounting for the beam training/association overhead. First, (e.g., via system 500) a model for the initial beam association is developed based on beam sweeping and downlink control pilot reuse. Using stochastic geometry, the effective reliable rate of mmWave cellular networks is derived for two special cases: with near-orthogonal control pilots and with full pilot reuse.

The system 500 can determine (i) an impact of beam association on mmWave network performance? (ii) whether orthogonal or reused control pilots be employed in the initial beam association phase? and (iii) whether exhaustive or hierarchical search be adopted for the beam training phase? Using these techniques, system 500 can provide exhaustive search with full pilot reuse is nearly that is as good as perfect beam alignment.

The base station 502 and communication controller 514 on an autonomous vehicle or drone may have predefined codebooks of possible beamforming/combining vectors, and perform beam sweeping (exhaustive search) by examining all the Base station[BS]/AV beam pairs. The beam pair that maximizes some performance metric, e.g., the overall beamforming gain, is then selected to be used for data transmission. An exhaustive search is accompanied by high training overhead, specially when narrow beams are employed. To reduce the training overhead, system 500 can be configured with a hierarchical search functionality (e.g., a codebook) to support hierarchical search. Via hierarchical beam search component 504, the BS and AV can first search for the best beam pair over a codebook of wide beam patterns. Then, a second stage of beam refinement (e.g., via beam refinement component 506) can be followed, where codebooks of narrower beams are used. Misalignment error probabilities under different mmWave channel models were derived.

Using location of vehicle (e.g., as determined via location unit 512), determined by the IMU sensors coupled by the rising or falling Signal Quality Index[SQI], system 500 can be configured to perform automatic rate adaption (e.g., via rate adapter component 508). This results in higher beam tracking efficiency, as we prevent rate search across all MCS when beam deteriorates. Traffic rate decreases when rate search algorithms. Through adaptive rate search, system 500 can maintain a steady traffic throughput.

F. Computing and Network Environment

Figure 6A:
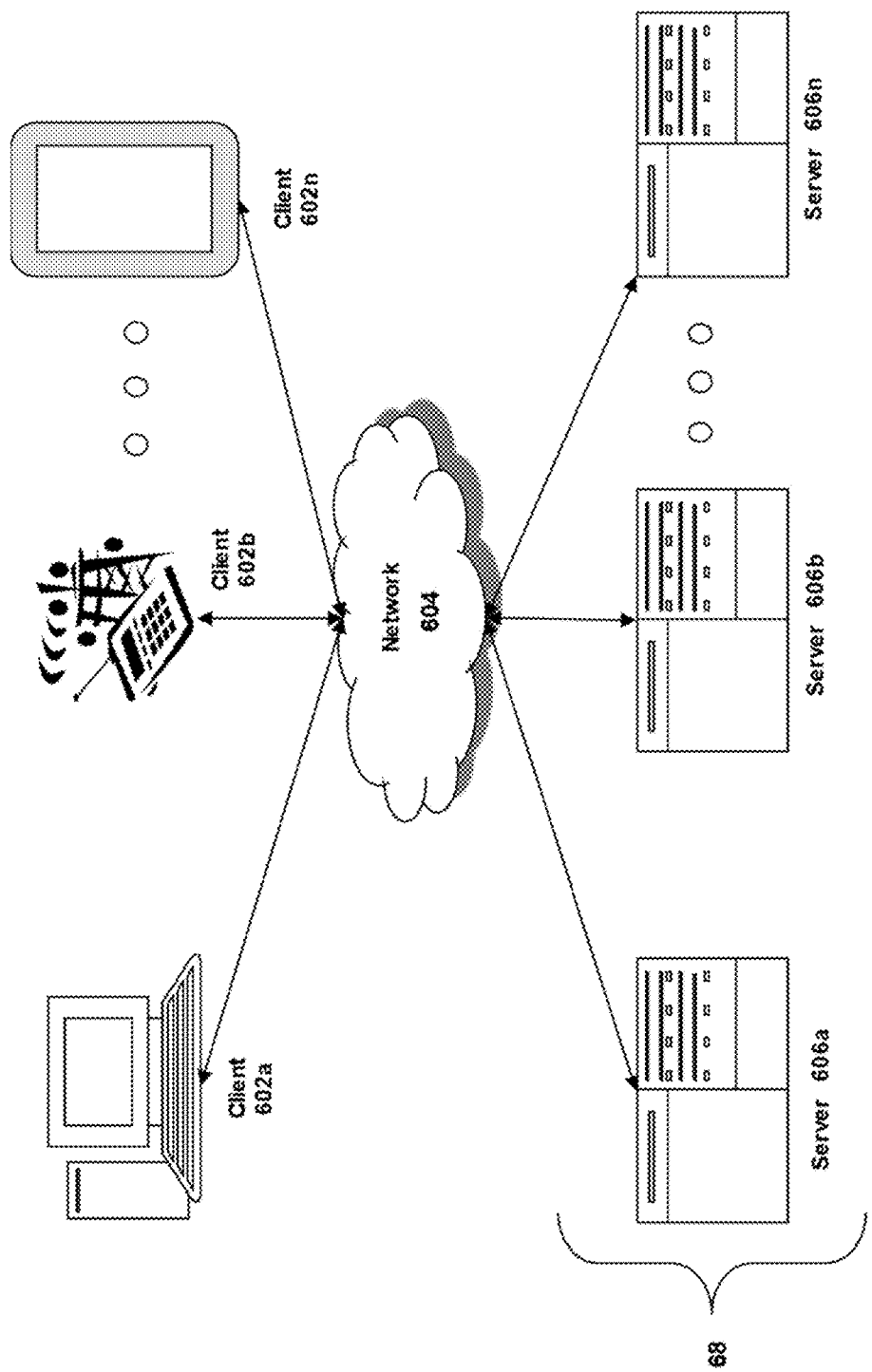
FIG. 6A is a block diagram depicting an implementation of a network environment comprising client device in communication with server device.

The systems and methods described in Sections A-E, and depicted in FIGS. 1-5 can include or use one or more component, element, module or functionality depicted in FIGS. 6A-D. Referring to FIG. 6A, an implementation of a network environment that can be used in connection with the methods and systems described herein is depicted. In brief overview, the network environment includes one or more clients 602a-602n (also generally referred to as local machine(s) 602, client(s) 602, client node(s) 602, client machine(s) 602, client computer(s) 602, client device(s) 602, endpoint(s) 602, or endpoint node(s) 602) in communication with one or more servers 606a-606n (also generally referred to as server(s) 606, node 606, or remote machine(s) 606) via one or more networks 604. In some implementations, a client 602 has the capacity to function as both a client node seeking access to resources provided by a server and as a server providing access to hosted resources for other clients 602a-602n.

Although FIG. 6A shows a network 604 between the clients 602 and the servers 606, the clients 602 and the servers 606 may be on the same network 604. In some implementations, there are multiple networks 604 between the clients 602 and the servers 606. In one of these implementations, a network 604' (not shown) may be a private network and a network 604 may be a public network. In another of these implementations, a network 604 may be a private network and a network 604' a public network. In still another of these implementations, networks 604 and 604' may both be private networks.

The network 604 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some implementations, different types of data may be transmitted via different links and standards. In other implementations, the same types of data may be transmitted via different links and standards.

The network 604 may be any type and/or form of network. The geographical scope of the network 604 may vary widely and the network 604 can be a body area network (BAN), a personal area network (PAN), a local-area network (LAN), e.g. Intranet, a metropolitan area network (MAN), a wide area network (WAN), or the Internet. The topology of the network 604 may be of any form and may include, e.g., any of the following: point-to-point, bus, star, ring, mesh, or tree. The network 604 may be an overlay network which is virtual and sits on top of one or more layers of other networks 604'. The network 604 may be of any such network topology as known to those ordinarily skilled in the art capable of supporting the operations described herein. The network 604 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 604 may be a type of a broadcast network, a telecommunications network, a data communication network, or a computer network.

In some implementations, the system may include multiple, logically-grouped servers 606. In one of these implementations, the logical group of servers may be referred to as a server farm 68 or a machine farm 68. In another of these implementations, the servers 606 may be geographically dispersed. In other implementations, a machine farm 68 may be administered as a single entity. In still other implementations, the machine farm 68 includes a plurality of machine farms 68. The servers 606 within each machine farm 68 can be heterogeneous—one or more of the servers 606 or machines 606 can operate according to one type of operating system platform (e.g., WINDOWS NT, manufactured by Microsoft Corp. of Redmond, Wash.), while one or more of the other servers 606 can operate on according to another type of operating system platform (e.g., Unix, Linux, or Mac OS X).

In one implementation, servers 606 in the machine farm 68 may be stored in high-density rack systems, along with associated storage systems, and located in an enterprise data center. In this implementation, consolidating the servers 606 in this way may improve system manageability, data security, the physical security of the system, and system performance by locating servers 606 and high performance storage systems on localized high performance networks. Centralizing the servers 606 and storage systems and coupling them with advanced system management tools allows more efficient use of server resources.

The servers 606 of each machine farm 68 do not need to be physically proximate to another server 606 in the same machine farm 68. Thus, the group of servers 606 logically grouped as a machine farm 68 may be interconnected using a wide-area network (WAN) connection or a metropolitan-area network (MAN) connection. For example, a machine farm 68 may include servers 606 physically located in different continents or different regions of a continent, country, state, city, campus, or room. Data transmission speeds between servers 606 in the machine farm 68 can be increased if the servers 606 are connected using a local-area network (LAN) connection or some form of direct connection. Additionally, a heterogeneous machine farm 68 may include one or more servers 606 operating according to a type of operating system, while one or more other servers 606 execute one or more types of hypervisors rather than operating systems. In these implementations, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 68 may be de-centralized. For example, one or more servers 606 may comprise components, subsystems and modules to support one or more management services for the machine farm 68. In one of these implementations, one or more servers 606 provide functionality for management of dynamic data, including techniques for handling failover, data replication, and increasing the robustness of the machine farm 68. Each server 606 may communicate with a persistent store and, in some implementations, with a dynamic store.

Server 606 may be a file server, application server, web server, proxy server, appliance, network appliance, gateway, gateway server, virtualization server, deployment server, SSL VPN server, or firewall. In one implementation, the server 606 may be referred to as a remote machine or a node. In another implementation, a plurality of nodes 290 may be in the path between any two communicating servers.

Figure 6B:
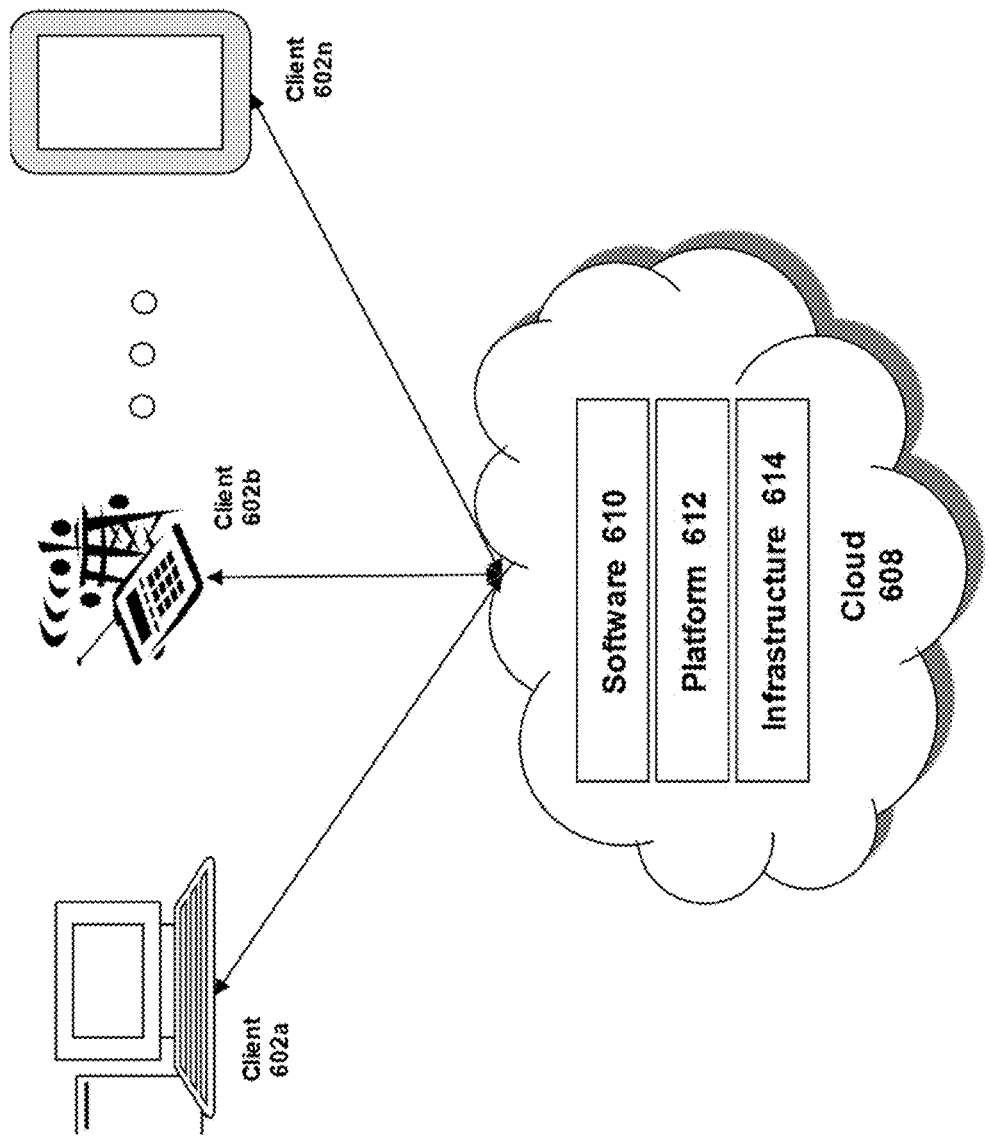
FIG. 6B is a block diagram depicting a cloud computing environment comprising client device in communication with cloud service providers.

Referring to FIG. 6B, a cloud computing environment is depicted. A cloud computing environment may provide client 602 with one or more resources provided by a network environment. The cloud computing environment may include one or more clients 602a-602n, in communication with the cloud 608 over one or more networks 604. Clients 602 may include, e.g., thick clients, thin clients, and zero clients. A thick client may provide at least some functionality even when disconnected from the cloud 608 or servers 606. A thin client or a zero client may depend on the connection to the cloud 608 or server 606 to provide functionality. A zero client may depend on the cloud 608 or other networks 604 or servers 606 to retrieve operating system data for the client device. The cloud 608 may include back end platforms, e.g., servers 606, storage, server farms or data centers.

The cloud 608 may be public, private, or hybrid. Public clouds may include public servers 606 that are maintained by third parties to the clients 602 or the owners of the clients. The servers 606 may be located off-site in remote geographical locations as disclosed above or otherwise. Public clouds may be connected to the servers 606 over a public network. Private clouds may include private servers 606 that are physically maintained by clients 602 or owners of clients. Private clouds may be connected to the servers 606 over a private network 604. Hybrid clouds 608 may include both the private and public networks 604 and servers 606.

The cloud 608 may also include a cloud based delivery, e.g. Software as a Service (SaaS) 610, Platform as a Service (PaaS) 614, and Infrastructure as a Service (IaaS) 614. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some implementations, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 665 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 602 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 602 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 602 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 602 may also access SaaS resources through smartphone or tablet applications, including, e.g., Salesforce Sales Cloud, or Google Drive app. Clients 602 may also access SaaS resources through the client operating system, including, e.g., Windows file system for DROPBOX.

In some implementations, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 6C:
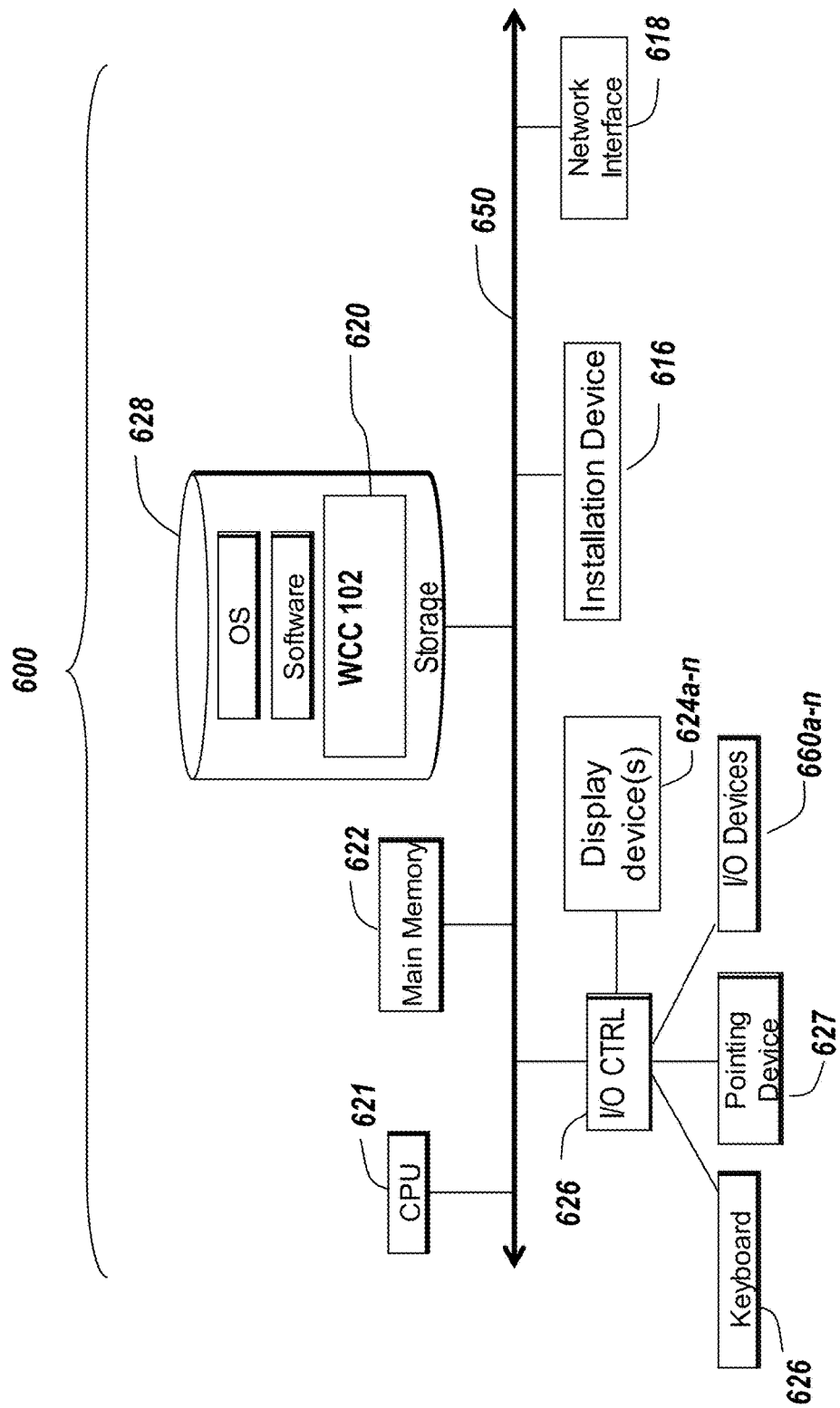
FIGS. 6C and 6D are block diagrams depicting implementations of computing devices useful in connection with the methods and systems described herein.
Figure 6D:
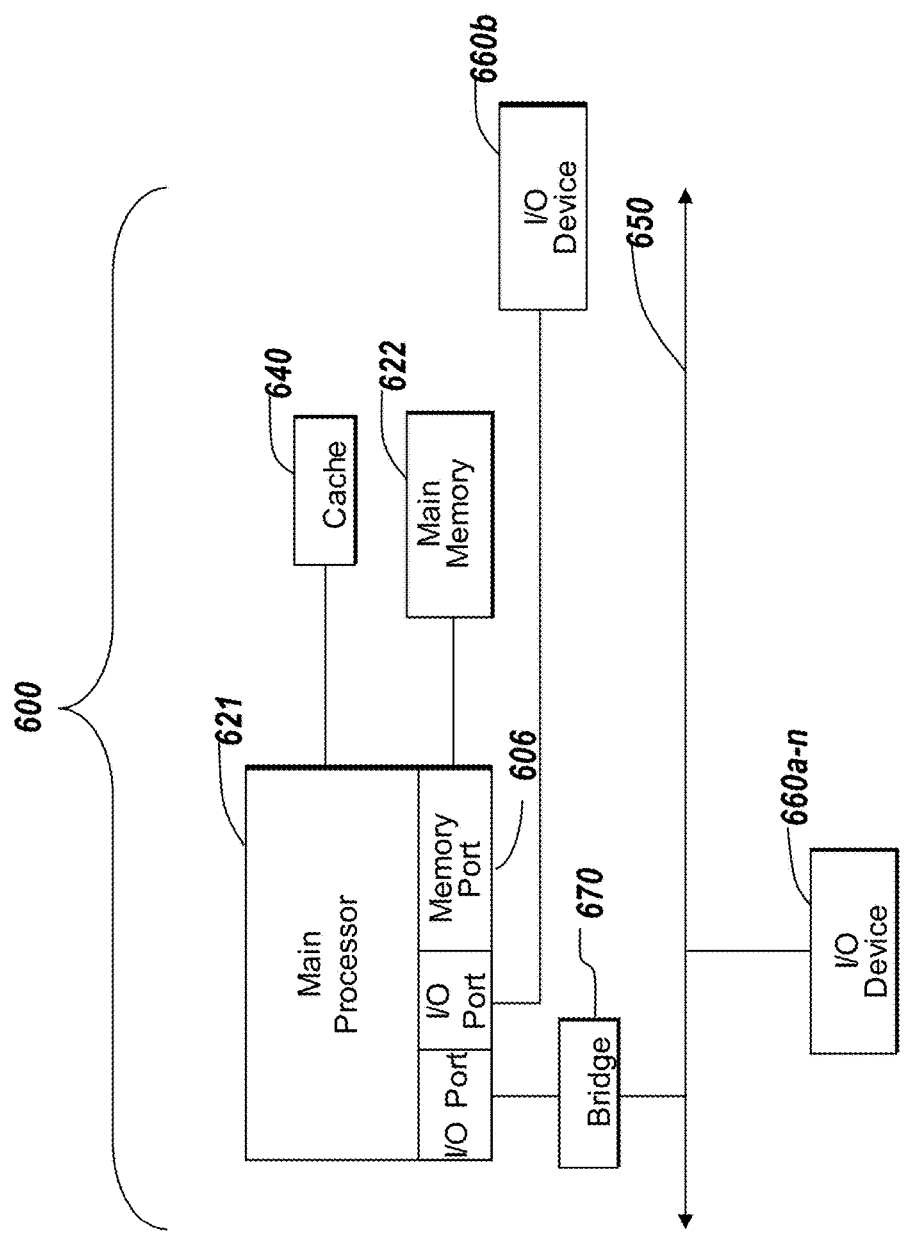

The client 602 and server 606 may be deployed as and/or executed on any type and form of computing device, e.g. a computer, network device or appliance capable of communicating on any type and form of network and performing the operations described herein. FIGS. 6C and 6D depict block diagrams of a computing device 600 useful for practicing an implementation of the client 602 or a server 606. As shown in FIGS. 6C and 6D, each computing device 600 includes a central processing unit 621, and a main memory unit 622. As shown in FIG. 6C, a computing device 600 may include a storage device 628, an installation device 616, a network interface 618, an I/O controller 623, display devices 624a-624n, a keyboard 326 and a pointing device 627, e.g. a mouse. The storage device 628 may include, without limitation, an operating system, software, and a software of or associated with the connection manager 315. As shown in FIG. 6D, each computing device 600 may also include additional optional elements, e.g. a memory port 603, one or more input/output devices 630a-630n (generally referred to using reference numeral 630), and a cache memory 640 in communication with the central processing unit 621.

The central processing unit 621 is any logic circuitry that responds to and processes instructions fetched from the main memory unit 622. In many implementations, the central processing unit 621 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 600 may be based on any of these processors, or any other processor capable of operating as described herein. The central processing unit 621 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 622 may include one or more memory chips capable of storing data and allowing any storage location to be directly accessed by the microprocessor 621. Main memory unit 622 may be volatile and faster than storage 628 memory. Main memory units 622 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some implementations, the main memory 622 or the storage 628 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 622 may be based on any of the above described memory chips, or any other available memory chips capable of operating as described herein. In the implementation shown in FIG. 6C, the processor 621 communicates with main memory 622 via a system bus 650 (described in more detail below). FIG. 6D depicts an implementation of a computing device 600 in which the processor communicates directly with main memory 622 via a memory port 603. For example, in FIG. 6D the main memory 622 may be DRDRAM.

FIG. 6D depicts an implementation in which the main processor 621 communicates directly with cache memory 640 via a secondary bus, sometimes referred to as a backside bus. In other implementations, the main processor 621 communicates with cache memory 640 using the system bus 650. Cache memory 640 typically has a faster response time than main memory 622 and is typically provided by SRAM, BSRAM, or EDRAM. In the implementation shown in FIG. 6D, the processor 621 communicates with various I/O devices 630 via a local system bus 650. Various buses may be used to connect the central processing unit 621 to any of the I/O devices 630, including a PCI bus, a PCI-X bus, or a PCI-Express bus, or a NuBus. For implementations in which the I/O device is a video display 624, the processor 621 may use an Advanced Graphics Port (AGP) to communicate with the display 624 or the I/O controller 623 for the display 624. FIG. 6D depicts an implementation of a computer 600 in which the main processor 621 communicates directly with I/O device 630b or other processors 621' via HYPERTRANSPORT, RAPIDIO, or INFINIBAND communications technology. FIG. 6D also depicts an implementation in which local busses and direct communication are mixed: the processor 621 communicates with I/O device 630a using a local interconnect bus while communicating with I/O device 630b directly.

A wide variety of I/O devices 630a-630n may be present in the computing device 600. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 630a-630n may include a combination of multiple input or output devices, including, e.g., Microsoft KINECT, Nintendo Wiimote for the WII, Nintendo WII U GAMEPAD, or Apple IPHONE. Some devices 630a-630n allow gesture recognition inputs through combining some of the inputs and outputs. Some devices 630a-630n provides for facial recognition which may be utilized as an input for different purposes including authentication and other commands. Some devices 630a-630n provides for voice recognition and inputs, including, e.g., Microsoft KINECT, SIRI for IPHONE by Apple, Google Now or Google Voice Search.

Additional devices 630a-630n have both input and output capabilities, including, e.g., haptic feedback devices, touch-screen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 630a-630n, display devices 624a-624n or group of devices may be augment reality devices. The I/O devices may be controlled by an I/O controller 623 as shown in FIG. 6C. The I/O controller may control one or more I/O devices, such as, e.g., a keyboard 326 and a pointing device 627, e.g., a mouse or optical pen. Furthermore, an I/O device may also provide storage and/or an installation medium 616 for the computing device 600. In still other implementations, the computing device 600 may provide USB connections (not shown) to receive handheld USB storage devices. In further implementations, an I/O device 630 may be a bridge between the system bus 650 and an external communication bus, e.g. a USB bus, a SCSI bus, a FireWire bus, an Ethernet bus, a Gigabit Ethernet bus, a Fibre Channel bus, or a Thunderbolt bus.

In some implementations, display devices 624a-624n may be connected to I/O controller 623. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 624a-624n may also be a head-mounted display (HMD). In some implementations, display devices 624a-624n or the corresponding I/O controllers 623 may be controlled through or have hardware support for OPENGL or DIRECTX API or other graphics libraries.

In some implementations, the computing device 600 may include or connect to multiple display devices 624a-624n, which each may be of the same or different type and/or form. As such, any of the I/O devices 630a-630n and/or the I/O controller 623 may include any type and/or form of suitable hardware, software, or combination of hardware and software to support, enable or provide for the connection and use of multiple display devices 624a-624n by the computing device 600. For example, the computing device 600 may include any type and/or form of video adapter, video card, driver, and/or library to interface, communicate, connect or otherwise use the display devices 624a-624n. In one implementation, a video adapter may include multiple connectors to interface to multiple display devices 624a-624n. In other implementations, the computing device 600 may include multiple video adapters, with each video adapter connected to one or more of the display devices 624a-624n. In some implementations, any portion of the operating system of the computing device 600 may be configured for using multiple displays 624a-624n. In other implementations, one or more of the display devices 624a-624n may be provided by one or more other computing devices 600a or 600b connected to the computing device 600, via the network 604. In some implementations software may be designed and constructed to use another computer's display device as a second display device 624a for the computing device 600. For example, in one implementation, an Apple iPad may connect to a computing device 600 and use the display of the device 600 as an additional display screen that may be used as an extended desktop. One ordinarily skilled in the art will recognize and appreciate the various ways and implementations that a computing device 600 may be configured to have multiple display devices 624a-624n.

Referring again to FIG. 6C, the computing device 600 may comprise a storage device 628 (e.g. one or more hard disk drives or redundant arrays of independent disks) for storing an operating system or other related software, and for storing application software programs such as any program related to the connection manager 315. Examples of storage device 628 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 628 may be non-volatile, mutable, or read-only. Some storage device 628 may be internal and connect to the computing device 600 via a bus 650. Some storage device 628 may be external and connect to the computing device 600 via a I/O device 630 that provides an external bus. Some storage device 628 may connect to the computing device 600 via the network interface 618 over a network 604, including, e.g., the Remote Disk for MACBOOK AIR by Apple. Some client devices 600 may not require a non-volatile storage device 628 and may be thin clients or zero clients 602. Some storage device 628 may also be used as a installation device 616, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 600 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 602. An application distribution platform may include a repository of applications on a server 606 or a cloud 608, which the clients 602a-602n may access over a network 604. An application distribution platform may include application developed and provided by various developers. A user of a client device 602 may select, purchase and/or download an application via the application distribution platform.

Furthermore, the computing device 600 may include a network interface 618 to interface to the network 604 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one implementation, the computing device 600 communicates with other computing devices 600' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 618 may comprise a built-in network adapter, network interface card, PCMCIA network card, EXPRESS-CARD network card, card bus network adapter, wireless network adapter, USB network adapter, modem or any other device suitable for interfacing the computing device 600 to any type of network capable of communication and performing the operations described herein.

A computing device 600 of the sort depicted in FIGS. 6B and 6C may operate under the control of an operating system, which controls scheduling of tasks and access to system resources. The computing device 600 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 600 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 600 has sufficient processor power and memory capacity to perform the operations described herein. In some implementations, the computing device 600 may have different processors, operating systems, and input devices consistent with the device. The Samsung GALAXY smartphones, e.g., operate under the control of Android operating system developed by Google, Inc. GALAXY smartphones receive input via a touch interface.

In some implementations, the computing device 600 is a gaming system. For example, the computer system 600 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some implementations, the computing device 600 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some implementations, the computing device 600 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some implementations, the computing device 600 is a tablet e.g. the IPAD line of devices by Apple; GALAXY TAB family of devices by Samsung; or KINDLE FIRE, by Amazon.com, Inc. of Seattle, Wash. In other implementations, the computing device 600 is a eBook reader, e.g. the KINDLE family of devices by Amazon.com, or NOOK family of devices by Barnes & Noble, Inc. of New York City, N.Y.

In some implementations, the communications device 602 includes a combination of devices, e.g. a smartphone combined with a digital audio player or portable media player. For example, one of these implementations is a smartphone, e.g. the IPHONE family of smartphones manufactured by Apple, Inc.; a Samsung GALAXY family of smartphones manufactured by Samsung, Inc; or a Motorola DROID family of smartphones. In yet another implementation, the communications device 602 is a laptop or desktop computer equipped with a web browser and a microphone and speaker system, e.g. a telephony headset. In these implementations, the communications devices 602 are web-enabled and can receive and initiate phone calls. In some implementations, a laptop or desktop computer is also equipped with a webcam or other video capture device that enables video chat and video call.

In some implementations, the status of one or more machines 602, 606 in the network 604 can be monitored as part of network management. In one of these implementations, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these implementations, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

It should be understood that the systems described above may provide multiple ones of any or each of those components and these components may be provided on either a standalone machine or, in some implementations, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. The computer-readable programs can be implemented in a programming language, such as LISP, PERL, C, C++, C #, PROLOG, or in any byte code language such as JAVA. The software programs may be stored on or in one or more articles of manufacture as object code.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures may be performed in any order. In certain implementations, multitasking and parallel processing may be advantageous.

While this specification contains many specific implementation details, these should not be construed as limitations on the scope of any subject matter of what may be claimed, but rather as descriptions of features specific to particular implementations of the subject matter. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A system for millimeter wave wireless communication, comprising:
    a first wireless station comprising one or more processors, memory, a first radio frequency (RF) array having a first plurality of elements that form a first plurality of sectors, and a second RF array having a second plurality of elements that form a second plurality of sectors;
    the first wireless station transmitting a wireless signal;
    a second wireless station comprising a third RF array having a third plurality of elements that form a third plurality of sectors, one or more processors, and memory;
    a connection manager executed by the first wireless station to:
        retrieve, from a beambook, a first beam configuration for the first RF array to transmit data to the second wireless station;
        select, based on the first beam configuration, a first sector of the first plurality of sectors of the first RF array and a first transmission beam width;
        transmit, using the first sector of the first RF array, data via one or more wireless signals to the second wireless station using the first transmission beam width;
        communicate, using the first RF array, to the second wireless station using a control channel, signal information including the first transmission beam width;
        receive, using the first RF array, from the second wireless station via the control channel, feedback information comprising at least one of a signal strength value, a data rate value, a signal gain value, or a signal-to-noise ratio value, the feedback information including an indication to update the beambook with a second beam configuration;
        provide the data rate value as input to a machine learning model trained using feedback data from an external device to output beam configurations;
        generate, using the data rate value as input to the machine learning model, a phase value and a gain value of the second beam configuration for the first RF array;
        update the beambook to include the phase value and the gain value of the second beam configuration generated using the machine learning model;
        select, responsive to updating the beambook, a second sector of the first plurality of sectors of the first RF array and a second transmission beam width based on the second beam configuration;
        transmit second data, using the first RF array, via the one or more wireless signals to the second wireless station using the second sector of the first plurality of sectors and the second transmission beam width;
        receive, using the first sector of the first RF array, from the second wireless station, a second wireless signal having a second signal strength value;
        probe, concurrent to transmission of the second data by the first RF array, a subset of the second plurality of sectors of the second RF array to identify signal strength values for each sector of the second plurality of sectors;
        identify a candidate sector of the second plurality of sectors, the candidate sector having a largest signal strength value of the of the signal strength values of the second plurality of sectors;
        determine that the largest signal strength value of the candidate sector is greater than the second signal strength value; and
        switch data transmissions from the first RF array to the second RF array using the candidate sector of the second plurality of sectors.

2. The system of claim 1, wherein the connection manager selects the first sector of the first plurality of sectors based on a predetermined index stored in the beambook in the memory of the first wireless station.

3. The system of claim 1, wherein the connection manager selects the first sector of the first plurality of sectors and the first transmission beam width based on at least one of a pseudo-random function or a random function.

4. The system of claim 1, wherein the connection manager communicates, to the second wireless device, second signal information comprising phase values and gain values of the first RF array.

5. The system of claim 1, wherein the connection manager validates the phase value and the gain value of the second beam configuration generated using the machine learning model prior to updating the beambook.

6. The system of claim 1, wherein each of the first wireless station and the second wireless station transmit and receive a plurality of wireless signals in an iterative process to cause the first wireless station to determine a path direction and select the second sector of the first plurality of sectors having a largest gain value.

7. The system of claim 1, wherein the feedback information received from the second wireless station includes information about a signal strength of the wireless signal transmitted from the first RF array to the second wireless station.

8. The system of claim 1, wherein the connection manager updates the beambook stored in the memory of the first wireless station with an indication of the candidate sector of the second plurality of sectors identified as having the largest signal strength value.

9. The system of claim 1, wherein one of the first wireless station or the second wireless station is coupled to a vehicle that moves at a speed greater than or equal to 40 miles per hour relative to the other of the first wireless station or the second wireless station.

10. The system of claim 1, wherein the first wireless station is coupled to a first vehicle, and the second wireless station is coupled to a second vehicle.

11. The system of claim 1, wherein one of the first wireless station or the second wireless station is coupled to an unmanned aerial vehicle.

12. The system of claim 1, wherein the wireless signal comprises a frequency between 26.5 GHz and 72 GHz.

13. The system of claim 1, wherein the wireless signal comprises a frequency of one of 28 GHz, 39 GHz, 60 GHz or 72 GHz.

14. The system of claim 1, wherein the first wireless station uses the first sector of the first plurality of sectors to transmit data to the second wireless station at a data rate of greater than or equal to 1 Gbps.

15. The system of claim 1, wherein the first wireless station is coupled to a vehicle moving at a speed greater than or equal to 40 miles per hour relative to the second wireless station, and the first wireless station uses the first sector of the first plurality of sectors to transmit data to the second wireless station at a data rate of greater than or equal to 1 Gbps.

16. A method of millimeter wave wireless communication, comprising:
- transmitting, by a first wireless station, a wireless signal, wherein the first wireless station comprises a first radio frequency (RF) array having a first plurality elements that form a first plurality of sectors, a second radio frequency (RF) array having a second plurality of elements that form a second plurality of sectors, one or more processors, and memory;
- retrieving, by a connection manager executed by one or more processors of the first wireless station, from a beambook, a first beam configuration for the first RF array to transmit data to a second wireless station, wherein the second wireless station comprises a third RF array having a third plurality of elements that form a third plurality of sectors, one or more processors, and memory;
- selecting, by the connection manager, based on the first beam configuration, a first sector of the first plurality of sectors of the first RF array and a first transmission beam width;
- transmitting, by the connection manager, using the first sector of the first RF array, data via one or more wireless signals to the second wireless station using the first transmission beam width;
- communicating, by the connection manager, using the first RF array, to the second wireless station using a control channel, signal information including the first transmission beam width;
- receiving, by the connection manager, using the first RF array, from the second wireless station via the control channel, feedback information comprising at least one of a signal strength value, a data rate value, a signal gain value, or a signal to noise ratio value, the feedback information including an indication to update the beambook with a second beam configuration;
- providing, by the connection manager, the data rate value as input to a machine learning model trained using feedback data from an external device to output beam configurations;
- generating, by the connection manager, using the data rate value as input to the machine learning model, a phase value and a gain value of the second beam configuration for the first RF array;
- updating, by the connection manager, the beambook to include the phase value and the gain value of the second beam configuration generated using the machine learning model;
- selecting, by the connection manager, responsive to updating the beambook, a second sector of the first plurality of sectors of the first RF array and a second transmission beam width based on the second beam configuration;
- transmitting, by the connection manager, second data, using the first RF array, via the one or more wireless signals to the second wireless station using the second sector of the first plurality of sectors and the second transmission beam width;
- receiving, by the connection manager, using the first sector of the first RF array, from the second wireless station, a second wireless signal having a second signal strength value;
- probing, by the connection manager, concurrent to transmission of the second data by the first RF array, a subset of the second plurality of sectors of the second RF array to identify signal strength values for each sector of the second plurality of sectors;
- identifying, by the connection manager, a candidate sector of the second plurality of sectors, the candidate sector having a largest signal strength value of the signal strength values of the second plurality of sectors;
- determining, by the connection manager, that the largest signal strength value of the candidate sector is greater than the second signal strength value; and
- switching, by the connection manager, data transmissions from the first RF array to the second RF array using the candidate sector of the second plurality of sectors.

17. The method of claim 16, wherein selecting the first sector of the first plurality of sectors is based on a predetermined index stored in the beambook in the memory of the first wireless station.

18. The method of claim 16, wherein selecting the first sector of the first plurality of sectors is based on at least one of a pseudo-random function or a random function.

19. The method of claim 16, further comprising communicating, by the connection manager, to the second wireless device, second signal information comprising phase values and gain values of the first RF array.

20. The method of claim 16, further comprising transmitting, by the connection manager to the second wireless station, data at a data rate of greater than or equal to 1 Gbps, wherein the first wireless station is coupled to a vehicle moving at a speed greater than or equal to 40 miles per hour relative to the second wireless station.

* * * * *